United States Patent [19]
Poole et al.

[11] Patent Number: 6,006,242
[45] Date of Patent: Dec. 21, 1999

[54] APPARATUS AND METHOD FOR DYNAMICALLY CREATING A DOCUMENT

[75] Inventors: Donald L. Poole; Richard K. Wyman, both of St. Cloud, Minn.

[73] Assignee: Bankers Systems, Inc., St. Cloud, Minn.

[21] Appl. No.: 08/628,874

[22] Filed: Apr. 5, 1996

[51] Int. Cl.⁶ .................................................. G06F 17/27
[52] U.S. Cl. ............................................................ 707/531
[58] Field of Search .................................. 707/505–508, 707/530–531

[56] References Cited

U.S. PATENT DOCUMENTS

| | | | |
|---|---|---|---|
| 4,866,634 | 9/1989 | Reboh et al. | 706/60 |
| 4,876,665 | 10/1989 | Iwai et al. | 707/200 |
| 4,905,163 | 2/1990 | Garber et al. | 706/55 |
| 4,964,060 | 10/1990 | Hartsog | 364/512 |
| 4,970,658 | 11/1990 | Durbin et al. | 706/60 |
| 4,984,174 | 1/1991 | Yasunobu et al. | 706/52 |
| 5,043,891 | 8/1991 | Goldstein et al. | 707/531 |
| 5,133,045 | 7/1992 | Gaither et al. | 706/46 |
| 5,133,075 | 7/1992 | Risch | 707/201 |
| 5,159,669 | 10/1992 | Trigg et al. | 345/357 |
| 5,161,211 | 11/1992 | Taguchi et al. | 706/62 |
| 5,218,539 | 6/1993 | Elphick et al. | 707/531 |
| 5,222,236 | 6/1993 | Potash et al. | 707/102 |
| 5,323,313 | 6/1994 | Davis et al. | 707/531 |
| 5,423,041 | 6/1995 | Burke et al. | 395/705 |
| 5,446,653 | 8/1995 | Miller et al. | 705/4 |
| 5,448,729 | 9/1995 | Murdock | 707/104 |
| 5,485,544 | 1/1996 | Nonaka et al. | 706/11 |
| 5,524,257 | 6/1996 | Koike et al. | 706/10 |
| 5,598,511 | 1/1997 | Petrinjak et al. | 706/50 |
| 5,608,857 | 3/1997 | Ikeo et al. | 707/500 |
| 5,671,429 | 9/1997 | Tanaka | 707/530 |
| 5,778,398 | 7/1998 | Nagashima et al. | 707/501 |

FOREIGN PATENT DOCUMENTS

WO 95/19010  7/1995  WIPO.

*Primary Examiner*—Anton Fetting
*Attorney, Agent, or Firm*—Merchant & Gould P.C.

[57] ABSTRACT

An apparatus and method for dynamically constructing electronic and printable documents and forms. An entity reference is read from a document instance and compared to entity identifiers provided in a catalog containing a plurality of entity identifiers. Each of the entity identifiers in the catalog is associated with an entity resolution process. An inference engine or other entity resolving processor is invoked to effectuate the resolution process associated with a matching entity identifier. The inference engine or entity resolving processor resolves the entity reference to a resolved entity, such as a component of text or graphics to be included in a document. Linking between the document, entity reference, and resolved entity provides for detailed auditing of the entity resolution process. A resolved entity may contain one or more embedded entity references which are similarly resolved. The dynamic document construction methodology may be implemented using a distributed networking approach, or on a stand-alone computer system. A significant advantage of the present invention concerns the re-usability of textual, graphical, and other components, thereby providing for the construction of any arbitrary document type having any arbitrary number of presentation formats. In one embodiment, the inference engine used to resolve entity references is converted to an executable form to enhance portability. A document or form constructed in accordance with the present invention may be published in printed or electronic form, such as in the form of a World Wide Web (Web) page.

26 Claims, 29 Drawing Sheets

Microfiche Appendix Included
(6 Microfiche, 230 Pages)

FIG. 16

APPARATUS AND METHOD FOR DYNAMICALLY CREATING A DOCUMENT

MICROFICHE APPENDIX

This application contains a "microfiche appendix" including: Microfiche Appendix I, Document Services Object Listing (2 sheets, 99 frames); Microfiche Appendix II, BFO Processor Server Object Listing (2 sheets, 79 frames; Microfiche Appendix III, BFO Process Server Object Listing For Merge Services (1 sheet, 18 frames); and Microfiche Appendix IV, AutoSelection Server Object Listing(1 sheet, 34 frames).

FIELD OF THE INVENTION

The present invention relates generally to document production, and more particularly, to an apparatus and method for dynamically constructing an electronic document for subsequent publication in pre-printed or electronic form.

BACKGROUND OF THE INVENTION

Document production systems that insert customer-specific content into a pre-fabricated form are known. During a first phase of a conventional document production procedure, a computer-based editor is typically employed to produce a boilerplate document or form. The boilerplate document is then reviewed and revised by a document developer, and stored in a storage device, such as a hard disk drive of a computer. The boilerplate document is then made available for use to an end-user, such as a bank or loan officer. During a second phase, the end-user retrieves the boilerplate document, such as a loan application form, from the storage device and enters customer-specific content into the form. The customer-specific content is then inserted into specified locations on the form, and the completed form is then printed.

An improved insurance document production system is disclosed in U.S. Pat. No. 5,446,653 (hereinafter referred to as "Miller"). The system disclosed in Miller improves upon the above-described procedure by employing a conventional relational database scheme to test customer-specific input information against a table of rule sets which, in turn, are directly linked to various boilerplate clauses. A rule set is assigned to each insurance policy clause and each endorsement clause. The insurance and endorsement clauses and rule sets are stored in a memory coupled to the main processor. Each rule set includes at least one rule that must be satisfied in order to include the associated clause in the document. After entering customer-specific parameters into the computer, such as desired insurance coverages and policy holder's state of residence, each and every rule in each and every rule set is evaluated to determine whether a particular clause is to be included in the document. In order to print a document, a printer database containing a redundant copy of each insurance and endorsement policy clause is utilized to supply the appropriate clauses when printing the final document.

Although the system disclosed in Miller provides for some degree of improvement when automating an insurance document production procedure, there remains a keenly felt need for a system that provides the capability to construct the structure and content of the entire form or document, and one that is not limited to simply inserting limited boilerplate content, such as the policy and endorsement clauses of Miller, into a limited number of locations on an otherwise modified version of a pre-fabricated boilerplate document. There exists a further need for a document production system that provides for a high degree of content re-use, such that a base of content can be used to construct any number and type of document. Moreover, there exists a need for a flexible inferencing capability that dynamically determines content to be included in a document, wherein direct linkage between content and content determining rules is obviated. The present invention fulfills these and other needs.

SUMMARY OF THE INVENTION

The present invention relates to an apparatus and method for dynamically constructing electronic and printable documents and forms. In accordance with an embodiment of the present invention, an entity reference is read from a document instance and compared to entity identifiers provided in a catalog containing a plurality of entity identifiers. Each of the entity identifiers in the catalog is associated with an entity resolution process. An inference engine or other entity resolving processor is invoked to effectuate the resolution process associated with a matching entity identifier. The inference engine or entity resolving processor resolves the entity reference to a resolved entity, such as a component of text or graphics to be included in a final document. A resolved entity may contain one or more embedded entity references which are similarly resolved.

In one embodiment, the entity reference resolution process provides for the production of a stream of resolved entities of components. Any number of documents of varying structure, content, and format may be constructed by referencing one or more components of the component stream. A significant advantage of the present invention concerns the re-usability of textual, graphical, and other document components or fragments, thereby providing for the construction of any arbitrary document type having any arbitrary number of presentation formats. Linking between the document, entity reference, and resolved entity provides for detailed auditing of the entity resolution process.

The dynamic document construction methodology of the present invention may be implemented using a distributed networking approach or a stand-alone computer system. In one embodiment, the inference engine used to resolve entity references is converted to an executable form to enhance portability. A document or form constructed in accordance with the present invention may be published in printed or electronic form, such as in the form of a World Wide Web (Web) page.

BRIEF DESCRIPTION OF THE DRAWINGS

FIGS. 15–17 illustrate various windows associated with a tool for developing the layout of an SGML base document;

DETAILED DESCRIPTION OF THE EMBODIMENTS

DEFINITIONS

Figure 1:
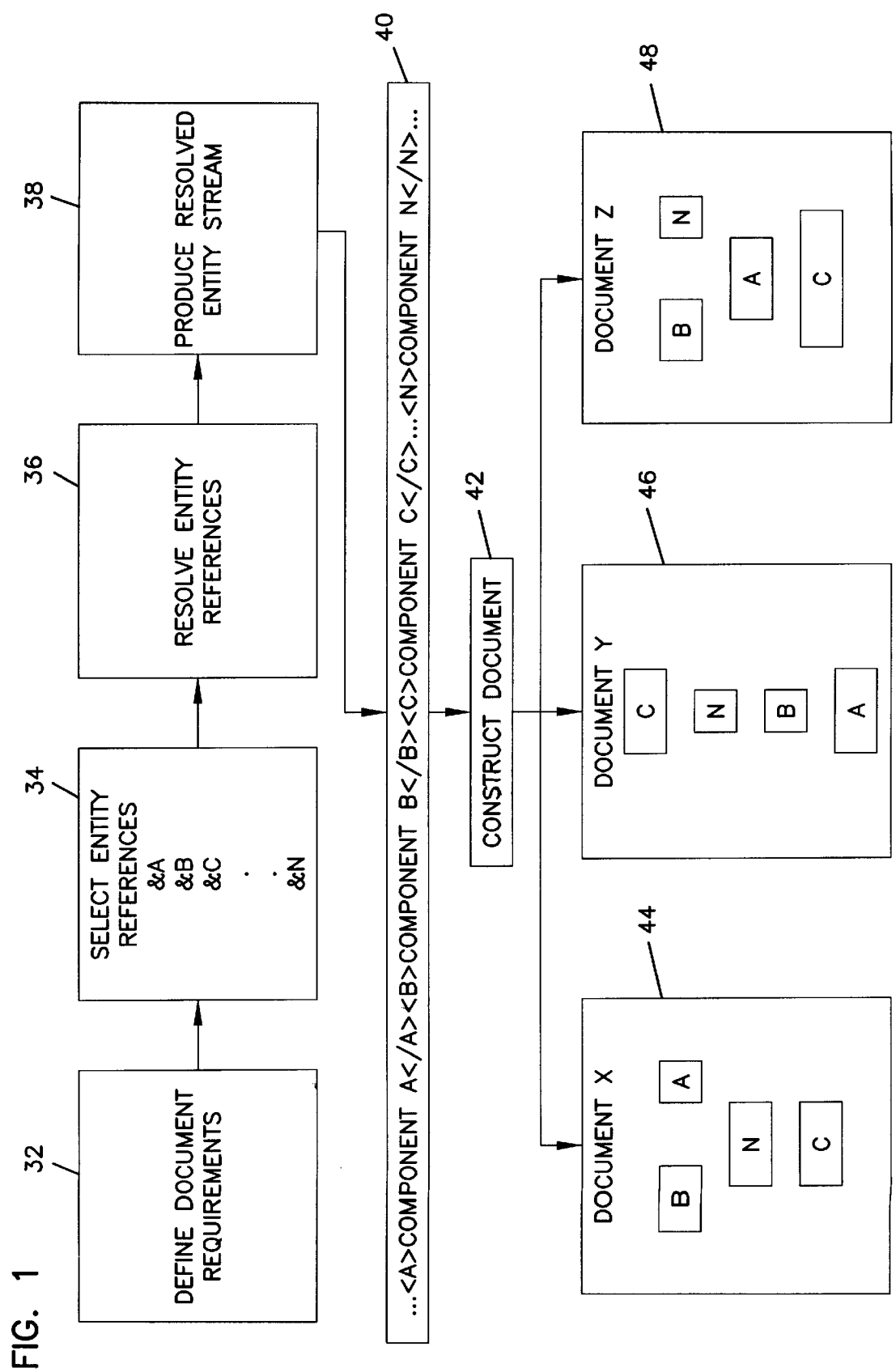
FIG. 1 is a depiction of one embodiment of the document production methodology of the present invention for producing a stream of validated components from which documents of varying type and style may be generated.

The term "SGML" refers to Standard Generalized Markup Language, which is an international standard for structured documents (ISO 8879). Defined formally by the standard as a language for document representation that formalizes markup and frees it of system and processing dependencies, SGML is a language for describing the structure of documents (or information) and for describing a tagging scheme to delineate that structure.

The term "DTD" is an acronym for "Document Type Definition" which is a formal SGML document declaration that begins with the keyword DOCTYPE, followed by the name of the base element (also called the top or containing element) of that document, which, in turn, is followed by the declaration subset which tells a system exactly what markup to expect.

A "tag" is commonly referred to as descriptive markup. A tag is a code that is inserted in a document to identify the information contained in a logical element of the document. Tags delimit (mark, surround, or enclose) an element in an SGML file. An SGML document generally contains both tags and text. Each tag contains three types of information: a start delimiter (usually "<" for an element start-tag and "</" for an element end-tag); the name of an element, and an end delimiter (usually ">"). Examples include: <tag>This is a tagged element.</tag>; and <paragraph>... Includes many sentences ... </paragraph>.

An "SGML Parser" is defined by the SGML standard as a program (or portion of a program or a combination of programs) that recognizes markup in SGML conforming documents. In terms of programming language processors, an SGML parser performs the functions of both a lexical analyzer and a parser with respect to SGML documents. That is, a parser validates DTDs against the rules of SGML and also checks a tagged document against the rules of its DTD. A parser that is able to read a DTD and to check whether markup errors exist and is able to report any existing errors is called a "Validating SGML Parser."

A "catalog" refers to an entity conforming to the SGMLOpen specification for catalogs. A catalog is a dictionary containing a number of entry pairs. Each entry pair in the catalog describes a resolution process or strategy for a specific entity reference.

A "catalog file" is an operating system (OS) file containing a catalog.

The term "catalog precedence" refers to a sequence of one or more catalogs. The catalogs in a sequence may be loaded from files or may exist only in memory. The catalogs are typically evaluated in order from front to back. There are methods described herein to push a catalog on the front of the precedence or on the back.

An "entity" is an item that can be referenced as a unit. Entities provide an easy and useful way of incorporating often repeated characters, strings of characters, characters not available on the keyboard or non-textual data such as images within a document or DTD. Entities also provide a means of incorporating separate units of information (graphics or external files, for example) that are stored externally into an SGML document at the time of processing.

An "Entity Manager" is a software service that resolves entity references. The Entity Manager controls Catalog Precedences and Catalogs, and is a peer of the SGML parser and the application.

An "instance" or "document instance" is a term used herein to refer to a sequential collection of data and markup characters organized to begin with an optional SGML declaration, followed by a document type definition (DTD), followed by the document instance conforming to the DTD.

A "component" or "text component" refers to one or more characters or words coded in ASCII. A component may be considered a text fragment usually no shorter than a sentence, and may include SGML markup.

A "Knowledge Base" is a term that refers to a collection of documents, document components, document type definitions, catalogs, rules, and links.

A "Storage Manager" is an access point to a storage domain. A primary objective of SGML-based systems is independence of information from a particular storage. The link between information and a specific storage domain is performed by a Storage Manager. A SystemID contains or implies the name of at least one Storage Manager. A Storage Manager is typically implemented as a Dynamic Link Library (DLL) that is linked to an Entity Manager.

Referring now to the Figures, and more particularly to FIG. 1, there is illustrated one embodiment of the document production methodology of the present invention. In accordance with this embodiment, a document developer initiates a document production session by defining the requirements of the document, as indicated at step 32. A document developer, for example, typically specifies the content that is to be included in a document in order to meet the objectives of the parties to a transaction, and to meet certain business, legal, and/or governmental rules and regulations. Each of the constituent portions of the document is associated with an entity reference which is selected by the document developer, as is indicated at step 34. At step 36, each of the entity reference associated with the document is resolved. A stream 40 of resolved entities or components is produced at step 38 at the conclusion of, or, alternatively, during the entity reference resolution process of step 36.

It is important to note that the entity reference resolution process of step 36 ensures that all business, legal, and governmental requirements applicable to a particular entity reference are duly satisfied. The resolution process thus produces content fragments having integrity by virtue of being compliant with one or more business, legal, or governmental requirements. At step 42, one or more of the components or fragments of the stream 40 are made available for constructing one or more documents having a desired structure and format style.

A significant advantage of the document construction methodology illustrated in FIG. 1 concerns the ability to integrate components selected from the stream 40 of components into SGML documents of varying types and styles. Document-X 44, for example, is shown as having been constructed using resolved and validated components A, B, C, and N in accordance with a first document structure and format style. Document-Y 46 and Document-Z 48 are shown as having been constructed using the same components A, B, C, and N to produce documents having differing structures and format styles. It is noted that other documents can be constructed using one or more of the components A, B, C, and N. It can be seen that any number of documents can be produced in accordance with desired structural and stylistic requirements, and published in printed or electronic form.

Figure 2:
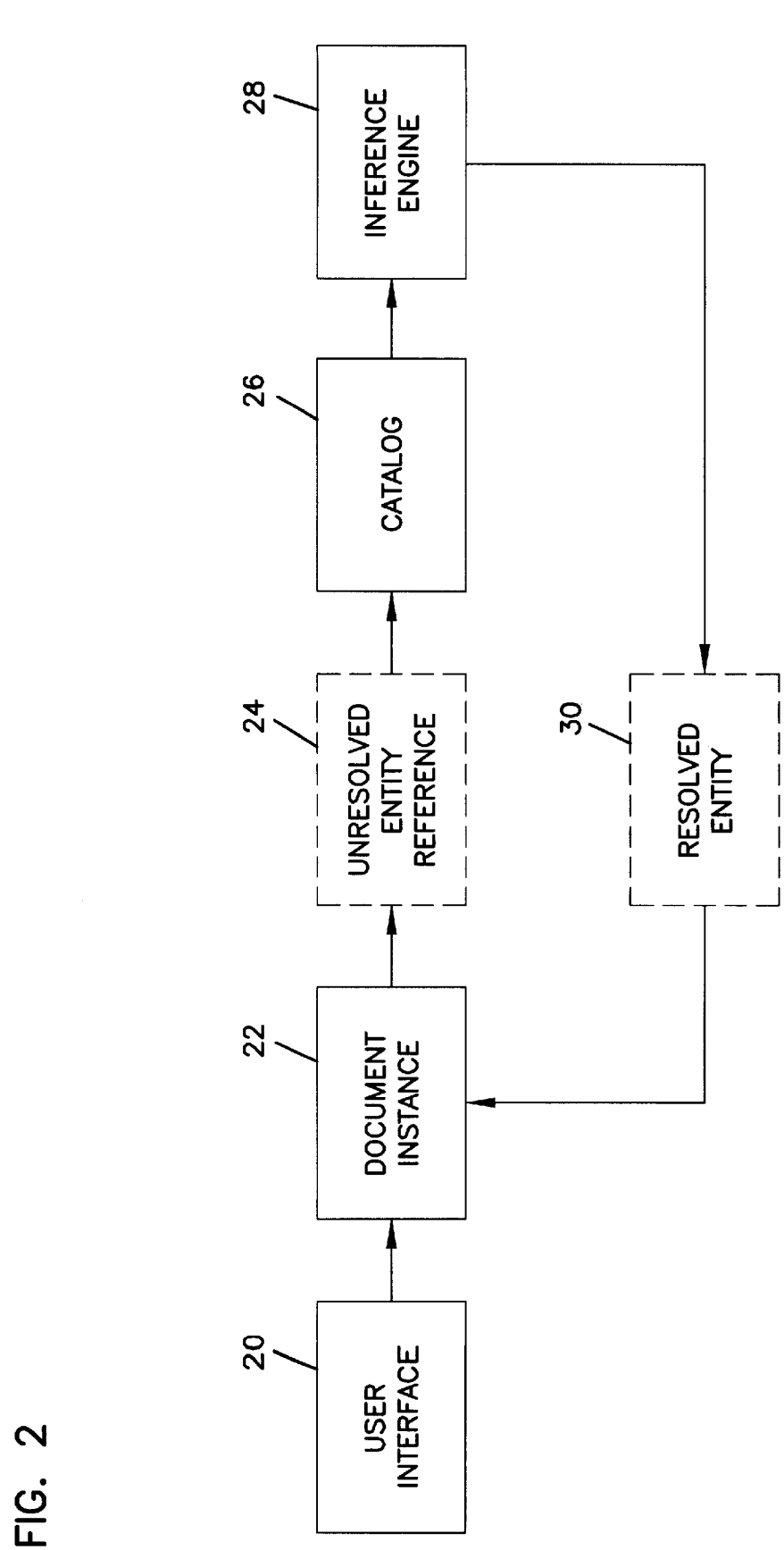
FIG. 2 is an illustration of a process by which entity references are resolved to corresponding validated components of the component stream shown in FIG. 1.

The block diagram of FIG. 2 illustrates one embodiment of an entity reference resolution process. A document developer interacts with a user interface 20 to select entity references representative of content to be included in a document. An unresolved entity reference 24 defined in a document instance 22, such as entity reference &A shown in FIG. 1, is initially compared against a Catalog 26 containing pairs of entity identifiers and associated resolution strategies. A comparison is made between the name of the entity reference to be resolved and the entity identifiers contained in the Catalog 26. Upon a successful match, the resolution strategy associated with the matched entity identifier in the Catalog 28 is effectuated by use of an Inference Engine 28. The Inference Engine 28 resolves the entity so as to return a resolved entity 30, also termed a component. Other unresolved entity references 24 contained in the document instance 22 are similarly resolved and typically organized as a linearized stream 40 of resolved entity references or components. Upon resolving all of the entity references contained in a document instance 22, a resolved document instance is thereby produced. A document of a desired structure and format style may then be produced as a printed or electronic document or form.

In one embodiment, a document developer constructs a document or form, such as Document-X 44 depicted in FIG. 1, by use of an SGML (Standard Generalized Markup Language ISO 8879) editing system. Those skilled in the art understand that SGML is a language for describing the structure of documents or information contained therein, and for describing a tagging scheme to delineate that structure within the text of the document. It is to be understood that other markup languages and document production technologies may be employed to effectuate the document construction methodology of the present invention. For purposes of explanation, and not of limitation, the apparatus and method of the present invention will be described herein generally within the context of the SGML standard, including various ancillary SGML capabilities. It is also to be understood that the principles, features, and advantages of the present invention will be described herein generally within the context of an object-oriented programming implementation, although other computer languages and techniques may be employed.

Figure 3:
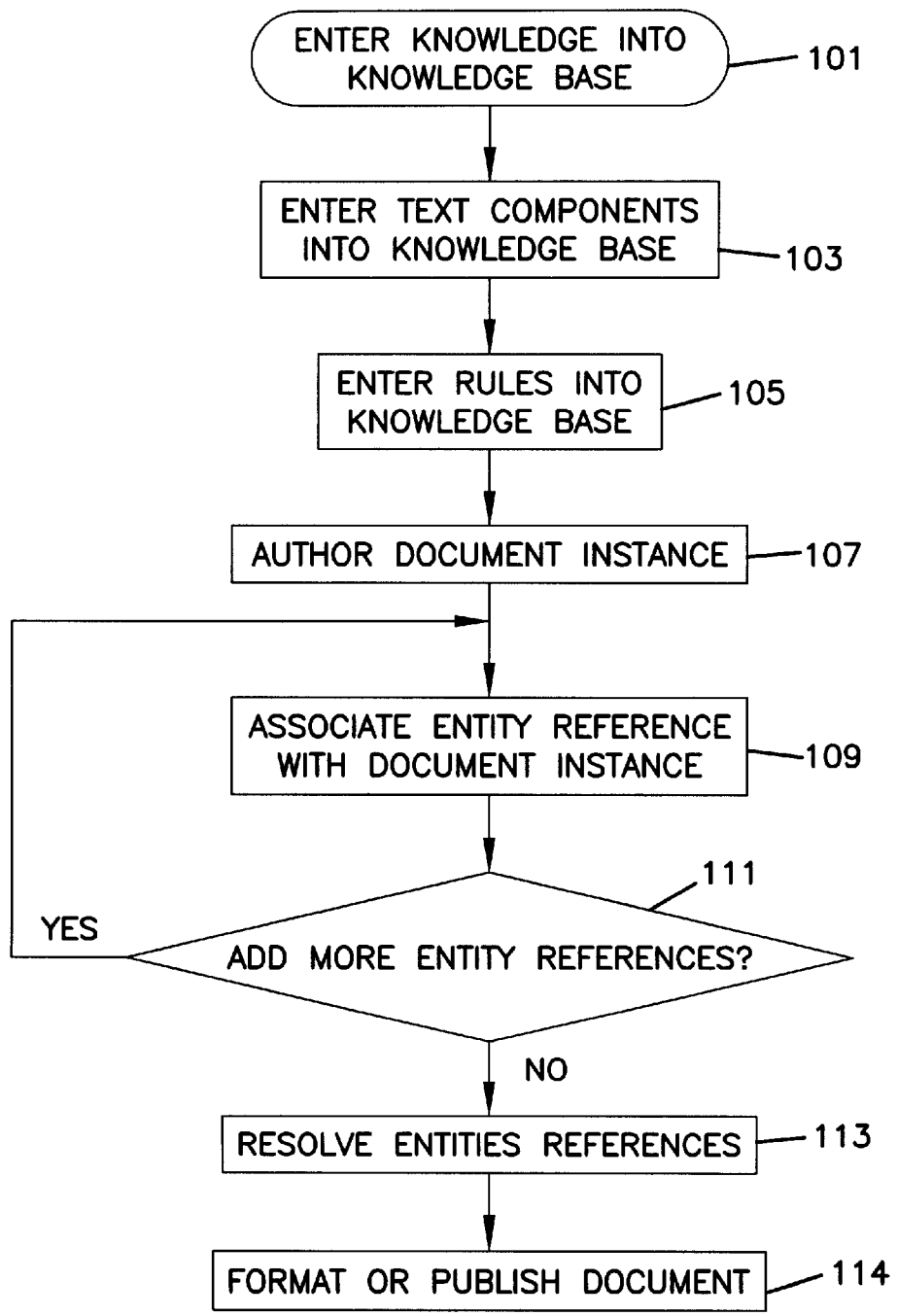
FIGS. 3 and 4 illustrate a method of dynamically constructing a document in accordance with ore embodiment of the present invention.
Figure 4:
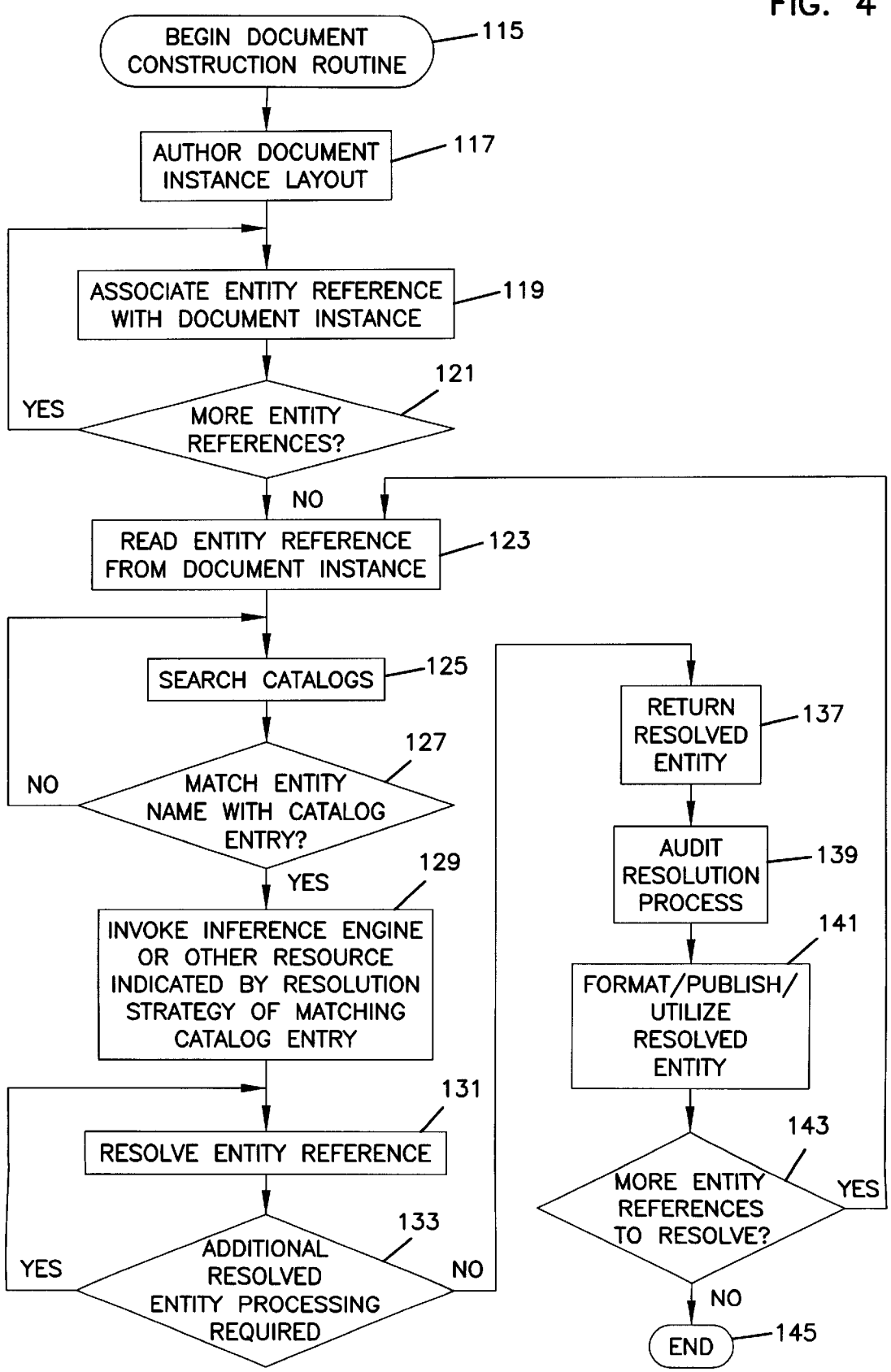

In FIGS. 3 and 4, there is illustrated in flow diagram form various steps involved in creating a document in accordance with the present invention. As is indicated at step 101, knowledge is entered into the Knowledge Base in the form of documents, document components, document type definitions, catalogs, rules, links, and other information needed to construct any number of document and form types. The constituent information contained in the Knowledge Base may include entire documents, portions of documents, phrases, sentences, words, and characters, including non-alphanumeric characters. The content of the Knowledge Base provides the resources needed to construct any type of document or form using the constituent information contained therein.

Knowledge is preferably entered into the Knowledge Base by a domain expert who is experienced in some field of domain of human knowledge. At step 103, the knowledge is entered into the Knowledge Base in units of text or text fragments referred to herein as components. At step 105, the rules that dictate the access and utilization of components are also entered into the Knowledge Base. A document developer and/or user develops a document instance typically by use of a text editor at step 107. The document developer selects one or more entity references to develop a document instance at steps 109 and 111. At step 113, each of the entity references associated with the document instance are resolved. The document components corresponding to the resolved entity references are made available as a stream of resolved entities or components which may be incorporated into a final document. At step 114, one or more documents containing any number of resolved entities or components may be constructed and formatted in accordance with a specific presentation style and published in printed or electronic form.

In FIG. 4, there is illustrated in greater detail one embodiment of the dynamic document construction capability of the present invention. At step 115, the document construction routine is initiated. At steps 117, 119, and 121, the document developer authors a document instance and associates entity references with the document instance in the manner described hereinabove. During the dynamic document construction procedure, an entity reference is read from the document at step 123. One or more catalogs are searched at step 125 in order to match the entity reference with a corresponding entity identifier stored in a catalog. It is noted that more than one entity identifier and corresponding resolution strategy may be stored in one or more of the catalogs. It is desirable that the resolution strategy of the first matching entity identifier in a catalog be executed.

If, as is tested at step 127, the entity reference is matched to a corresponding entity identifier in the catalog, the resolution strategy associated with the matching entity identifier is implemented at step 129, such as by invocation of an Inference Engine. At step 131, the Inference Engine or other resource resolves the entity reference. In some cases, an entity reference that has been resolved may include one or more entity references which require resolving. In such a case, as is tested at step 133, any remaining unresolved entity references that are nested within the resolved entity reference are resolved at step 131.

Upon resolving the first entity reference read from the document, as well as any nested entity references embedded therein, the resolved entity is returned and made available for incorporation into a document in the form of a corresponding document component at step 137. Each of the resolution steps discussed hereinabove is preferably audited, as indicated at step 139, and audit information is stored in an Audit Log for subsequent access. At step 141, the resolved entity may be formatted in a particular manner, published, or otherwise utilized in the document construction routine. It is noted that the format style of the document, as well as any of the document components corresponding to the resolved entity references, is typically determined after completing the resolution process, but may alternatively be determined during the resolution process. Upon completing the resolution process for the first entity reference read from the document, as is tested at step 143, all remaining entity references associated with the document are resolved by repeating the steps beginning with step 123. The document construction routine is terminated at step 145.

Figure 5:
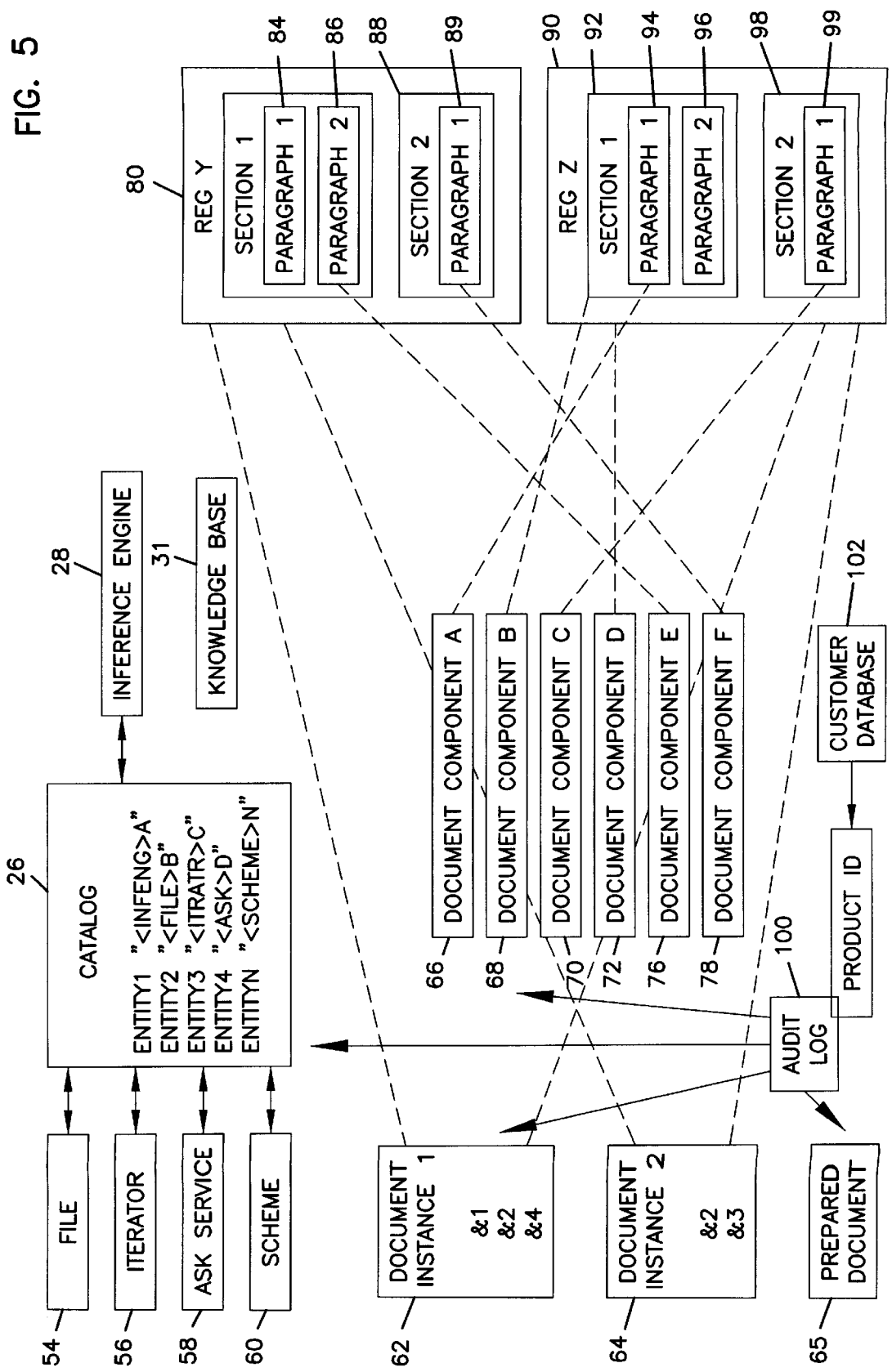
FIG. 5 is a depiction of an embodiment of the document production methodology of the present invention showing various links established between a document, entity references, and document components derived from various information sources.

Turning now to FIG. 5, there is illustrated in block diagram form a depiction illustrating the methodology by which a document is dynamically constructed in accordance with one embodiment of the present invention. A document, such as document instance-1 62 or document instance-2 64, may be defined from text and graphical components accessed from a Knowledge Base 31. As previously mentioned, the Knowledge Base 31 further includes various document type definitions (DTDs), catalogs, rules, and links. In the embodiment illustrated in FIG. 5, the Knowledge Base 31 is defined to include document components A through F, which, in turn, are linked to a business or governmental regulation source, such as regulation-Y 80 or regulation-Z 90. Also illustrated is a Catalog 26 within which is stored pairs of entity identifiers (component identifiers) and corresponding entity reference resolution strategies. Entity 1 stored in the Catalog 26, for example, is associated with an entity resolution strategy that is implemented by a Store Manager named INFENG, which is a short form of the name Inference Engine. The document instance-1 62 is defined to include entity references &1, &2, and &4. During the document construction procedure, the entity reference &1 is read from the document instance-1 62 and compared against the entries of the Catalog 26. A match is determined between the entity reference &1 and the ENTITY 1 identifier stored in the Catalog 26. The reference to INFENG in the associated resolution strategy indicates that entity reference &1 is to be resolved by employment of an Inference Engine 28. The Inference Engine 28 resolves entity reference &1 to document component-A 66 which is linked to paragraph-1 94 of regulation Z-90. The content of regulation-Z 90 may then be incorporated into a final document 65 by referencing document component-A 66.

By way of further example, the entity reference &2 of the document instance-1 62 is resolved by comparing entity reference &2 with the entity identifiers stored in the Catalog 26. Matching entity identifier ENTITY 2 indicates that entity reference &2 is to be resolved by implementing the Store Manager named FILE 54. The Store Manager FILE 54 resolves entity reference &2 by returning document component-B 68 which is linked to a file containing section-1 92 of regulation-Z 90 as. The content of section-1 92 of regulation-Z 90 may then be incorporated into a final document 65 by referencing document component-B 68.

As will be discussed in greater detail hereinbelow, a particular entity reference of a document instance can be resolved by one or more Storage Managers of varying types. The Store Manager identified as ASK SERVICE 58, for example, may request a particular input from a user by presenting a visual or audible question to the user during the resolution process. The input received from the user, which may be validated, is received and incorporated as the resolution of entity reference &4 of document instance-1 62. Further, the Store Manager identified as SCHEME 60 resolves an entity reference by use of artificial intelligence techniques, such as by use of an expert system. The entity reference &3 contained in document instance-2 64 is resolved by means of an ITERATOR Store Manager 56 which, as described more fully hereinbelow, provides for dynamic construction or replication of a portion of a document, such as additional signature blocks needed to accommodate a co-signer, and incorporation of the constructed portion into the document at run-time. It will be appreciated that information resources other than the Store Managers identified in FIG. 5 may be employed to resolve entity references associated with one or more document instances. Upon resolving all of the entity references contained in a document instance, a prepared document 65 may then be produced. The prepared document 65 may be published as a printed form, an electronic form, or a Web or Internet form, for example.

An important aspect of the present invention concerns an Audit Log 100 within which is stored audit information concerning each document 65 prepared by use of the dynamic document construction methodology of the present invention. The information contained in the Audit Log 100 includes the entity references resolved in the document, the means by which each entity reference is resolved, and the document component corresponding to the resolved entity reference. In the illustrative example shown in FIG. 5, it can be seen that the document instance-1 62 is linked to regulation-Y 80 and regulation-Z 90. When resolving the entity references &1, &2, and &4 of the document instance-1 62, the implicated Storage Managers Inference Engine 28 (INFENG), FILE 54, and ASK SERVICE 58 returned document components A 66, B 68, and D 72, respectively. As such, paragraph-1 94 of regulation-Z 90 is linked to the document instance-1 62 by the document component-A 66. Section-1 92 of regulation-Z 90 is linked to the document instance-1 62 by the document component-B 68.

Further, it can be seen that regulation-Z 90 is linked to the document instance-1 62 by the document component-D 72. The Audit Log 100 will thus contain information concerning all components, information sources, and other linking information concerning the resolution of entity references associated with the resolving of a particular document instance. It can also be seen that all of the document components and document instances that incorporate in whole or in part a particular information source, such as regulation-Y 80, can also be determined. The links established between the various document components, document instances, and information sources can be navigated by use of the information contained in the Audit Log 100. As such, a prepared document 65, which is typically identified by a product ID for a particular customer, can be fully interrogated as to the creation of, or revision to, any of the resolved entities and components constituting the prepared document.

Figure 7:
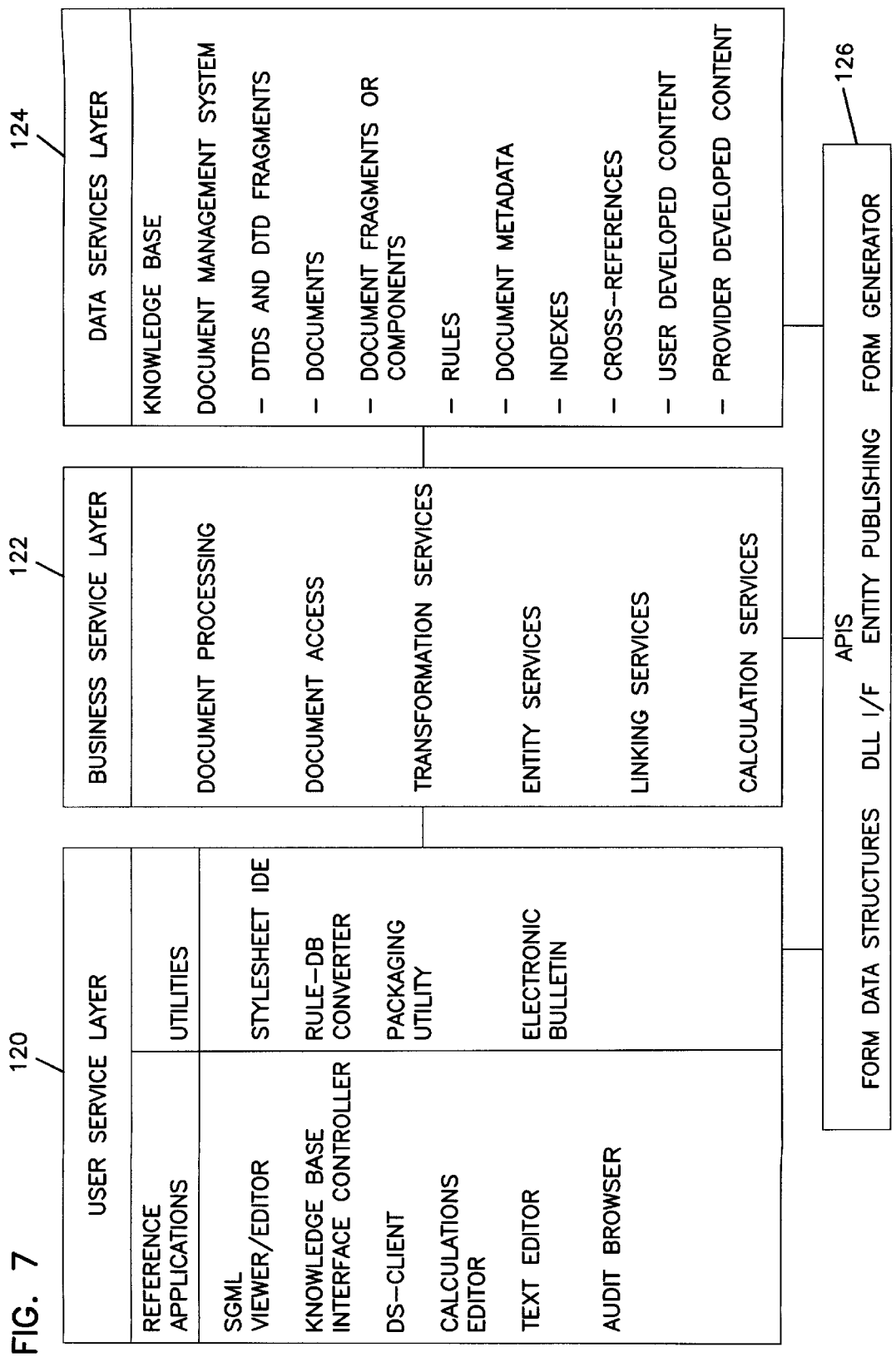
FIG. 7 is a service model representation of one embodiment of a dynamic document construction methodology.
Figure 8:
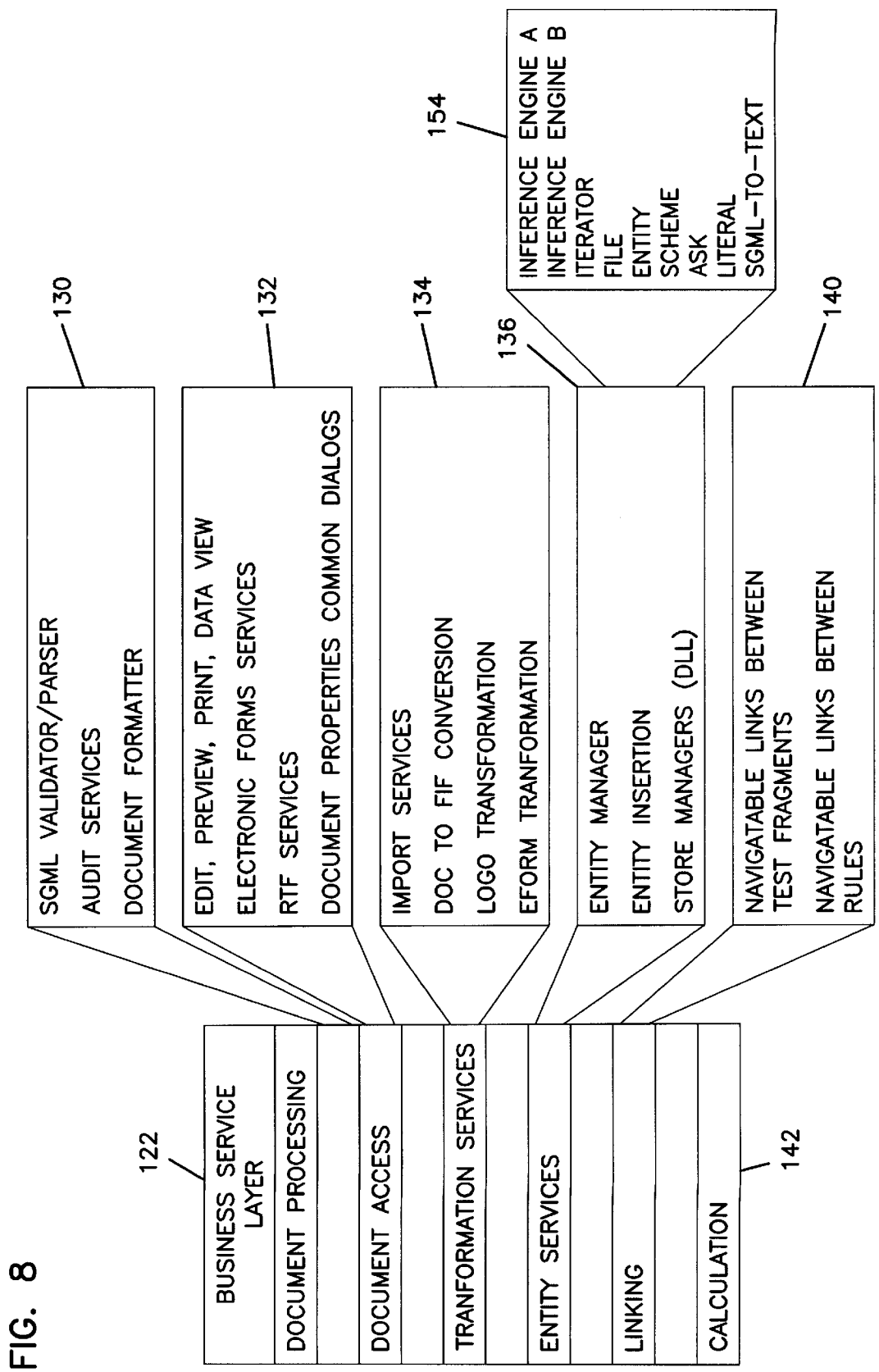
FIG. 8 is a detailed depiction of various services provided in the business service layer of the service model illustrated in FIG. 7.

In FIGS. 7 and 8, there is provided a service model view of one embodiment of the present invention. The service model illustrated in FIGS. 7 and 8 is a useful way of viewing applications as a set of features or services that are used to fulfill user requests. The User Service Layer 120 includes various reference applications and utilities that provide for the presentation of information and functionality, navigation, protection of user interface consistency and integrity. A Business Service Layer 122 includes services that provide for shared business policies, generation of business information from data, and protection of business integrity. A Data Services Layer 124 provides for the definition of data, storage and retrieval of data, and protection of data integrity. The interfaces between the User, Business, and Data Service Layers 120, 122, and 124 are preferably published as APIs (Application Programming Interfaces), thus enabling external users of the system to extend or replace functionality by developing their own services.

The services shown in FIGS. 7 and 8 are preferably networked together and operate cooperatively to support one or more business processes. In accordance with this model, one or more applications which can concurrently utilize the various services of the model can be viewed as a collection of User, Business, and Data services that meet the needs of the business process or processes it supports. Because the services shown in FIGS. 7 and 8 are preferably designed for general use and follow published interface guidelines, they can be re-used and shared among multiple applications. Selected services from each of the User, Business, and Data Service Layers 120, 122, and 124 can be packaged in various forms to meet particular system and end-user requirements.

Figure 10:
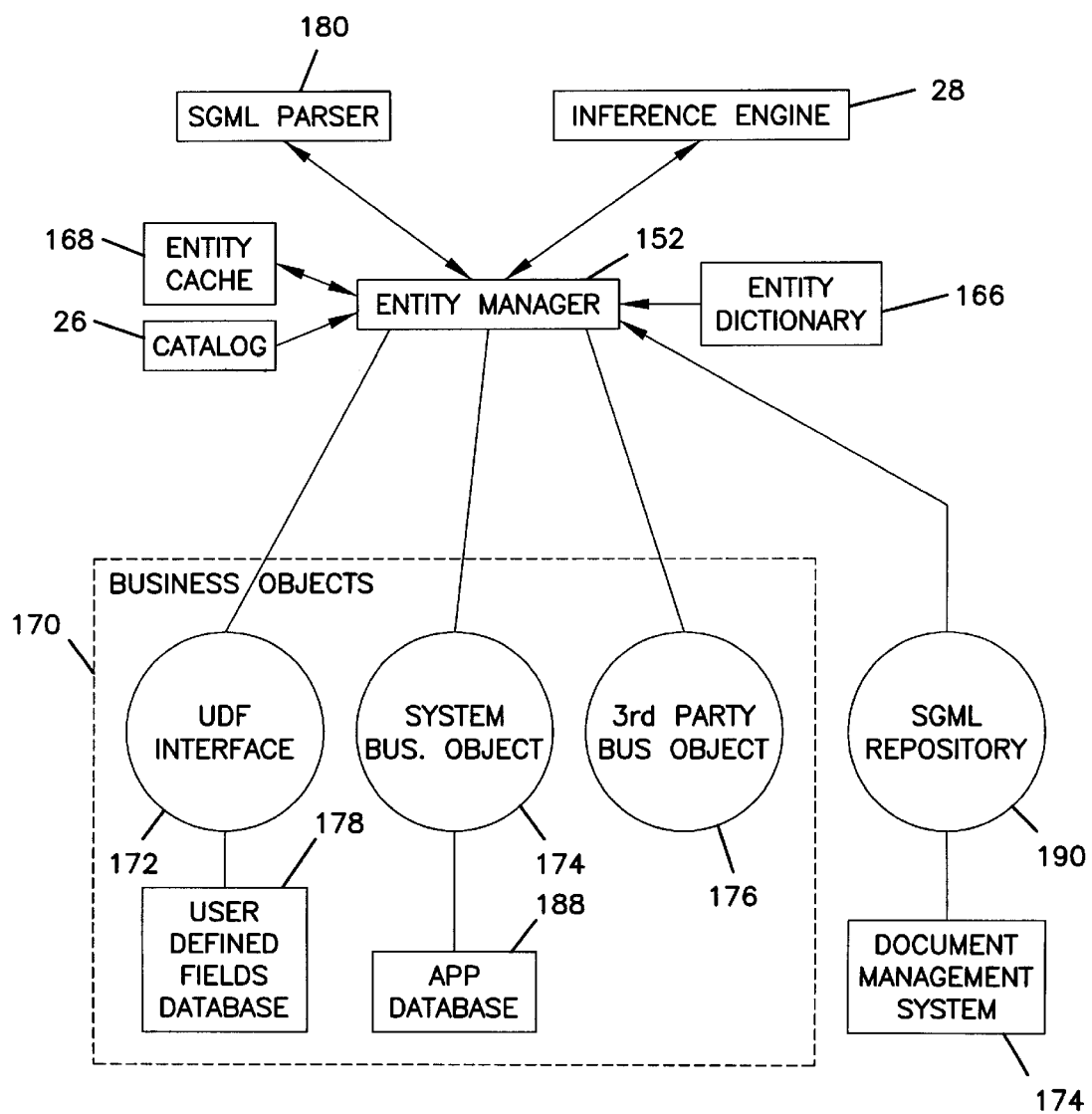
FIG. 10 is a detailed block diagram of a portion of the apparatus illustrated in FIG. 9C.
Figure 11:
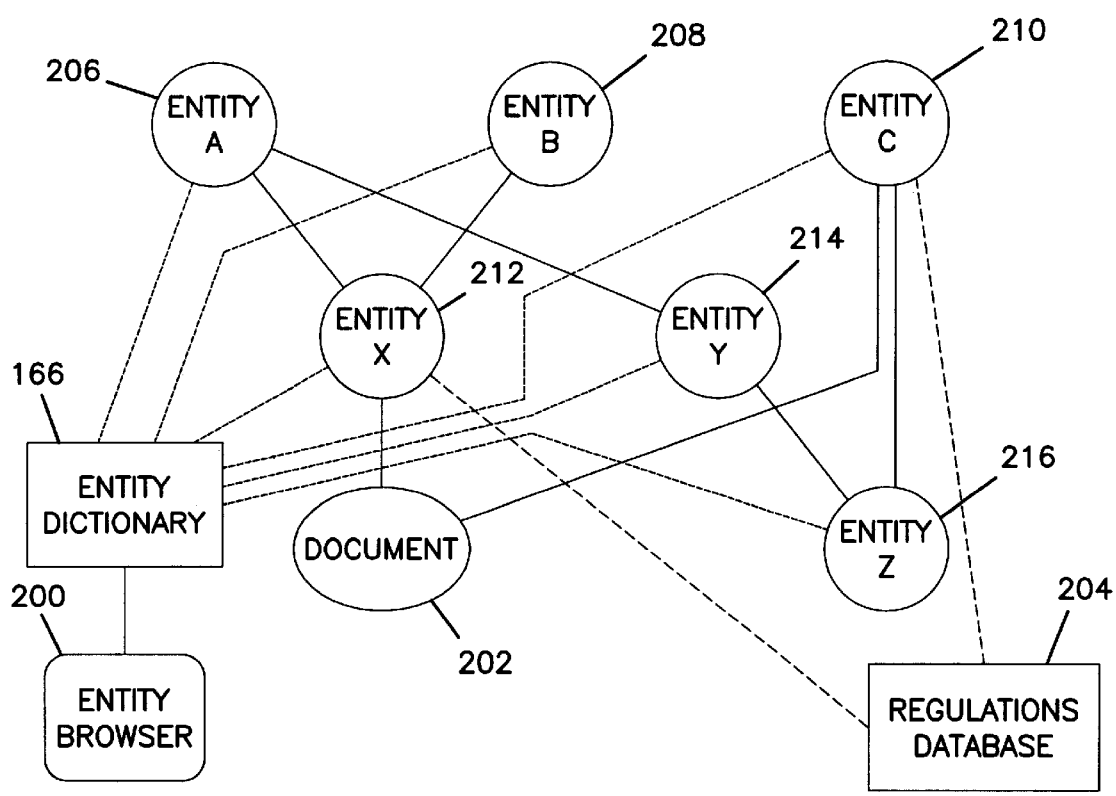
FIG. 11 illustrates linking between documents, regulations, and entities which provides for enhanced entity resolution auditing and compliance tracking.
Figure 12:
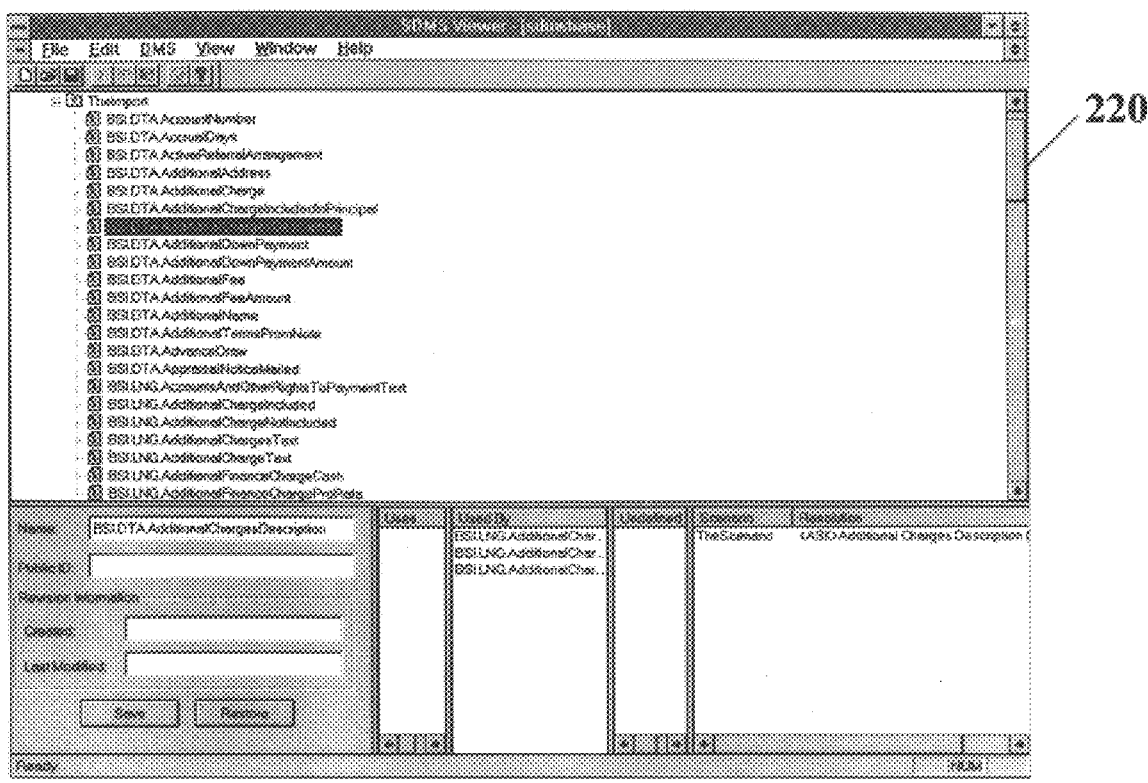
FIG. 12 is an illustration of the main user interface window of an SGML Viewer/Editor.

Referring in greater detail to FIGS. 7–14, it can be seen that each of the User, Business, and Data Service Layers 120, 122, and 124 include a number of services having features that will now be summarized in brief. With regard to the User Service Layer 120, knowledge components may be entered into the Knowledge Base 31 by a domain expert through use of an SGML Viewer/Editor, shown generally as user interface 20, a Knowledge Base Interface Controller (KBIC) 176, or Import Service 178. Knowledge is stored and managed by the Document Management System (DMS) 174. The SGML Viewer/Editor 20 is a front end to the SGML Document Management System (DMS) 174. It may be employed to assist authors in creating and testing document components. It is particularly well-suited to authoring and navigating links between components, such as between a unit of text targeted for a document and a unit of text that is part of or represents a regulation. The main window 220 of SGML Viewer/Editor 20 is illustrated in FIG. 12.

The SGML Viewer/Editor 20 is also used as a communications medium between document engineers and application developers. It allows document authors and engineers to record information about document entities and application developers to record information about the resolution of those entities. It provides the resources to store tester responses in objects called scenarios. Scenarios can be modified, subclassed, and executed from the SGML Viewer/Editor 20. It will allow the user to construct queries that navigate links in any direction. For example, the user could determine all regulations impacting a given document, or the user could determine all components impacted by a given regulation. Further, all documents using those components could be identified, as well as all user products based on those documents.

Figure 13:
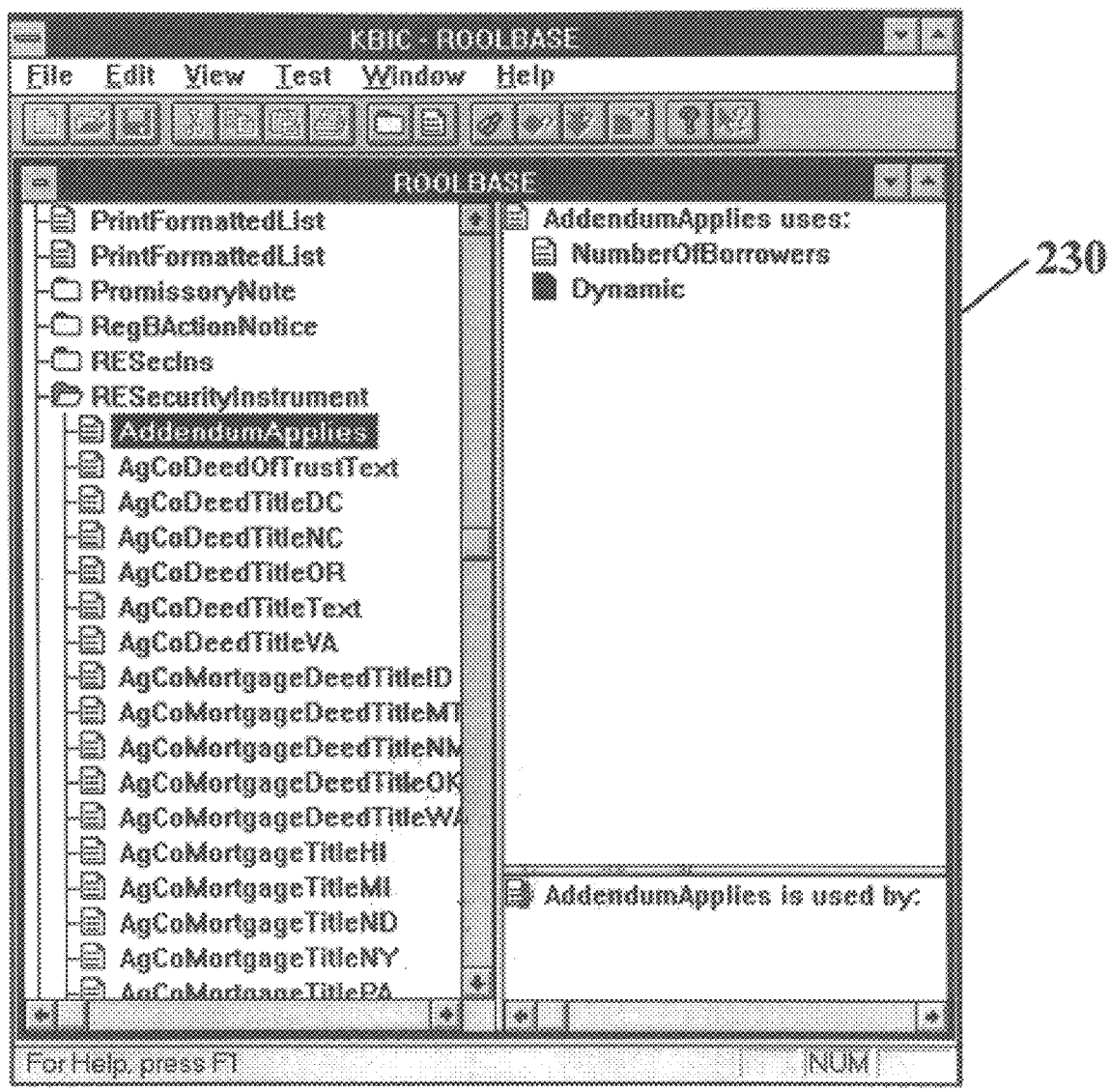
FIG. 13 is an illustration of the main window for interfacing with a Knowledge Base Interface Controller (KBIC)

The Knowledge Base Interface Controller (KBIC) 176 is an interface to the rule validation and storage facilities. The main window 230 of Knowledge Base Interface Controller 176 is shown in FIG. 13. This tool is used to select a rule from the Knowledge Base 31, inspect its properties, edit and test it. It interfaces with Knowledge Services and the DMS 174.

Figure 14:
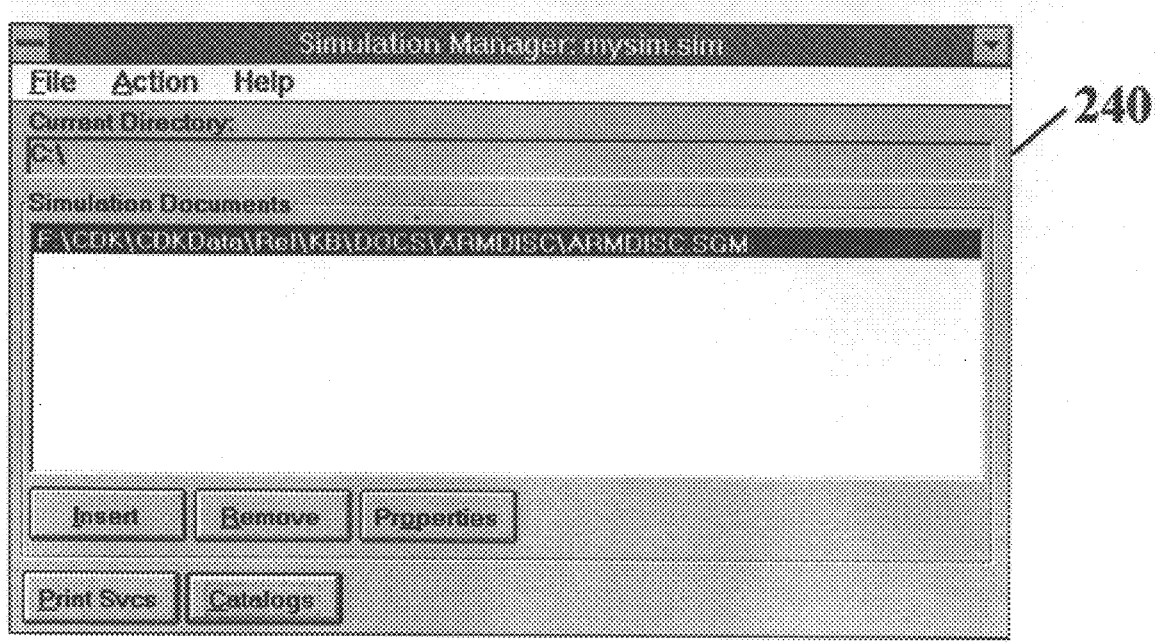
FIG. 14 is an illustration of the main user interface window of a Document Services Client (DSClient), which is a tool that simulates an application during document and rule development.

A Document Services Client (DSClient) is a tool that simulates an application during document and rule development. It is a client interface to all document resolution and formatting services. The main window 240 of DSClient is shown in FIG. 14. Through the DSClient interface, a document developer can create an environment of SGML catalogs, specify a set of SGML document instances, name the output files, and perform resolution, formatting, preview, and print functions on a document instance. The DSClient allows developers to simulate all parts of the document production process, from install through configuration to document generation.

Figure 18:
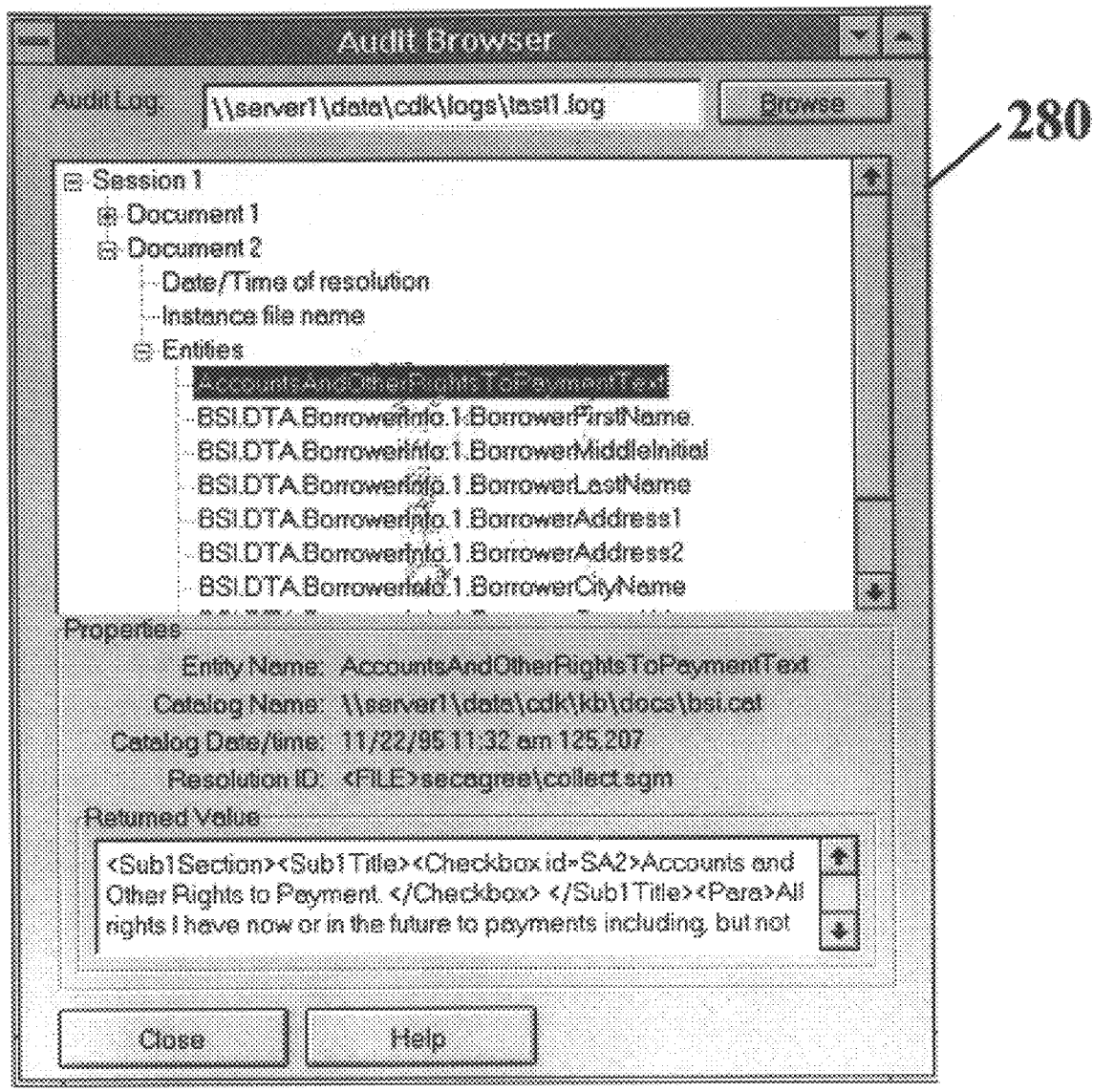
FIG. 18 illustrates the main window of an Audit Browser that enables a user to interrogate entities and links between entities and documents.

An Audit Browser 280, shown in FIG. 18, provides access to information in Audit Logs 100 provided through the Auditing Service 156. Individual Audit Logs 100 and other objects can be extracted or deleted, and annotations can be added. The Audit Browser 280 presents a tree view of a selected Audit Log. The entities in the source document instance are represented as first level nodes in the tree. Since resolution of any entity can involve the resolution of many other entities, the firing of rules, and the resolution of Marked Section Control Entities, discussed hereinbelow, the audit records of those resolutions are made available by expanding the appropriate node.

Figure 15:
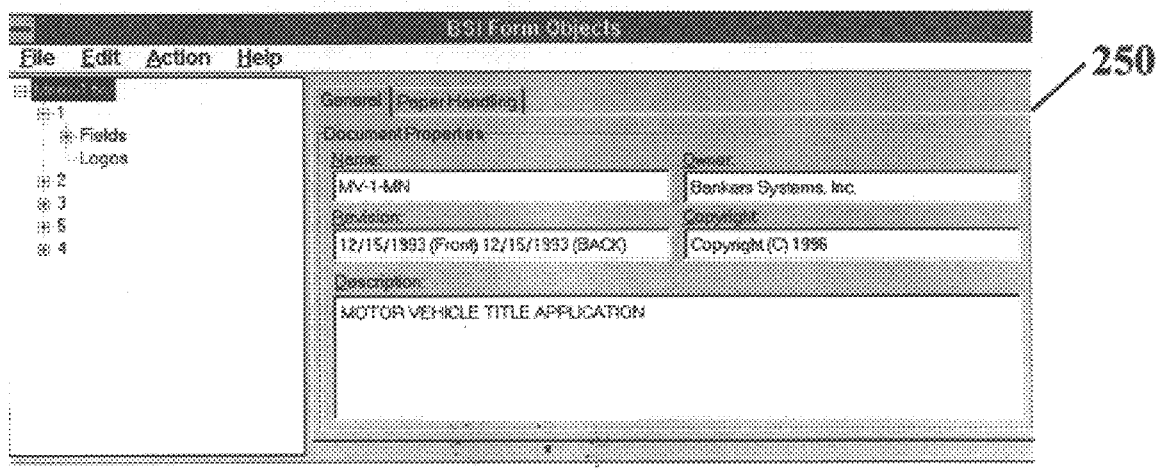

A Business Forms Object (BFO) Processor provides an electronic forms development environment that permits a document author to create and program electronic forms. The BFO Processor can read existing files of varying formats and establish document, page, and field attributes for a BFO. It is able to process large sets of electronic form files in unattended or batch mode. For example, it can be set to create BFO files of all of the files in a particular subdirectory. The BFO Processor can be used to edit BFO properties, allowing the user to place and name electronic form fields. The BFO Processor can produce SGML control instances which, as described in detail hereinbelow, are a special kind of document that is used to prepare the merge data for an electronic form. The main window of the BFO Processor 250 is shown in FIG. 15.

The BFO Processor 250 is an OLE custom control that makes electronic form methods, properties, and events available to Visual Basic® and other OCX clients. It provides a merge facility to place client data on an electronic form. This facility allows the client to modify field attributes at run-time. It also provides for word wrapping of text across multiple lines and will accommodate text overflow beyond field boundaries. Client access to a preview display for electronic forms is also provided. The user can select pages for printing, select a printer, and print the document without leaving the preview display. Forms-based data collection is made available during view/print such that selected fields are input-capable. Additional features of the Electronic Forms Custom Control include field export and form validation functions, providing client access to the data entered on-screen, and previewing of raw PCL (Hewlett-Packard Printer Command Language) files. In field edit mode, the user can manually create, place, and describe fields for merge data or on-screen data collection. The user can set attributes of fields so that certain fields are input-capable while other fields are not. The user or client can select and place a bitmap or Windows metafile for use as a logo.

A Stylesheet Interactive Development Environment (IDE) is used to create and validate document formatting rules. The Stylesheet IDE operates in conjunction with other document services to test the formatting rules. In one embodiment, the Stylesheet IDE is a visual interface for creating Scheme code. Scheme is an ISO standard artificial intelligence language in which formatting rules will be expressed. The Stylesheet IDE is intended to be used in conjunction with commercial text editors, and one or more editing and testing tools, such as the SGML Viewer/Editor 20, KBIC 176, and/or DSClient.

An Electronic Bulletin is an interactive tool that can be used by a customer to search their Knowledge Base for documents or changes the customer may have made to meet certain criteria. If the criteria are met, the Electronic Bulletin can prepare a report on the actions the customer should take to remain in compliance with regulations and policies that impact the document. Since the customer can modify their Knowledge Base in several ways, such as by altering or adding text, catalog entries, or by establishing institutional policy to include or ignore certain Knowledge Base components, the Electronic Bulletin allows the customer to analyze whether such modifications impact document compliance with regard to regulatory and institutional policy rules and mandates. In one embodiment, the Electronic Bulletin is constructed so that the customer can acquire it interactively, such as by use of the Internet.

A Document Formatter 170 is a service that applies formatting rules to resolved SGML documents. Formatting rules are developed in sets called formatting stylesheets. The technology is based on Scheme, and implements a subset of the ISO Standard called DSSSL (Document Style Semantics and Specification Language, ISO DIS 10179). The DSSSL ISO Standard addresses the need for detailed, typographically sophisticated specification of layout and composition in a manner that is independent of particular formatting systems or processes, as well as independent of the display medium. As a document instance is parsed, the formatting rules from the selected stylesheet are attached to the document, creating a Scheme program. When parsing is complete, the Scheme program is executed. The outcome of the Scheme program is the desired transformation. For example, an RTF (Rich Text Format) formatting stylesheet would result in a Rich Text Format file that could be imported into a word processor for preview and printing. The Document Formatter 170 can create RTF sequences that enable the formatted document to be processed in a form useable by commercial word processors. RTF Services are used in conjunction with the Document Formatter 170 to provide access to field editing. The Document Formatter 170 can also produce transformed SGML documents, such that an original SGML document is transformed into another SGML document.

In one embodiment, RTF Services are a set of templates and macros for Microsoft® WordMS-Word is used to preview RTF files. The RTF output produced by the Document Formatter 170 references a pre-established template. When MS-Word is invoked to import and display the RTF file, macros in the template protect the document from arbitrary modification by the user. Document editing in MS-Word is permitted. Data objects that are candidates for editing are formatted as RTF fields. Those fields could represent transaction data or could also be whole paragraphs or sections of the document. When those fields are edited, various scenarios are possible, including: the field macro in the underlying template invokes a function published by the client via an API; the field macro invokes an application, which presents a dialog to capture the user changes; and the user is allowed to edit the data and an audit identifier is printed on the document, thereby encoding the nature of the edit.

Another RTF Service is an MS-Word macro that will align all identified fields on a page to an imaginary six lines per inch grid. This function is used in the dynamic creation of static forms, since end-users often require that preprinted forms be adaptable to "typewriter-like fill-in." There are two aspects to the service. First, when the RTF is created by the Document Formatter 170, the fields have to be identified with uniquely named bookmarks. Second, after the RTF is imported into MS-Word, a macro will find and align the bookmarks.

Figure 17:
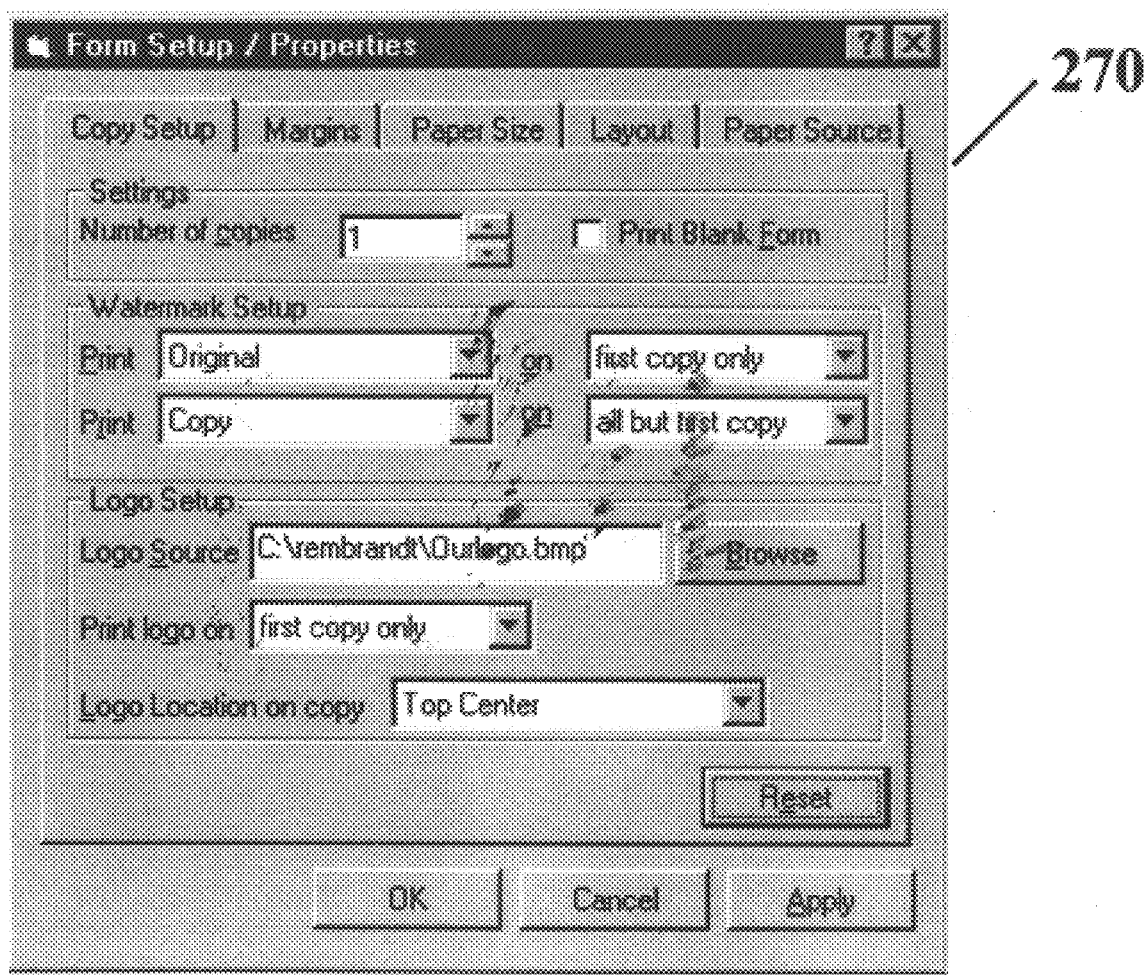

Document Properties are a set of dialogs, such as that shown in FIG. 17, that allow clients to provide user access to such document properties as margins, base font and point size, page orientation, and paper size. The common dialogs can notify the user if certain changes would not be compliant. For example, there may be a legal requirement for a certain sized top margin on the first page of a document. Both the legal requirement and the specific value are determined via the Entity Manager 152. If the user requests a smaller-than-legal top margin, a warning message is displayed, but the selection is allowed. These dialogs may be used as part of a print sequence, or may be used during a configuration activity to establish common settings for documents of a given type.

Transformation Services 134 are used to convert documents from one format to another. The services represented in FIG. 8 are provided as a non-exhaustive list of possible conversion services. Import Services, for example, are services used to import text from 'foreign' sources into the Knowledge Base 31, and enable authors to develop knowledge remotely, then import and synchronize that knowledge with the Knowledge Base 31. The DOC to FIF Service is an MS-Word macro that can create a JetForm Field Interchange Format (FIF) file that fully describes a document that has been imported into MS-Word from a Rich Text Format (RTF) file. The FIF file can then be imported into JetForm Design and compiled into a JetForm MDF file. The Logo Transformation Service is a facility to create bitmaps of any arbitrary resolution from EPS files. This utility is often necessary because EPS files are vector images that can be rendered at any resolution. The Eform Transformation Service operates in conjunction with the BFO Processor to create electronic forms in arbitrary formats, such as the .UFF format from Consolidated Business Forms and the JetForm .MDF format.

Entity Services 136 are those services involved in the resolution of entity references. The Entity Insertion service creates entity resolution entries in SGMLOpen-compliant catalogs. The Entity Manager service and its associated Storage Managers uses the information in those catalogs to determine what text or other value should replace any arbitrary entity reference. The Entity Manager 152 is a facility for entity resolution based on the SGMLOpen specification for catalogs. The APIs of the Entity Manager 152 allow clients to modify or override error handling, create and register new Storage Managers 154, and create and register Catalogs 26. The client application can access Entity Manager 152 directly or through the SGML Parser/Validator 150. Client applications can access Catalogs 26 via the Entity Insertion service. Other services must generally be accessed through the Entity Manager interface. The Entity Manager 152 is implemented following the SGMLOpen and HyTime Corrigendum model for catalogs and storage managers. The model allows an arbitrary number of catalogs to be loaded. An entity reference is resolved by searching the catalogs in order for a matching entry. The first entry found is used. The entry specifies the Storage Manager 154 used to resolve the entity reference, along with information to be passed to the Storage Manager 154.

Figure 9A:
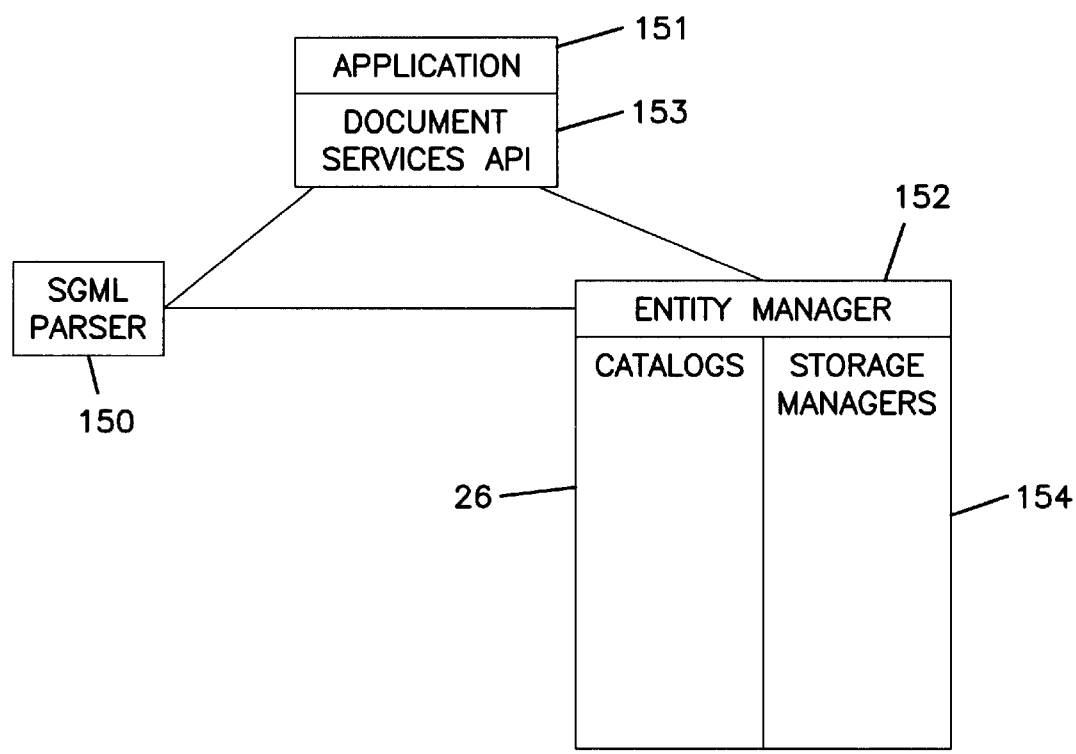
FIG. 9A is a diagram showing the major elements of one embodiment of a dynamic document construction apparatus.
Figure 9B:
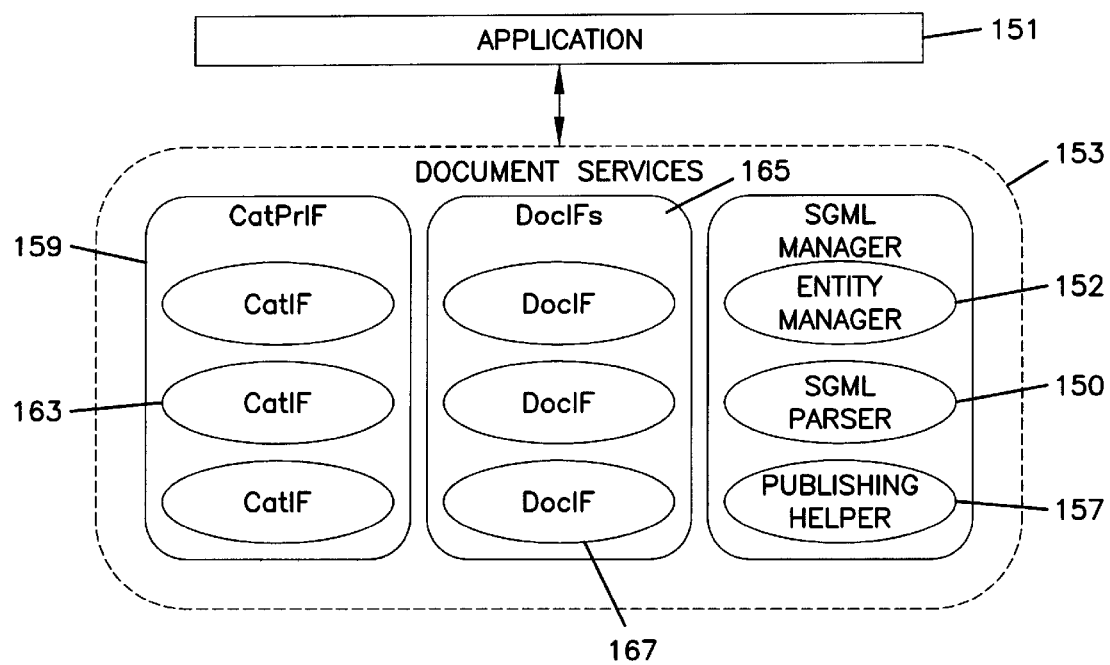
FIG. 9B is a more detailed illustration of the diagram of FIG. 9A.

A high-level diagram of one embodiment of the dynamic document construction apparatus of the present invention is shown in FIGS. 9A and 9B. Within the context of an object-oriented programming implementation, Document Services 153 encapsulates the APIs between a client Application 151, the SGML Parser 150, and the Entity Manager 152, which includes or interacts with one or more Catalogs 28 and Storage Managers 154. The Document Services objects, which are described in detail in Appendix I, publish classes for manipulation of an SGML environment, for resolution of entity references and/or documents, and for previewing and printing documents. Also described in Appendix I are the classes associated with the SGML Parser 150, the Entity Manager 152, the Catalogs 28, and the Storage Managers 154.

In order to provide a better understanding of the advantages and features of the present invention, a more detailed discussion of the methodology by which entities are defined, resolved, and utilized when dynamically constructing static and dynamic documents is provided. For purposes of clarity, the term entity is used interchangeably with the term component or text component. An entity may be a string of characters or a whole file of text. An entity may also comprise non-ASCII characters and graphics. In order to include an entity or text component in a document, a construction termed an entity reference is used. For example, the following entity declaration:

<!ENTITY BSI "Bankers Systems, Inc."> defines an entity having a name BSI and a value defined as the character string "Bankers Systems, Inc." This representation is considered an instance of an entity declaration, which declares an internal entity. The following declaration, by contrast, declares an external entity:

<!ENTITY ChapTwo SYSTEM "sgmlmkup.txt">.

This declaration defines a system entity having a name ChapTwo and a value defined as the text associated with the system identifier. In this example, the system identifier is the name of an operating system file, sgmlmkup.txt, and the replacement text of the entity is the contents of the file.

After an entity has been declared, it may be referenced anywhere within a document. This is accomplished by supplying the entity name prefixed with the ampersand (&) character and followed by the semicolon character. For example, the entity definition:

<para>(C) &BSI;</para> resolves to:

<para>(C) Bankers Systems, Inc.</para>.

It may be desirable, for example, to construct a paragraph of a document such that a list of remedial actions available to a creditor may be extended as needed. As is shown in the following exemplary declaration, a nested entity reference can be embedded to facilitate document extension:

<Para>The creditor can collect this debt from you without first trying to collect from the borrower. The creditor can use the same collection methods against you that can be used against the Borrower, such as suing you, &AdditionalMethods; etc. If this debt is ever in default, that fact may become a part of your credit record.</Para>.

In the above example, the default list of actions that can be used against the cosigner could be established by defining the entity AdditionalMethods as being empty. In this case, the implicated sentence above would read ". . . such as suing you, etc." If it is desirable to extend the list of remedial actions, the entity AdditionalMethods may be defined to include some appropriate language, such as:

<!ENTITY AdditionalMethods "garnishing your wages, ">.

Using the above entity definition, the text concerning the extended list of remedial actions would read "such as suing you, garnishing your wages, etc." It can be appreciated that entities should be contextually valid and balanced. A balanced entity will typically contain a start tag and a corresponding end tag.

Entities can be used in many ways. For purposes of explanation, it may be convenient to classify entities according to three basic types: Content Entities, Data Entities, and Marked Section Control Entities. A Content Entity is one that represents document language. Typical uses of Content Entities include: language re-use, such that many documents can reference the same entity; alternate text control, such that a user's right to substitute language will be controlled at the Content Entity level; and compliance tracking of regulatory content, such as by tracking links to a government regulations database that will be stored as attributes of the content entity. It is noted that a unit of language that is linked to a specific regulation should be defined as a content entity.

A Data Entity name represents a specific use of data. It is important to note that data entity names are not database field names. A Data Entity name may be subject to specific presentation limitations that may not apply to a field, (e.g., customer-name on a particular document may be limited to 25 characters even though other presentations of customer-name may allow more characters).

A Marked Section Control Entity is an entity whose resolved value can only be "INCLUDE" or "IGNORE." It is occasionally convenient to mark some portion of a text for special treatment by an SGML parser or other language processor. Certain portions of legal boilerplate, for example, may need to be included or omitted systematically, depending on the state in which the document is intended to be valid. For example, the statement "Liability is limited to $50,000" may need to be included in Delaware, but excluded in Maryland. If a Marked Section Control Entity resolves to INCLUDE, the section it controls appears in the document, otherwise, the section does not appear in the document. Marked Section Control Entities are resolved before the document can be completely assembled. It is also possible that the resolution of Marked Section Control Entities will reveal other (nested) Marked Section Control Entities that must also be resolved.

The ability to efficiently and accurately resolve entities of differing types and complexity in a predictable, controlled manner is an important feature of the present invention. Upon initial inspection, entities might appear to the skilled artisan to be nothing more than "include files," such as those used in program source files to re-use bits of source code. However, the entity resolution methodology of the present invention advantageously exploits the SGML parsing model so as to provide enhanced control of the entity resolution process. It will be appreciated that this enhanced entity resolution control capability is equally applicable to parsing schemes other than that defined by the SGML standard. It is understood that a particular entity may be defined multiple times and in multiple locations. The SGML Parser will resolve an entity reference by use of the first definition it finds. This characteristic of the SGML Parser model makes it possible to control the resolution of an entity by, for example, inserting a new definition upstream of a default definition.

Figure 9C:
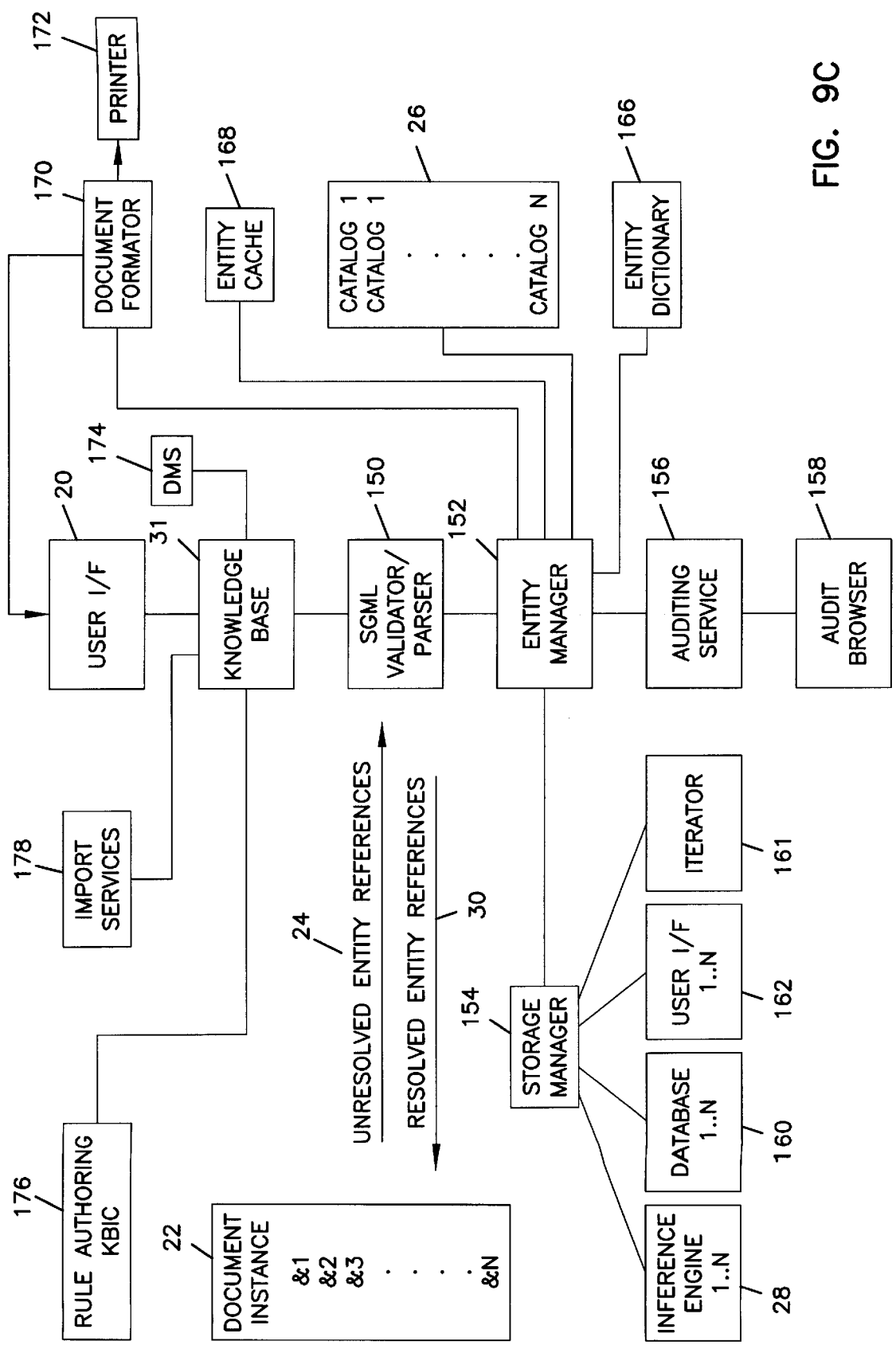
FIG. 9C is a block diagram of another embodiment of a dynamic document construction apparatus.

Referring now to FIGS. 9C and 10, entity references are resolved by the Entity Manager 152. The Entity Manager 152 is preferably a generalized entity resolver which can be utilized by other system clients that wish to resolve an entity name to a string, text, or other type of component. For example, the Entity Manager 152 may be used by the Inference Engine 28 or by a calculations service. When the SGML Parser 150 encounters an entity reference, such as the unresolved entity reference 24 indicated in FIG. 9C, the SGML Parser 150 transmits the entity name to Entity Manager 152. The Entity Manager 152 initially searches its Entity Cache 168 of resolved entity names and, if found, returns the corresponding string or file contents to the SGML Parser 150. In one embodiment, the Entity Manager 152 is implemented in a 32-bit DLL. In accordance with this embodiment, the service of the entity manager will be the only connection between the SGML Parser and the application. However, the services of the Entity Manager may also be used by any interested system client.

If the entity name is not found in the Entity Cache 168, the Entity Manager 152 searches any of the Catalogs 26 that have been registered with it. In the context of an object-oriented programming implementation, an entity catalog is an object that maps an entity's external identifier or name to a file name or string value. The significant difference between the Entity Cache 168 and a Catalog 26 is that multiple catalogs can be loaded and catalogs may be read from a storage disk, while the Entity Cache 168 is constructed in memory and only one can exist.

Any number of catalogs 26 may be defined and made available to the Entity Manager 152, including the following exemplary catalogs: a standard catalog that defines certain Marked Section Control Entities so as to manage the release of date-sensitive language; a catalog that defines entities such that static forms can be produced; an institution setup catalog that resolves data entities such as institution name and address; a branch setup catalog that resolves lender state, branch name, and address; a policy loan setup catalog for policy loans that may resolve any arbitrary set of entities as is appropriate for a particular policy; a customer catalog that provides for resolving of entities such as customer name and address common to many transactions between the institution and the customer; and a transaction catalog that contains the contents of the Entity Cache 168 after all documents have been assembled.

It is considered important to provide the enduser the ability to control the order in which the Entity Manager 152 evaluates the catalogs 26. A bank, for example, may wish to assert the primacy of the institution catalog over a branch catalog, thus preventing modification of the institution's specified alternate text by the branch location. As is illustrated in the following example, the precedence or primacy of one catalog over another may be controlled by the end-user.

The code provided below in Table 1 illustrates the parsing of a document with a minimum number of objects:

TABLE 1

```
Public Function PrepareDocument(pDoc As String, pDocOut As String,
pErrorFile As String) As Long
Dim mySgmlMgr As Object
Dim myParser As Object
Dim myCatalog As Object
    '. . . Create the SGMLManager object
    Set mySgmlMgr = CreateObject("BSI.SgmlManager")
    '. . . Load your Storage Manager(s)
    If Not mySgmlMgr.LoadStorageManager("asksm.dll") Then
        MsgBox "Unable to load asksm.dll Storage Manager."
        PrepareDocument = False
        Set mySgmlMgr = Nothing
        Exit Function
    End If
    '. . . Load your catalog(s)
    Set myCatalog = mySgmlMgr.PushBack("bsi.cat")
    '. . . Create a parser
    Set myParser = mySgmlMgr.CreateParser(Nothing)
    '. . . Parse the document
    PrepareDocument = _
        myParser.ParseDocument("E", pDoc, pDocOut, PErrorFile)
        '. . . Destroy the objects
        Set myCatalog = Nothing
        Set myParser = Nothing
        Set mySgmlMgr = Nothing
End Function
```

In order to utilize multiple catalogs, a separate object must be created for each catalog to be loaded. An efficient means to create multiple catalog objects is to create an array of objects, as illustrated in the code of Table 2 below:

TABLE 2

```
Dim myCatalogs( ) As Object
Dim myFilename As String
    '. . . Read text file myFile for the
    '. . . names of the catalogs to load
    '. . . Read first record
    Line Input #myFile, myFilename
    Do While Len(myFilename)
        '. . . Allocate a place for the catalog
            ReDim Preserve myCatalogs(UBound(myCatalogs) + 1)
        '. . . Put the catalog at the back
        Set myCatalogs(UBound(myCatalogs)) _
            = mySgmlMgr.PushBack(myFilename)
        '. . . Read nextrecord
        Line Input #myFile, myFilename
    Loop
```

It is preferable for purposes of enhancing control of the entity reference resolution process that entities are always resolved in a consistent manner. The Entity Manager 152 initiates its evaluation at the front-most catalog, such as Catalog 1 shown in FIG. 9C, and continues progressively toward the back-most catalog, such as Catalog N. The Entity Manager 152 searches for the first occurrence of an entity identifier in the sequence of catalogs that matches the name of the entity reference to be resolved. Thus, the Entity Manager 152 will implement the first resolution strategy it locates upon determining the occurrence of a matching condition. This progression through multiple catalogs by the Entity Manager 152, however, can be advantageously altered in a controlled manner by inserting an appropriate matching entry in the front-most catalog.

If it is uncertain which catalog instance is the front-most catalog, a CatalogPrecedence object can return a catalog object at an arbitrary position in the precedence. The following subroutine provided in Table 3 demonstrates this capability:

TABLE 3

```
Public Sub InsertEntitylnFrontmost( _
    pPrecedence As Object, _
    pEntityName As String, _
    pStorageMgrName As String, _
    pSystemID As String) as integer
Dim myFrontCatalog As Object
    '. . . Get the front catalog
    Set myFrontCatalog = pPrecedence.Index(0&)
    myFrontCatalog.AddEntity pEntityName, _
        pStorageMgrName, pSystemID
    Set myFrontCatalog = Nothing
End Sub
```

This subroutine can be modified to enable controlled insertion of a catalog entry in any arbitrary position by including the position number as a parameter. As such, the client of this subroutine must be informed as to the number of loaded catalogs, which can be determined by the Count method of the Catalog Precedence.

An Entity Browser, shown in FIGS. 11 and 12, is a tool that permits a user to navigate an Entity Dictionary 166. The Entity Browser provides search and sequence functions and is supported and managed by the DMS 174. It also enables a user to access and modify the attributes of an entity, as well as the text of Content Entities. For entities that have rules expressed in an Inference Engine 28, the Entity Browser connects to the editor of the Inference Engine 28. The Entity Browser is a user's interface to entities when authoring alternate or additional text. It is also used when the user is defining entities for user-supplied electronic forms. Custom Interfaces may be supplied for one or more Entity Dictionaries. Such custom interfaces typically contain the definitions of entities that are specific to certain data processors or user interfaces. Control of the entity resolution process is further enhanced by permitting users, such as financial institutions and their branches, to author alternate text that contains entity references in addition to those initially provided to the users. The institution, for example, may wish to specify that the institution's Entity Dictionary 166 be searched before the branch's Entity Dictionary 166, or vice versa.

Figure 6:
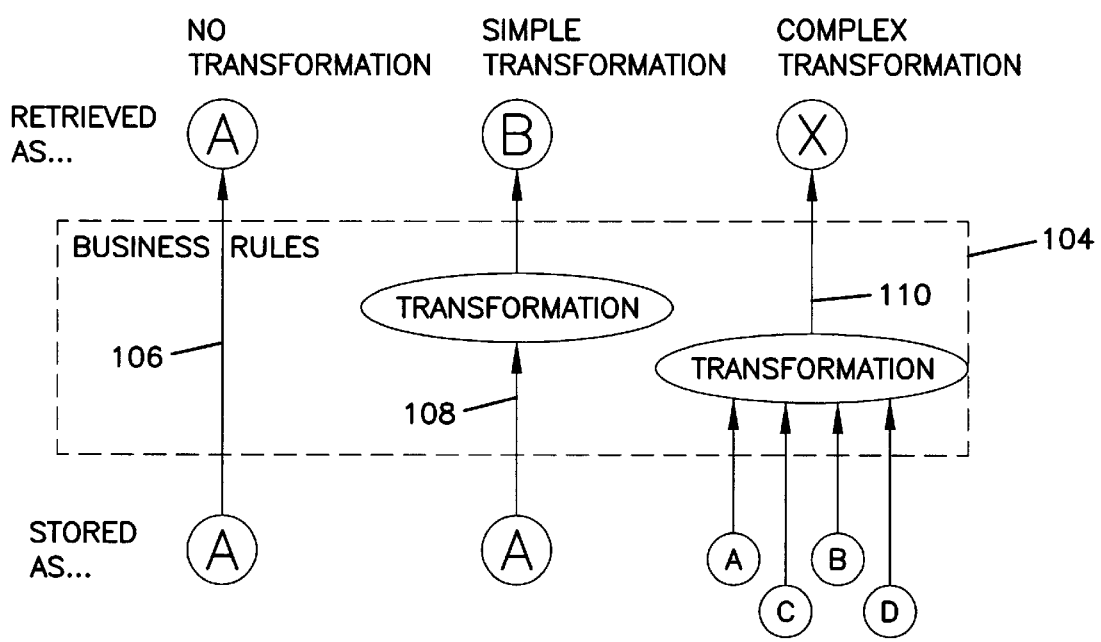
FIG. 6 illustrates various levels of business rule complexities in connection with the resolution of entity references.

Each entity is referenced to one or more business rules that describe the transformations required to respond to an entity resolution request. FIG. 6 shows the main classes of transformations or business rule types. A non-transformation, indicated by line 106, is an action that simply moves a string from some source to the Entity Cache 168. A simple transformation, as indicated by line 108, is an action in which data is altered in some way between the source and the Entity Cache 168. For example, a data value of '1' may be transformed to "INCLUDE," while all other data values are transformed to "IGNORE." By way of further example, a floating point number may be formatted according to some particular specification. A complex transformation as indicated by line 110, is, by definition, any transformation that is not simple. A complex transforation may involve concatenating the values of several entities. It may involve some interaction with a Calculations Service, an Inference Engine 28, or any other business object.

In view of the potential number and diversity of Entity Dictionaries, it is important to define a common data model for entities. It may be desirable, therefore, to ascribe an entity the attributes defined in Table 4 below:

TABLE 4

| ATTRIBUTE | ATTRIBUTE DEFINITION |
| --- | --- |
| ENTITY TYPE: GENERAL (ALL ENTITIES) | |
| Entity Name | The name used in the entity definition |
| Public Identifier | A name corresponding to the entity name used in formal SGML document interchange and written according to the SGML standard |
| Owner | BSI (Manufacturer) or USR (User) |
| Entity Type | Data (DTA), Language (LNG), Marked Section Control (MSC) |
| Resolution Process_Formal | The default mechanism for resolving this entity if it is not in the Entity Cache or the catalogs. Values can be: the Inference Engine (IE) 28 - the entity name is the rule identifier; the Entity Dictionary 166 (ED) - the value in the Blank Form Value field is used to resolve this entity |
| Resolution Process_Short | The probable part of the application that will supply the resolution. Examples are "Institution Information", "Borrower Information", "Transaction Info - General" |
| Description | A narrative describing the entity |
| Loan Purpose | An entity could be identified as specific to one or more loan purposes, including consumer, commercial, or agricultural. |
| Author | The person who created the entity. |
| Date Created | Date the entity was entered in the Entity Dictionary 166 |
| Date Last Modified | Date the entity was last changed. |
| Modified By | Person made the last change to the entity |
| Indexing Constraints | Minimum and maximum index potentials |
| Maximum Length | Maximum length of the string that resolves this entity. |
| ENTITY TYPE: CONTENT AND MARKED SECTION CONTROL ENTITIES | |
| User override | Can this entity be replaced by the user? |
| SGML File Name | If applicable, the name of the file containing the SGML text of the entity. |

As mentioned previously, the Entity Browser tool shown in FIG. 12 provides a document developer or an enduser an interface to modify entity definitions and textual content. When invoked from an application, for example, the Entity Browser allows the user to specify or insert their own text for any entity flagged as customer modifiable. In addition, the user can insert or modify entity names using any name selected from a set of entity names provided by the application developer. Further, the user can exploit a User Defined Fields mechanism in order to define new entity names. User defined entity names are preferably prefixed with "U." designation. Collection of data values for User Defined Fields is handled by the User Defined Fields subsystem.

An important feature concerns the transformation of an SGML document instance into a static form or document. A static form or document is understood to have a stable or pre-established structure after being constructed into which user information may be subsequently inserted. The structure of a static document, however, is generally not alterable by the end-user. In accordance with the present invention, a static document is constructed dynamically and subsequently published in a pre-printed or electronic static format. In contrast to a static form, a dynamic form has a structure that may be altered to accommodate transaction data, generally to meet a previously unperceived requirement, such as the selection of certain disclosures due to the transaction interest rate and repayment terms. A key distinction is that a static form is one that remains unchanged for many transactions, while a dynamic form is one that is unique for each transaction. The document construction methodology of the present invention provides for the dynamic construction and alteration of both static and dynamic documents and forms.

In the construction of either a static or dynamic document, all entity references incorporated in the document must be resolved. It is noted that the resolution of Marked Section Control Entity references contained in a static form or document may differ from the resolution of the same Marked Section Control Entity references incorporated in a dynamic document. Most Data Entities will resolve to white or blank space in a static form. The process that transforms the SGML document will produce the PCL (Printer Control Language) files for each page and a text format file that describes the locations of the fields on the form, preferably by describing the Cartesian X and Y location coordinates of the fields on the form. The control parameters for the transformation process are captured along with the transaction catalog.

When the appropriate entities are resolved such that the static SGML form is constructed, this set of entity resolutions is obtained from two catalogs. The entities necessary to generate the language of the constructed document are obtained from an E-form Control Catalog. The remaining entities, those that represent the white or blank space on the static form, are obtained from a separate E-form Data Catalog. An entity resolution in the E-form Data Catalog, for example, might be 25 blank spaces, or 40 underlines. The E-form Data Catalog is used to produce the pre-printed version of the static form.

A control instance is a separate SGCML instance that is generated by the BFO Processor from a BFO file. The control instance conforms to a DTD authored specifically to support e-form merge files. Tools and documentation to support end-user creation of a control instance may be provided to permit development of custom forms by the user. Such a tool would support field creation and modification, as well as browsing of the entities available for user selection.

The following code illustrates one embodiment of how a control instance might appear:

TABLE 5

```
<!DOCTYPE EFORM SYSTEM [
<!--    Provide for subsetting the DTD    -->
<!ENTITY % BSI.TRAN.DTDsubset
    PUBLIC "-//BSI//ENTITIES Transaction declaration subset//EN">
%BSI.TRAN.DTDsubset;
]>
<EFORM>
<FM><FormFileName="myform.bfo"></FM
<Body>
<EformField FXYName="field1">&BSI.DC.CustName.25CharMax;
</EformField>
<EformField FXYName="field2">&BSI.DC.CustAddr1.25CharMax;
</EformField>
<EformField FXYName="field3">&BSI.DC.CustAddr2.25CharMax;
</EformField>
<EformField FXYName="field4">&BSI.DC.CustAddr3.25CharMax;
</EformField>
</Body>
</EFORM>
```

When the control instance is assembled, it will resolve each Data Entity with the same process as a dynamic document. In the above example of Table 5, the entities to be resolved are shown below in Table 6:

TABLE 6

| | |
|---|---|
| BSI. TRAN.DTDsubset | the transaction catalog. |
| BSI.DC.CustName.25CharMax | a data entity (customer name no longer than 25 characters.) |
| BSI.DC.CustAddr1.25CharMax | a data entity (customer address 1 no longer than 25 characters. |
| BSI.DC.CustAddr2.25CharMax | a data entity (customer address 2 no longer than 25 characters. |
| BSI.DC.CustAddr3.25CharMax | a data entity (customer address 3 no longer than 25 characters. |

The transformation process for a control instance provides for the creation of a merge file that can be supplied to a merge tool. For the instance resolved in Table 5 above, the transformation engine determines that the electronic form is located in the file "myform.bfo." When examining this form file, the transformation engine determines that it is a BSI electronic form, for example, and therefore produces a merge file according to that specification. If the electronic form were determined to be a JetForm (.MDF) file, by way of further example, the process would locate the appropriate field position coordinates file and produce the proper command stream for effecting the JetForm MiniMerge process.

For purposes of illustrating the advantages of resolving an entity reference by cooperative operation between the Entity Manager 152 and an Inference Engine 28, the following example is provided. In order to resolve a particular entity reference, the Storage Manager 154 invokes the Inference Engine 28 in accordance with the resolution strategy associated with a matching catalog entity identifier. During the entity reference resolution process, the Inference Engine 28 investigates whether Regulation-Z applies. This inquiry by the Inference Engine 28 may be implemented in the following manner:

TABLE 7

```
SomeRule
{
    select:
    case : (RegZApplies)
    {
        // some action
    }
    default:
    {
        T;
    }
}
RegZApplies
{
    ASK ("&RegZApplies;" IsTorF(*), RegZApplies);
}
```

It is noted that two rules are used, which provides several advantages. First, the actual implementation of the RegZApplies logic is "hidden" from the referencing rule (SomeRule). Whether the referencing rule performs some logic or represents a simple entity reference is of no import to the referencing rule, or to the author of the rule. The Inference Engine 28 simply needs to know whether or not Regulation-Z applies. This insulation of the logic implementation from the referencing rule advantageously provides for the re-use of rules. A second advantage is that the Inference Engine 28 does not need to know any particulars about the Entity Manager 152. It is desireable that the Inference Engine 28 not be "customized" for any particular possible client in order to maximize its effectiveness. The Inference Engine 28 should be defined so as to be flexible enough to communicate with a wide variety of clients. The string passed back in the ASK transaction may be anything that the caller will understand and be able to resolve.

With further reference to the example of Table 7 above, the Inference Engine 28 requests the Entity Manager 152 for a value for "&RegZApplies;". If RegZApplies has not yet been evaluated, the Entity Manager 152 preferably invokes the Inference Engine 28, or other Storage Manager registered to resolve RegZApplies. Once resolved, the Entity Manager 152 stores that value in the Entity Cache 168, thus making it available to the SGML Parser 150 and any other Entity Manager client.

Consider the case is which state-specific language may be selected for a given document through the use of Marked Section Control Entities. Initially, each document is authored such that the language for all states is ignored. The application simply defines the Marked Section Control Entity for the desired state to "INCLUDE" so as to cause a particular state's language to be incorporated in the document.

Another significant advantage of the present invention concerns the capability to dynamically build SGML structure within a document. As is defined in the Definitions Section hereinabove, Iterators are scripts that can build SGML structures from the information published by business objects via catalogs. They can infer structure from entity names in the catalog and, with a given set of rules, construct an appropriate SGML entity. An exemplary iterator, in accordance with one embodiment, is described below in Table 8:

TABLE 8

A SAMPLE ITERATOR

```
;; Name element
(define Name
    (list "m_Name" "Name" "DATA"))
;; Description element
(define Description
    (list "m_Desc" "Description" "DATA"))
;; Collateral element
(define Collateral
    (list "Collateral" "Collateral" "GROUP"
        (list Name Description)))
;; CollateralList element
(define CollateralList
    (list "m_CollateralList" "CollateralList" "CONTAINER"
        (list Collateral)))
;;the following statement executes the iterator
(itr-item-container "TXN." CollateralList 1 "COUNT")
```

The following items are required prerequisites to defining and utilizing an iterator in accordance with this embodiment: The DTD for the target document; the Entity Dictionary 166 entry that represents the location in the target document; and the list of entity names to be published by the business object(s). Examples of the prerequisites are provided in Table 9 below:

TABLE 9

The DTD section of interest is:

<!ELEMENT CollateralList   - - (Collateral+)>
    <!ELEMENT Collateral   - - (Name,Description)>
    <!ELEMENT Name   - - (#PCDATA)>
    <!ELEMENT Description   - - (#PCDATA)>

An entity reference has been put in the document where the CollateralList element construct must be entered. This may be defined as:

<Para>The collateral items for this loan are:</Para>
    &BSI.DTA.CollateralList;
    <Para>The above items . . .

An entry is created in the catalog that associates the entity BSI.DTA.CollateralList with an iterator. The specification of this entity may be defined as:

ENTITY BSI.DTA.CollateralList "<SCHEME>CollateralList"

A business object CollateralList in the transaction publishes according to the following rules:

1. A member COUNT will be published containing the number of collateral items.
2. For each item in the list, a string "ITEM_#" will be published in front of the name where '#' is the index in the list.
3. A "TYPE" will be published for each ITEM_# specifying what kind of item it is.

In addition, CollateralList is a list of Collateral business objects. Thus, for each object of this type, the following will be published:

| Name | Description |
|---|---|
| m_Name | The name of the collateral item. |
| m_Desc | A description of the collateral item. |
| m_Value | A dollar value attached to the collateral item. |

From the above information, it can be assumed that a catalog similar to the following provided in Table 10 may be published by the business object:

TABLE 10

| | |
|---|---|
| TXN.m_CollateralList.COUNT | "<LITERAL asis>3" |
| TXN.m_CollateralList.ITEM_1.TYPE | "<LITERAL asis>Collateral" |
| TXN.m_CollateralList.XTEM_1.Collateral.m_Name | "<LITERAL asis>10' boat" |
| TXN.m_CollateralList.ITEM_1.Collateral.m_Desc | "<LITEEAL asis>A standard boat" |
| TXN.m_CollateralList.ITEM_1.Collateral.m_Value | "<LITERAL asis>$500.00" |
| TXN.m_CollateralList.ITEM_2.TYPE | "<LITERAL asis>Collateral" |
| TXN.m_CollateralList.ITEM_2.Collateral.m_Name | "<LITERAL asis>'79 Monza" |
| TXN.m_CollateralList.ITEM_2.Collateral.m_Desc | "<LITERAL asis>A bad car" |
| TXN.m_CollateralList.ITEM_2.Collateral.m_Value | "<LITERAL asis>$100.00" |
| TXN.m_CollateralList.ITEM_3.TYPE | "<LITERAL asis>Collateral" |
| TXN.m_CollateralList.ITEM_3.Collateral.m_Name | "<LITERAL asis>Home" |
| TXN.m_CollateralList.ITEM_3.Collateral.m_Desc | "<LITERAL asis>Borrower's Home" |
| TXN.m_CollateralList.ITEM_3.Collateral.m_Value | "<LITERAL asis>$8900.00" |

When writing an iterator script, the following objectives should be considered. A CollateralList start and end tag must be wrapped around the whole construct. For each item, a Collateral start and end tag must be wrapped around the Collateral name and description. The m_Name member's fully qualified entity must be wrapped with the Name tag inside the collateral element. The m_Desc member's fully qualified entity must be wrapped with the Description tag inside the collateral element. The m_Value is ignored for each element.

In order to accomplish these objectives, the iterator code should be written to include a description of the mapping of m_Name to Name. This is accomplished by declaring a mapping from the unqualified m_Name entity to the Name element that is of a type "DATA." This signifies that the unqualified entity m_Name will, when qualified, hold the data which must be inserted in the Name tag. This portion of the iterator code may be similar to following:

```
(define Name
    (list "m_Name" "Name" "DATA")).
```

The above code indicates that the unqualified m_Name entity will be tagged with the element Name which is a data element. This will produce the following: <Name>&Something.m_Name;</Name>; where 'Something' is the qualification for m_Name such that the appropriate entity is retrieved.

A description of the mapping of m_Desc to Description may be specified in the following manner:

```
(define Description
    (list "m_Desc" "Description" "DATA")).
```

The above code will produce the following:

```
< Description >&Something.m_Desc;</ Description >.
```

A description of the mapping and structure of Collateral may be specified in the following manner:

```
(define Collateral
    (list "Collateral" "Collateral" "GROUP"
        (list name Description))).
```

In this description, the collateral element is being mapped from the entity name part 'Collateral.' This is required because in the published catalog, every ITEM_# was followed by the type "Collateral." Every member of "Collateral" will be prefaced by this name. Thus, to access "m_Name," it is necessary to know that collateral is before it. In addition, the name "Collateral" was the name used in the "TYPE" entity for each item. This is important if a list object contains different kinds of information.

A description of the mapping and structure of CollateralList may be specified in the following manner:

```
(define CollateralList
    (list "m_CollateralList" "CollateralList"
    "CONTAINER"
    (list Collateral))).
```

This description essentially indicates that the CollateralList element is mapped from the entity name part m_CollateralList and is a container. A container may contain multiple different kinds of objects. In this case, it is stated that the CollateralList element may only contain Collateral elements, as was specified in the content model for CollateralList.

The following iterator definition is provided in Table 11 below:

TABLE 11

```
;; Name element
(define Name
    (list "m_Name" "Name" "DATA"))
;; Description element
(define Description
    (list "m_Desc" "Description" "DATA"))
;; Collateral element
(define Collateral
    (list "Collateral" "Collateral" "GROUP"
        (list Name Description)))
;; CollateralList element
(define CollateralList
    (list "m_CollateralList" "CollateralList" "CONTAINER"
        (list Collateral)))
;;the following statement executes the iterator
(itr-item-container "TXN." CollateralList 1 "COUNT")
```

The iterator defined in Table 11 above will produce the following using the catalog of Table 10 above:

TABLE 12

```
<CollateralList>
<Collateral>
<Name>&TXN.m_CollateralList.ITEM_1.Collateral.m_Name;</Name>
<Description>&TXN.m_CollateralList.ITEM_1.Collateral.m_Desc;
</Description>
</Collateral>
<Collateral>
<Name>&TXN.m_CollateralList.ITEM_2.Collateral.m_Name;</Name>
<Description>&TXN.m_CollateralList.ITEM_2.Collateral.m_Desc;
</Description>
</Collateral>
<Collateral>
<Name>&TXN.m_CollateralList.ITEM_3.Collateral.m_Name;
</Name>
<Description>&TXN.m_CollateralList.ITEM_3.Collateral.m_Desc;
</Description>
</Collateral>
</CollateralList>
```

An iterator may be characterized as being one of three types: a data element description; a group element description; and a container element description. A data element is an element that has a model of #PCDATA, which is defined in the SGML Standard as "parsable character data." The content of the element is the value of some particular entity. The entity that should map to this element may have many different parents depending on where the entity was published. Thus, in the data element definition the entity is only specified by its terminating name. That is, the entity name to map from is the trailing name from the catalog whose parent may be many different things.

During iteration, a procedure called itr-data is called to iterate a data element. This procedure is provided with the parent name. From the parent name and the terminating name, a full entity name may be specified. The syntax of a data element definition is provided as follows:

TABLE 13

```
data-element-def    =>  (define name data-element-desc)
data-element-desc   =>  (list entity-name element-name
```

TABLE 13-continued

```
                        "DATA")
entity-name       =>    literal
element-name      =>    literal
name              =>    a name following scheme naming conventions
literal           =>    a quoted string following scheme conventions
An example of data element:
;; Name element
(define Name
    (list "m_Name" "Name" "DATA"))
```

A group element is an element whose content model is made up of a collection of sub-elements. The definition defines the order in which the sub-elements can appear and what iterator definition to use to create such sub-elements. In addition, it can specify whether there is an entity name fragment that should be appended to the parent so that the sub-elements have the appropriate parent name to build their entity references. The syntax of the group element definition is as follows:

TABLE 14

```
group-element-def   =>  (define name group-element-desc)
group-element-desc  =>  (list entity-name element-name
                        "GROUP" group-content-desc)
entity-name         =>  literal | null
element-name        =>  literal
name                =>  a name following scheme naming conventions
literal             =>  a quoted string following scheme conventions
null                =>  '( )
group-content-desc  =>  (list definition-by-name+ )
definition-by-name  =>  name
Note: A definition-by-name must be previously defined as some kind of
valid iterator definition.
An example:
;; Name element
(define Name
    (list "m_Name" "Name" "DATA"))
;; Description element
(define Description
    (list "m_Desc" "Description" "DATA"))
;; Collateral element
(define Collateral
    (list "Collateral" "Collateral" "GROUP"
        (list Name Description)))
```

A container element is an element that can contain more than one of a set of elements, including itself. That is, a container element can contain other container elements and itself. The definition contains a set (list) of elements that can be contained within the element. The syntax of the container element definition is as follows:

TABLE 15

```
container-element-def   =>  (define name container-element-desc)
container-element-desc  =>  (list entity-name element-name
                            "CONTAINER" container-content-desc)
entity-name             =>  literal | null
element-name            =>  literal
name                    =>  a name following scheme naming
                            conventions
literal                 =>  a quoted string following scheme
                            conventions
container-content-desc  =>  (list ( definition-by-name |
                            self-ref )+ )
definition-by-name      =>  name
self-ref                =>  (list entity-name element-name "SELF")
                            element-name "SELF")
An example is:
;; Borrower element
(define Borrower
```

TABLE 15-continued

```
    (list "m_Party" "Borrower" "GROUP"
        (list Name Address)))
;; BorrowerGroup element
(define BorrowerGroup
    (list "m_BorrowerList" "BorrowerGroup" "CONTAINER"
        (list Borrower
            (list "m_BorrowerList" "BorrowerGroup"
"SELF"))))
```

Three different commands may be used to manipulate iterator scripts. The first command is "itr-data." This command iterates a data element definition and a given catalog, and generates a data element SGML component. An exemplary usage of this command is given by (itr-data parent definition). The second command is "itr-group." This command iterates a data element definition and a given catalog, and generates a group element SGML component. An exemplary usage of this command is given by (itr-group parent definition). The third command is "itr-item-container." This command iterates a container element definition and a given catalog from a start index to an end index, and generates a group element SGML component. The start and end index values can be given as a terminal entity name to be retrieved from the catalog. An exemplary usage of this command is given by:

TABLE 16

```
(itr-item-container parent definition string string)
;; or
(itr-item-container parent definition number string)
;; or
(itr-item-container parent definition string number)
;; or
(itr-item-container parent definition number number).
```

In order to illustrate an advantageous use of an iterator when constructing a document, the following example is provided. In this example, a borrower construct needs to be generated using an iterator conforming to the following rules: first, a BorrowerGroup start and end tag must be wrapped around the whole construct; second, a Borrower Group consists of one or more Borrower or BorrowerGroup elements; third, if the item is a borrower, a Borrower element will be tagged; fourth, if the item is a borrower list, a Borrower Group element will be tagged; fifth, the following DTD component of Table 17 will be used:

TABLE 17

```
<!ELEMENT BorrowerGroup      - - ((Borrower|BorrowerGroup)
                                  +) >
<!ELEMENT Borrower           - - (ComplexName,
                                  PermAddress) >
<!ELEMENT ComplexName        - - (FirstName,LastName) >
<!ELEMENT (FirstName|LastName)  - - (#PCDATA)
<!ELEMENT PermAddress        - - (Street+,City,State,Country) >
<!ELEMENT (Street|City)
          State|Country)     - - (#PCDATA) >
```

Finally, a catalog will be published similar to the following partial catalog of Table 18 below:

TABLE 18

```
ENTITY TXN.m_BorrowerList.COUNT "<LITERAL asis>3"
ENTITY TXN.m_BorrowerList.ITEM_1.TYPE "<LITERAL asis>Party"
ENTITY TXN.m_BorrowerList.ITEM_1.Party.m_FirstName "<LITERAL asis>"
ENTITY TXN.m_BorrowerList.ITEM_1.Party.m_LastName "<LITERAL asis>"
ENTITY TXN.m_BorrowerList.ITEM_1.Party.m_MailCity "<LITERAL asis>"
ENTITY TXN.m_BorrowerList.ITEM_1.Party.m_MailCountry "<LITERAL asis>USA"
ENTITY TXN.m_BorrowerList.ITEM_1.Party.m_MailCounty "<LITERAL asis>"
ENTITY TXN.m_BorrowerList.ITEM_1.Party.m_MailFromDate "<LITERAL asis>"
ENTITY TXN.m_BorrowerList.ITEM_1.Party.m_MailNonUS "<LITERAL asis>0"
ENTITY TXN.m_BorrowerList.ITEM_1.Party.m_MailState "<LITERAL asis>"
ENTITY TXN.m_BorrowerList.ITEM_1.Party.m_MailStreet "<LITERAL asis>"
ENTITY TXN.m_BorrowerList.ITEM_1.Party.m_MailToDate "<LITERAL asis>"
ENTITY TXN.m_BorrowerList.ITEM_1.Party.m_MiddleName "<LITERAL asis>"
ENTITY TXN.m_BorrowerList.ITEM_1.Party.m_PermCity "<LITERAL asis>"
ENTITY TXN.m_BorrowerList.ITEM_1.Party.m_PermCountry "<LITERAL asis>USA"
ENTITY TXN.m_BorrowerList.ITEM_1.Party.m_PermCounty "<LITERAL asis>"
ENTITY TXN.m_BorrowerList.ITEM_1.Party.m_PermFromDate "<LITERAL asis>"
ENTITY TXN.m_BorrowerList.ITEM_1.Party.m_PermNonUS "<LITERAL asis>0"
ENTITY TXN.m_BorrowerList.ITEM_1.Party.m_PermOwnRent <LITERAL asis>1"
ENTITY TXN.m_BorrowerList.ITEM_1.Party.m_PermPostatlCode "<LITERAL asis>"
ENTITY TXN.m_BorrowerList.ITEM_1.Party.m_PermState "<LITERAL asis>"
ENTITY TXN.m_BorrowerList.ITEM_1.Party.m_PermStreet1 "<LITERAL asis>"
ENTITY TXN.m_BorrowerList.ITEM_1.Party.m_PermToDate "<LITERAL asis>"
ENTITY TXN.m_BorrowerList.ITEM_2.TYPE "<LITERAL asis>Party"
ENTITY TXN.m_BorrowerList.ITEM_2.Party.m_FirstName "<LITEEAL asis>"
ENTITY TXN.m_BorrowerList.ITEM_2.Party.m_LastName "<LITERAL asis>"
```

In order to accomplish these objectives, the following iterator code is provided in Table 19 below:

TABLE 19

```
An iterator definition for Borrower is given by:
    ;; ComplexName element:
    (define FirstName
        (list "m_FirstName" "FirstName" "DATA"))
    (define LastName
        (list "m_LastName" "LastName" "DATA"))
    (define ComplexName
        (list '() "ComplexName" "GROUP" (list FirstName
            LastName)))
    ;; PermAddress element:
    (define Street
        (list "m_PermStreet" "Street" "DATA"))
    (define City
        (list "m_PermCity" "City" "DATA"))
    (define State
        (list "m_PermState" "State" "DATA"))
    (define Country
        (list "m_PermCountry" "Country" "DATA"))
    (define PermAddress
```

TABLE 19-continued

```
        (list '() "PermAddress" "GROUP" (list Street City
            State Country)))
    ; Borrower Element
    (define Borrower
        (list "Party" "Borrower" "GROUP" (list ComplexName
            PermAddress)))
An iterator definition for BorrowerGroup is given by:
    ;; BorrowerGroup Element
    (define BorrowerGroup
        (list "m_BorrowerList" "BorrowerGroup" "CONTAINER"
            (list
                Borrower
                    (list "m_BorrowerList" "BorrowerGroup"
"SELF"))))
The iterator must be invoked by the following:
;; Iterate all borrowers
(itr-item-container "TXN." BorrowerGroup 1 "COUNT")
```

The above defined iterator of Table 19 will produce the following using the catalog of Table 18 above:

TABLE 20

```
<BorrowerGroup>
<Borrower>
<ComplexName>
<FirstName>&TXN.m_BorrowerList.ITEM_1.Party.m_FirstName;</FirstName>
<LastName>&TXN.m_BorrowerList.ITEM_1.Party.m_LastName;</LastName>
</ComplexName>
<PermAddress>
<Street>&TXN.m_BorrowerList.ITEM_1.Party.m_PermStreet1;</Street>
<City>&TXN.m_BorrowerList.ITEM_1.Party.m_PermCity;</City>
<State>&TXN.m_BorrowerList.ITEM_1 .Party.m_PermState;</State>
<Country>&TXN.m_BorrowerList.ITEM_1.Party.m_PermCountry;</Country>
</PermAddress>
</Borrower>
<Borrower>
<ComplexName>
<FirstName>&TXN.m_BorrowerList.ITEM_2.Party.m_FirstName;</FirstName>
<LastName>&TXN.m_BorrowerList.ITEM_2.Party.m_LastName;</LastName>
</ComplexName>
<PermAddress>
```

TABLE 20-continued

```
<Street>&TXN.m__BorrowerList.ITEM__2.Party.m__PermStreet1;</Street>
<City>&TXN.m__BorrowerList.ITEM__2.Party.m__PermCity;</City>
<State>&TXN.m__BorrowerList.ITEM__2.Party.m__PermState;</State>
<Country>&TXN.m__BorrowerList.ITEM__2.Party.m__PermCountry;</Country>
</PermAddress>
</Borrower>
<BorrowerGroup>
<Borrower>
<ComplexName>
<FirstName>&TXN.m__BorrowerList.ITEM__3.m__BorrowerList.ITEM__1.Party.m__FirstName;</FirstName>
<LastName>&TXN.m__BorrowerList.ITEM__3.m__BorrowerList.ITEM__1.Party.m__LastName;</LastName>
</ComplexName>
<PermAddress>
<Street>&TXN.m__BorrowerList.ITEM__3.m__BorrowerList.ITEM 1.Party.m__PermStreet1;</Street>
<City>&TXN.m__BorrowerList.ITEM__3.m__BorrowerList.ITEM__1.Party.m__PermCity;</City>
<State>&TXN.m__BorrowerList.ITEM__3.m__BorrowerList.ITEM__1.Party.m__PermState;</State>
<Country)&TXN.m__BorrowerList.ITEM__3.m__BorrowerList.ITEM__1.Party.m__PermCountry;</Country>
</PermAddress>
</Borrower)
<Borrower>
<ComplexName)
<FirstName>&TXN.m__BorrowerList.ITEM__3.m__BorrowerList.ITEM__2.Party.m__FirstName;</FirstName>
<LastName>&TXN.m__BorrowerList.ITEM__3.m__BorrowerList.ITEM__2.Party.m__LastName;</LastName>
</ComplexName>
<PermAddress>
<Street>&TXN.m__BorrowerList.ITEM 3.m__BorrowerList.ITEM__2.Party.m__PermStreet1;</Street>
<City>&TXN.m__BorrowerList.ITEM__3.m__BorrowerList.ITEM__2.Party.m__PermCity;</City>
<State>&TXN.m__BorrowerList.ITEM__3.m__BorrowerList.ITEM__2.Party.m__PermState;</State>
<Country>&TXN.m__BorrowerList.ITEM__3.m__BorrowerList.ITEM__2.Party.m__PermCountry;</Country>
</PermAddress>
</Borrower>
</BorrowerGroup></BorrowerGroup>
```

It is noted that the above listing was generated from a catalog that continued from the partial catalog shown in Table 18 above. Since the entire catalog is very large, only a portion was provided in Table 18 to illustrate the advantageous use of iterators in accordance with one embodiment of the present invention.

The concept of an iterator will now be expressed in terms of its specific use as a Storage Manager 154 within the context of the embodiments illustrated in FIGS. 9C and 10. In the following illustrative example, the more important steps involved in constructing a document in accordance with these embodiments are described. These document construction steps include:

STEP 1—collecting transaction data (instantiating business objects);

STEP 2—publishing data (each business object writes itself to a catalog);

STEP 3—autoselection (transform the Comprehensive Document List to the Suggested Document List);

STEP 4—interacting with the user to create the Selected Document List from the Suggested Document List;

STEP 5—determining whether additional data must be collected and, if so, notifying the user;

STEP 6—generating documents (resolving document entities); and

STEP 7—formatting, previewing, and printing a resolved document.

In this illustrative example, it is assumed that an Iterator Storage Manager declaration is defined and is included in a Catalog 26 in accordance with the following syntax:

TABLE 21

| | |
|---|---|
| ENTITY entity-name | "ITR:itr-file-name//parm-name-1 (start-value[ end-value])// . . . //parm-name-n(start-value[ end-value])" |
| itr-file-name | The content to be iterated. The content must be in a file. The file name can be entered directly or referenced as an entity. If an entity name is used, the content can be replaced/overridden by normal catalog precedence. |
| parm-name-? | The name of the parameter. This is a name that appears between pound marks (#) in itr-file-name. For each parm-name, a stack is created, such that a value can be set and manipulated. |
| start-value | The first value to be substituted for the associated parm-name. An entity name can be used. If end-value is omitted, a string or an entity that returns a string can be used. Otherwise, start-value must be an integer or an entity name that resolves to an integer. |
| end-value | The last value to be substituted for the associated parm-name. If end-value is omitted or if end-value is the same as start-value, itr-file-name is iterated once using start-value. If end-value is supplied, itr-file-name is iterated for each integer value between start-value and end-value incrementing by +1 each time. If end-value is supplied, and if end-value is less than start-value, itr-file-name is not iterated. An entity name that returns an integer can be used. |

It is noted that the start and end values for parms can be qualified by parm-name delimited by pound marks in the same way that parameter names are qualified in itr-filename. It is further noted that there is no mark between the start and end value. This allows the values be returned by a rule as a list.

The content to be iterated, itr-file-name, must contain SGML processing instructions for each parm-name in order to control the scope of iteration. In Table 22 below, there is provided sample catalog entries that use the itr-file-name language provided in Table 23.

TABLE 22

ENTITY PartyInfo "ITR:&pPartyInfo;//PartyItem(1 &NumberParties;)//AddressNumber(1 &Party__#PartyItem#.NumberofAddresses;)"
ENTITY pPartyInfo "FILE:Borrow.itr".

TABLE 23

```
<!-- File name: BORROW.ITR -->
<?SCOPE PartyItem>
<PartyInfo>
    <Name prefix="Name of
    Debtor">&Party__#PartyItem#.Name;</Name>
    <?SCOPE AddressNumber>
    <Address>&Party__#PartyItem#.Address__#AddressNumber#;</Address>
    <?ENDSCOPE AddressNumber>
    <Phone>&Party__#PartyItem#.Phone;</Phone>
</PartyInfo>
<?IF &Party__#PartyItem.Type EQ "ABC"
    <specialFlag>
<?ENDIF>
<?ENDSCOPE PartyItem>
```

The following processing instructions can be included in itr-file-name:

TABLE 24

| | |
|---|---|
| SCOPE parm-name | Marks the beginning of the language to be varied over the range of values for parm-name. When SCOPE is encountered, the start-value and end-value values for parm-name are resolved, based on the system ID. This allows the iteration to be iteration to be customized for each specific scope. |
| ENDSCOPE parm-name | Marks the end of the language to be varied over the range of values for parm-name. |

TABLE 24-continued

| | |
|---|---|
| IF parmstring EQ "value" | Marks the beginning of language to be incorporated if the condition is true. IFs can be nested. |
| ENDIF | marks the end of language conditioned by IF. |
| PUSH parm-name parm-string | Save the current value of parm-name in a last-in, first-out stack, and replace it with parm-string. |
| POP parm-name | Restore the saved value of parm-name. |
| #parm-name# | Pound marks are used to delimit parm-name. Each time parm-name appears between the pound mark delimiters, it will be replaced by the current value of parm-name. |
| parm-string | Any sequence of printable ASCII characters. If the sequence contains a subsequence delimited by pound marks (#), the subsequence will be processed as a parm-name. |

In a lending transaction, for example, there can be any number of co-parties to the transaction. Some of the co-parties may be co-signers, some may be guarantors, and the like. It may be desirable to list all parties in the documents, others may list only a specific party. In accordance with this example, the following assumptions are made. There exists a Parties business object which defines some data objects and a collection of items. The data objects of the Parties business object are m__Count, m__Name, m__SubName. Its item collection contains one or more Party or Parties objects and can return the type of each object. The Party data object has data objects m__Name, m__SubName, m__Phone, a collection of Address objects called m__Address, and a collection of Signer data objects called m__Signers. The Signer object has data objects m__Name, and m__Title. Each collection and data object is instantiated with a PubInfo property that the object uses when it publishes itself. Each collection has an m__count property that returns the number of objects it contains. It is further assumed that the Parties business object is instantiated with the following values:

TABLE 25

| VARIABLE NAME | VALUE | PUBINFO |
|---|---|---|
| Parties.m__Name | | Parties.Name |
| Parties.m__SubName | | Parties.SubName |
| Parties.m__Count | 2 | Parties.Count |
| Parties.Item(1).Type | PARTY | Parties.Item__1.Type |
| Parties.Item(1).m__Name | John Jones | Parties.Item__1.Name |
| Parties.Item(1).m__SubName | | Parties.Item__1.SubName |
| Parties.Item(1).m__Address.Count | 3 | Parties.Item__1.Address.Count |
| Parties.Item(1).m__Address(1) | 123 Easy Street | Parties.Item__1.Address__1 |
| Parties.Item(1).m__Address(2) | PO Box 456 | Parties.Item__1.Address__2 |
| Parties.Item(1).m__Address(3) | Anywhere, USA | Parties.Item__1.Address__3 |
| Parties.Item(1).m__Phone | 555-1234 | Parties.Item 1.Phone |
| Parties.Item(2).Type | PARTY | Parties.Item 2.Type |
| Parties.Item(2).m__Name | Tim Allen | Parties.Item 2.Name |
| Parties.Item(2).m__SubName | | Parties.Item 2.SubName |
| Parties.Item(2).m__Address.Coun | 1 | Parties.Item__2.Address.Count |
| Parties.Item(2).m__Address(1) | Washington, DC | Parties.Item__2.Address |
| Parties.Item(2).m__Phone | 555-5432 | Parties.Item__2.Phone |

Further, it is assumed that there is a document, Document A, that needs to contain party information for each party. There is another document, Document B, that needs to contain party information about Party 2. The DTD fragment of the document is give by:

TABLE 26

```
<!ELEMENT PartyInfo - O (Name , Address*, Phone?)>
<!ELEMENT Name - O (#PCDATA) --<Title>Name-- >
<!ELEMENT Address - O (#PCDATA) --<Title>Address-- >
<!ELEMENT Phone - O (#PCDATA)>
<!ATTLIST (Name | Phone) Prefix CDATA #IMPLIED>
```

Document A is given by &PartiesInfo, Document B is given by MyPartyInfo, and the applicable catalog portion is give by the following:

TABLE 27

```
ENTITY PartiesInfo "ITR:&pPartyInfo;//PartyItem(1
    &Parties.Count;)//AddressNumber(1
    &Parties.Party_#PartyItem#.NumberofAddresses;)"
ENTITY pPartyInfo "FILE:Borrow.itr"
ENTITY MyPartyInfo
"ITR:&pPartyInfo;//PartyItem(&MyPartyNumber;)//AddressNumber
(1 &Parties.Party_#PartyItem#.Address.Count;)
```

It is further assumed that the file BORROWER.ITR is given by:

TABLE 28

```
<!-- File name: BORROW.ITR -->
<?SCOPE PartyItem>
<PartyInfo>
    <Name prefix="Name of
Debtor">&Parties.Item_#PartyItem#.Name;</Name>
    <?SCOPE AddressNumber>
<Address>&Parties.Item_#PartyItem#.Address_#AddressNumber#;
</Address>
    <?ENDSCOPE AddressNumber>
    <Phone>&Parties.Item_#PartyItem#.Phone;</Phone>
    </PartyInfo>
<?ENDSCOPE PartyItem>
```

When it publishes itself, the Parties business object creates the following catalog:

TABLE 29

```
File name: Parties.cat
Date created: 9/14/95
ENTITY Parties.Name "LIT:"
ENTITY Parties.SubName "LIT:"
ENTITY Parties.Count "INT:2"
ENTITY Parties.Item_1.Type "LIT:PARTY"
ENTITY Parties.Item_1.Name "LIT:John Jones"
ENTITY Parties.Item_1.SubName "LIT:"
ENTITY Parties.Item_1.Address.Count "INT:3"
ENTITY Parties.Item_1.Address_1 "LIT:123 Easy Street"
ENTITY Parties.Item_1.Address_2 "LIT:PO Box 456"
ENTITY Parties.Item_1.Address_3 "LIT:Anywhere, USA"
ENTITY Parties.Item_1.Phone "LIT:555-1234"
ENTITY Parties.Item_2.Type "LIT:PARTY"
ENTITY Parties.Item_2.Name "LIT:Tim Allen"
ENTITY Parties.Item_2.SubName "LIT:"
ENTITY Parties.Item_2.Address.Count "INT:1"
ENTITY Parties.Item_2.Address_1 "LIT:Washington, DC"
ENTITY Parties.Item_2.Phone "LIT:555-5432"
```

At STEP 3 described hereinabove, the autoselection process, which is described in Appendix IV hereinbelow, determines that Document A is required and that Document B is required for party 2. The autoselection process causes the following document catalog for the Notice to Cosigner to be created:

TABLE 30

```
File name: DocumentB.cat
Date created: 9/14/95
ENTITY MyPartyNumber "INT:2"
```

At STEP 4, it is assumed that the user makes no changes in the Suggested Document List, so the Selected Document List is identical to the Suggested Document List and there is no additional data to collect. At STEP 6 (generate documents), Document A is resolved first. The following actions take place:

TABLE 31

```
&PartiesInfo; is resolved via the BSI catalog to
systemID"ITR:&pPartyInfo;//PartyItem(1&Parties.NumberOfParties;)
//AddressNumber(1&Party_#PartyItem#.NumberOfAddresses;)"
The ITR Storage Manager creates stacks for PartyItem and
AddressNumber. The initial values pushed on the stacks are
PartyItem(1) and AddressNumber(1). When the SCOPE PartyItem
instruction is read, ITR duplicates PartyItem and pushes it
on the stack. For the first part of the scope, it emits:
    <PartyInfo>
        <Name prefix="Name of
Debtor">&Parties.Item_1.Name;</Name>
When the SCOPE AddressNumber processing instruction is read, the
ITR Storage Manager resolves the end-value for AddressNumber to 3 by
resolving Paries.Item_1.Address.Count. It duplicates the current
value of AddressNumber and pushes it on the stack.
Processing the scope for AddressNumber it emits:
    <Address>&Parties.Item_1.Address_1;</Address>
The ENDSCOPE AddressNumber processing instruction increments
AddressNumber by 1 and compares to the end value. Since it is not
greater, control cycles to the SCOPE AddressNumber statement.
The ITR Storage Manager emits:
    <Address>&Parties.Item_1.Address_2;</Address>
Again, the ENDSCOPE AddressNumber increments AddressNumber
and cycles:
    <Address>&Parties.Item_1.Address_3;</Address>
Now when ENDSCOPE AddressNumber increments AddressNumber
the value becomes greater than the end value, so it is popped off the
stack, leaving AddressNumber with a value of 1. The ITR
Storage Manager emits the rest of pPartyInfo:
    <Phone>&Parties.Item_1.Phone;</Phone>
    </PartyInfo>
The ENDSCOPE PartyItem causes PartyItem to be incremented to 2.
Since the value is not greater than the end value, control returns
to SCOPE PartyItem. The ITR Storage Manager emits:
    <PartyInfo>
        <Name prefix="Name of
Debtor">&Parties.Item_2.Name;</Name>
The ITR Storage Manager duplicates AddressNumber and pushes
it on the stack. It resolves the endvalue to 1. With a
value of 1 it emits
    <Address>&Parties.Item_2.Address_1;</Address>
The ENDSCOPE AddressNumber increments AddressNumber and
finds it exceeds endvalue. It pops the 2 (leaving 1) and moves on. The
ITR Storage Manager emits the rest of pPartyInfo:
    <Phone>&Parties.Item_2.Phone;</Phone>
    </PartyInfo>
The SGML Parser has been out of the picture since it requested
resolution of &PartiesInfo;. Now the parser has the following
SGML to work with:
    <PartyInfo>
        <Name prefix="Name of
Debtor">&Parties.Item_1.Name;</Name>
        <Address>&Parties.Item_1.Address_1;</Address>
        <Address>&Parties.Item_1.Address_2;</Address>
        <Address>&Parties.Item_1.Address_3;</Address>
        <Phone>&Parties.Item_1.Phone;</Phone>
</PartyInfo>
<PartyInfo>
        <Name prefix="Name of
Debtor">&Parties.Item_2.Name;</Name>
```

TABLE 31-continued

```
    <Address>&Parties.Item_2.Address_1;</Address>
    <Phone>&Parties.Item_2.Phone;</Phone>
</PartyInfo>
```

The SGML of Table 32 represents the SGML returned to the Entity Manager 152 by the Iterator Storage Manager 154. The SGML Parser 150 then works its way through this SGML and resolves each entity. The entities are resolved from the catalog created by the Parties business object. After resolving these entities, the SGML for Document A appears as follows:

TABLE 32

```
<PartyInfo>
    <Name prefix="Name of Debtor">John Jones</Name>
    <Address>123 Easy Street</Address>
    <Address>PO Box 456</Address>
    <Address>Anywhere, USA</Address>
    <Phone>555-1234</Phone>
</PartyInfo>
<PartyInfo>
    <Name prefix="Name of Debtor">Tim Allen</Name>
    <Address>Washington, DC</Address>
    <Phone>555-5432</Phone>
</PartyInfo>
```

The next action in STEP 6 is to resolve Document B. The Document B catalog produced by the autoselection process is pushed on top of the catalog stack. Document B is resolved in accordance with the following actions:

TABLE 33

```
&MyPartyInfo; is resolved via the BSI catalog to
systemID"ITR:&pPartyInfo;//PartyItem(&MyPartyNumber;)
//AddressNumber(1&Parties.Party_#PartyItem#.NumberofAddresses;)"
The ITR Storage Manager resolves MyPartyNumber to 2 (via the
document B catalog), resolves PartyItem to 2, and emits:
    <PartyInfo>
        <Name prefix="Name of
        Debtor">&Parties.Item_2.Name;</Name>
The ITR Storage Manager resolves AddressNumber to 1 and emits
        <Address>&Parties.Item_2.Address_1;</Address>
The ITR Storage Manager emits the rest of pPartyInfo:
        <Phone>&Parties.Item_2.Phone;</Phone>
    </PartyInfo>
The SGML Parser has been out of the picture since it requested
resolution of &MyPartyInfo;. Now the parser has the following
SGML to work with:
    <PartyInfo>
        <Name prefix="Name of
        Debtor">&Parties.Item_2.Name;</Name>
            <Address>&Parties.Item_2.Address 1;</Address>
            <Phone>&Parties.Item_2.Phone;</Phone>
    </PartyInfo>
```

After resolving these entities from the catalog produced by the Parties business object, the SGML for Document B appears as follows:

TABLE 34

```
<PartyInfo>
    <Name prefix="Name of Debtor">Tim Allen</Name>
    <Address>Washington, DC</Address>
    <Phone>555-5432</Phone>
</PartyInfo>
```

By way of further example, in a lending transaction, the signatures need to be properly associated with one another and with other transaction data. A given participant of the transaction, such as a corporation, may be composed of multiple business entities, each of which may require multiple signatures. The following is an exemplary signature block:

TABLE 35

BY SIGNING BELOW I ACKNOWLEDGE RECEIPT OF A COPY OF THIS DISCLOSURE ON THE DATE INDICATED ABOVE.
Acme Company
A Wisconsin corporation
JohnJones,Treasurer
The XYZ Partnership, a partnership formed under Minnesota law.
ABC Partners
JohnAdams,Secretary
DEF, Incorporated
JillWilson,President
ClarkKent,VicePresident In accordance with this example, it is assumed that there is a Parties business object that contains some data objects and a collection of items. Its data objects are m_Count, m_Name, m_SubName. Its item collection contains one or more Party or Parties objects and can return the type of each object. It is further assumed that the Party data object has data objects m_Name, m_SubName, and a collection of Signer data objects called m_Signers. The Signer object has data objects m_Name, and m_Title. Each collection and data object is instantiated with a PubInfo property that the object uses when it publishes itself. Each collection has an m_count property that returns the number of objects it contains. The Parties business object is instantiated with the following values:

TABLE 36

| Variable name | Value | PubInfo |
| --- | --- | --- |
| Parties.m_Name | | Parties.Name |
| Parties.m_SubName | | Parties.SubName |
| Parties.m_Count | 2 | Parties.Count |
| Parties.Item(1).Type | PARTY | Parties.Item_1.Type |
| Parties.Item(1).m_Name | Acme Company | Parties.Item_1.Name |
| Parties.Item(1).m_SubName | A Wisconsin corporation | Parties.Item_1.SubName |
| Parties.Item(1).m_Count | 1 | Parties.Item_1.Count |
| Parties.Item(1).m_Signers(1).Name | John Jones | Parties.Item_1.Signer_1.Name |
| Parties.Item(1).m_Signers(1).SubName | Treasurer | Parties.Item_1.Signer_1.SubName |
| Parties.Item(2).Type | PARTIES | Parties.Item_2.Type |
| Parties.Item(2).m_Count | 2 | Parties.Item_2.Count |
| Parties.Item(2).m_Name | The XYZ Partnership | Parties.Item_2.Name |
| Parties.Item(2).m_SubName | a partnership formed under Minnesota law | Parties.Item_2.SubName |
| Parties.Item(2).Item(1).Type | PARTY | Parties.Item_2.Item_1.Type |
| Parties.Item(2).Item(1).m_Name | ABC Partners | Parties.Item_2.Item_1.Name |
| Parties.Item(2).Item(1).m_SubName | | Parties.Item_2.Item_1.SubName |
| Parties.Item(2).Item(1).m_Count | 1 | Parties.Item_2.Item_1.Count |
| Parties.Item(2).Item(1).m_Signers(1).Name | John Adams | Parties.Item_2.Item_1.Signer_1.Name |
| Parties.Item(2).Item(1).m_Signers(1).SubName | Secretary | Parties.Item_2.Item_1.Signer_1.SubName |
| Parties.Item(2).Item(2).Type | PARTY | Parties.Item_2.Item_2.Type |
| Parties.Item(2).Item(2).m_Name | DEF, Incorporated | Parties.Item_2.Item_2.Name |
| Parties.Item(2).Item(2).m_SubName | | Parties.Item_2.Item_2.SubName |
| Parties.Item(2).Item(2).m_ | 2 | Parties.item_2.Item_2. |

TABLE 36-continued

| Variable name | Value | PubInfo |
| --- | --- | --- |
| Count Parties.Item(2).Item(2).m__Signers(1).Name | Jill Wilson | Count Parties.Item__2.Item__2.Signer__1.Name |
| Parties.Item(2).Item(2).m__Signers(1).SubName | President | Parties.Item__2.Item__2.Signer__1.SubName |
| Parties.Item(2).Item(2).m__Signers(2).Name | Clark Kent | Parties.Item__2.Item__2.Signer__2.Name |
| Parties.Item(2).Item(2).m__Signers(2).SubName | Vice President | Parties.Item__2.Item__2.Signer__2.SubName |

Finally, it is assumed that there is a document (Document A) that needs to contain signer information for each party. The DTD fragment for the document is given by:

TABLE 37

```
<!ELEMENT Signatures - - (SigDisclosure, SigParties)>
<!ELEMENT SigParties - - ( (Name, SubName?)?, (SigParty|Sig
Parties)+)>
<!ELEMENT SigParty    - - ( (Name, SubName?)?, Signer+)>
<!ELEMENT Signer      - - (SigLine, Name, Title?)>
<!ELEMENT (SigDisclosure|Name|Subname|Title|SigLine) - -
(#PCDATA)>
```

Document A, requiring a signature block, includes the following declaration:

TABLE 38

```
<Signatures>
&BSI.LNG.SigDisclosure;
<SigParties>&BSI.DTA.SigPartiesIterator;</SigParties>
</Signatures>
```

The BSI catalog portion is given by:

TABLE 39

```
ENTITY BSI.LNG.SigDisclosure "FILE:SigAck.SGM"
ENTITY BSI.DTA.SigPartiesIterator
"ITR:sigparties.itr//Parent (Parties)//PartyItem(1
&#parent#.Count;)//PartySigner (1 &#Parent#.Count;)
```

It is assumed that the file SIGACK.SGM is given by:

TABLE 40

```
<!-- File name: SIGACK.SGM -->
<SigDisclosure>By signing below I acknowledge receipt of a
copy of this disclosure on the date indicated
above.</SigDisclosure>
```

It is further assumed that the file SigParties.ITR is given by:

TABLE 41

```
<!-- Iterator for Parties (sigparties.sgm) -->
<?SCOPE PartyItem>
<?PUSH Parent #Parent#.Item_#PartyItem#>
<?IF &#Parent#.Type; EQ "PARTY">
<SigParty>
    <Name>&#Parent#.Name; </Name>
    <SubName>&#Parent#. SubName; </SubName>
    <?SCOPE Partysigner>
<Signer><SigLine>_____</SigLine>
    <Name>&#Parent#.Signer_#PartySigner#.Name; </Name>
<Title>&#Parent#.Signer_#PartySigner#.SubName;</Title></Sig
```

TABLE 41-continued

```
ner>
    <?ENDSCOPE PartySigner>
    </SigParty>
<?ENDIF>
<?IF &#parent#.Type; EQ "PARTIES">
    <Name>&#Parent#.Name; </Name>
    <SubName>&#Parent#.SubName; </SubName>
    <?PUSH PartyItem 1>
    #SigParties>&BSI.DTA.SigPartiesIterator;</SigParties>
    <?POP PartyItem>
<?ENDIF>
<?POP Parent>
<?ENDSCOPE PartyItem>
```

Document A is selected via either the autoselection or user selection process. After entity &BSI.LNG.SigDisclosure is resolved, the following code is produced:

```
<Signatures>
&BSI.LNG.SigDisclosure;
```

Next, the SGML Parser 150 encounters the line containing the iterator entity reference. Before reaching the entity reference, the SGML Parser 150 reads and emits the start tag:

```
<SigParties>.
```

The SGML Parser 150 then resolves &BSI.DTA.SigParties Iterator using the Entity Manager 152. The Entity Manager 152 locates the reference to Storage Manager 'ITR' (Iterator 161) and passes it the value:

TABLE 42

"sigparties.itr//Parent (Parties) //PartyItem (1&#Parent# .Count;) //PartySigner (1 &#Parent#. Count;)"

The Iterator Storage Manager 161 creates stacks for Parent, PartyItem, and PartySigner. Parent has the value 'Parties" pushed on it, while PartyItem and PartySigner receive the value '1'. Then the Storage Manager ITR opens file sigparties.itr and begins to process it. First, the Storage Manager ITR encounters the SCOPE statement for PartyItem. It duplicates the stack value for PartyItem and pushes it on the PartyItem stack. Next, the Store Manager ITR encounters a Push processing instruction for the Parent stack. After processing it, Parent has the value "Parties.Item__1" above the initial value of "Parties". The first IF in sigparties.itr resolves to:

```
<?IF &Parties.Item__1.Type; EQ "PARTY">.
```

Further, Entity &Parties.Item__1.Type; is resolved from the business object catalog to the value "PARTY." Therefore, the SGML conditioned by the IF is read next. The SGML down to the SCOPE statement is generally routine. After processing, the following SGML is emitted:

TABLE 43

```
<SigParty>
<Name>&Parties.Item_1.Name;</Name>
<SubName>&Parties.Item_1.SubName;</SubName>.
```

The SCOPE PartySigner statement duplicates the value on the PartySigner stack and pushes it on the stack. It now has a value of '1'. The next lines emitted are:

TABLE 44

```
<Signer><SigLine>_____</SigLine>
    <Name>&Parties.Item_1.Signer_1.Name;</Name>
    <Title>&Parties.Item_1.Signer_1.SubName;</Title></Signer>
```

The ENDSCOPE PartySigner statement causes the value on the PartySigner stack to be incremented by 1. The new value of 2 is compared to the end value. Since the end value is 1, ENDSCOPE causes the PartySigner stack to be popped and control moves to the next line of SGML. The SigParty end tag is emitted. At this point, all of the SGML emitted thus far is given by:

TABLE 45

```
<Signatures>
&BSLLNG.SigDisclosure;
<SigParties>
<SigParty>
<Name>&Parties.Item_1.Name;</Name>
<SubName>&Parties.Item_1.SubName;</SubName>
<Signer><SigLine>_____</SigLine>
<Name>&Parties.Item_1.Signer_1.Name;</Name>
<Title>&Parties.Item_1.Signer_1.SubName;</Title></Signer>
</SigParty>
```

The ENDIF processing instruction terminates the lines of SGML conditioned by IF.

Now, the next IF of Table 41 is evaluated. Its result will be false because the current type is PARTY. Therefore, control will drop to the matching ENDIF. The next statement is a POP processing instruction. Its effect is to change the Parent stack back to the original value of 'Parties'. The ENDSCOPE PartyItem processing instruction is next encountered. This causes the value of the PartyItem stack to be incremented by 1. The new value of 2 is compared to the end value. Since the end value is 2, iteration is indicated. Control returns to the SCOPE PartyItem statement. A new value in pushed on the Parent stack. It now has the value 'Parties.Item_2'. Since Parties.Item_2.Type is 'PARTIES', the first IF is false and the second is true.

Within this conditional block, a '1' is first pushed on the PartyItem stack, then the start tag '<SigParties>' is emitted. Next the entity reference to the iterator is resolved via the Entity Manager 152. The Entity Manager 152 passes the string to the Iterator Storage Manager 161 as before. On initial processing, the Iterator Storage Manager 161 created three stacks for the parameters. Now, however, the Iterator Storage Manager 161 determines it already has those stacks, so it does not create them. The Iterator Storage Manager 161 uses the existing values, which are: Parent(Parties.Item_2), PartyItem(1), PartySigner(1).

Using these values, the Iterator Storage Manager 161 iterates across the contained Parties object, emitting SGML for the two Party objects and their contained signers. The complete SGML appears as follows:

TABLE 46

```
<Signatures>
&BSLLNG.SigDisclosure;
<SigParties>
<SigParty>
<Name>&Parties.Item_1.Name;</Name>
<SubName>&Parties.Item_1.SubName;</SubName>
<Signer><SigLine>_____</SigLine>
<Name>&Parties.Item_1.Signer_1.Name;</Name>
<Title>&Parties.Item_1.Signer_1.SubName;</Title></Signer>
</SigParty>
<SigParties>
<Name>&Parties.Item_2.Name;</Name>
<SubName>&Parties.Item_2.SubName;</SubName>
<SigParty>
<Name>&Parties.Item_2.Item_1.Name;</Name>
<SubName>&Parties.Item_2.Item_1.SubName;</SubName>
<Signer><SigLine>_____</SigLine>
<Name>&Parties.Item_2.Item_1.Signer_1.Name;</Name>
<Title>&Parties.Item_2.Item_1.Signer_1.SubName;</Title></Signer>
</SigParty>
<SigParty>
<Name>&Parties.Item_2.Item_2.Name;</Name>
<SubName>&Parties.Item_2.Item_2.SubName;</SubName>
<Signer><SigLine>_____</SigLine>
<Name>&Parties.Item_2.Item_2.Signer_1.Name;</Name>
<Title>&Parties.Item_2.Item_2.Signer_1.SubName;</Title></Signer>
<Signer><SigLine>_____</SigLine>
<Name>&Parties.Item_2.Item_2.Signer_2.Name;</Name>
<Title>&Parties.Item_2.Item_2.Signer_2.SubName;</Title></Signer>
</SigParty>
</SigParties>
</SigParties>
</Signatures>
```

The SGML in Table 46 above is handed back to the Entity Manager 152 which, in turn, passes it to the SGML Parser 150, which was the original client. The SGML is then parsed by the SGML Parser 150. After resolving all the entities, the following resolved document is produced:

TABLE 47

```
<Signatures>
<SigDisclosure>By SIGNING BELOW I ACKNCWLEDGE RECEIPT OF A COPY OF THIS DISCLOSURE ON THE DATE INDICATED ABOVE. </SigDisclosure>
<SigParties>
<SigParty>
<Name>Acme Company</Name>
<SubName>A Wisconsin Corporation</SubName>
<Signer><SigLine>_____</SigLine>
<Name>John Jones</Name>
<Title>Treasurer</Title></Signer>
</SigParty>
<SigParties>
<Name>The XYZ Partnership</Name>
<SubName>a partnership formed under Minnesota Law</SubName>
<Sigparty>
<Name>ABC Partners</Name>
<SubName></SubName)
<Signer><SigLine>_____</SigLine>
<Name>John Adams</Name>
<Title>Secretary</Title></Signer>
</SigParty>
<SigParty>
<Name>DEF, Incorporated</Name>
<SubName></SubName>
<Signer><SigLine>_____</SigLine>
<Name>Jill Wilson</Name>
<Title>President</Title></Signer>
<Signer><SigLine>_____</SigLine>
```

TABLE 47-continued

```
<Name>Clark Kent</Name>
<Title>Vice President</Title></Signer>
</SigParty>
</SigParties>
</SigParties>
</Signatures>
```

When resolving entity references, it is often necessary to resolve entity reference that will require the passing of one or more integers. The syntax of the catalog entry for an Integer Storage Manager 154 may be given as:

| ENTITY entity-name | "<INT>integer-as-string" |
|---|---| where, integer-as-string refers to the value of the integer expressed in printable ASCII characters. Sample catalog entries that refer to the Integer Storage Manager 154 may be given as:

| ENTITY Parties.Count "<INT>2" |
|---|
| ENTITY Parties.Item_1.Address.Count "<INT>3". |

The purpose of the Integer Storage Manager 154 is to provide a mechanism for exchanging integer numbers through an SGML catalog. In one embodiment, the client requesting resolution of an entity that is cataloged as INT must be prepared to receive a 32 bit integer.

The integer-as-string will be interpreted as follows. The fractional part of number, if it exists, is removed. If integer-as-string is negative and contains a fractional part, INT returns the first negative integer less than or equal to number. For example, INT converts −8.4 to −9. If integer-as-string contains commas (e.g., <INT>5,432,234), the commas are removed. If integer-as-string contains any characters other than [0–9–,], the number is interpreted as only the valid characters up to the first non-valid character.

Another Storage Manager is termed the Literal Storage Manager. The syntax of the catalog entry for a Literal Storage Manager is as follows:

| ENTITY entity-name "<LIT>literal-string" |
|---| where, literal-string refers to the value of the literal expressed in printable ASCII characters. The literal-string may contain entity references. Sample catalog entries that refer to the Literal Storage Manager are provided as follows:

| ENTITY Parties.Count "<LIT>John Jones" |
|---|
| ENTITY BSI.DTA.MNUCC11001 "<LIT>&BSI.DTA.LastName;, &BSI.DTA.FirstName;". |

The purpose of the Literal Storage Manager is to provide a mechanism for resolving entities that can be resolved with a single line of SGML. The alternative to a literal is to place the SGML in a file and use an OSFILE (default) Storage Manager 54. The literal-string will not be interpreted. Entity names are not validated. Everything starting with the first character after "<LIT>" up to the closing double quote will be returned to the client. It is the client's responsibility to parse the returned value, identify any entities, and request their resolution.

Another important Store Manager discussed hereinabove is an Inference Engine Storage Manager. The syntax of the catalog entry for an Inference Engine Storage Manager is given by:

| ENTITY entity-name "<INFENG>INFENG-ID" |
|---| where, INFENG-ID refers to the name of a rule known to the INFENG Inference Engine 28. A sample catalog entry that refers to the INFENG Storage Manager is given as follows:

| ENTITY BSI.MSC.GarnishWages "<INFENG>GarnishingWages". |
|---|

The purpose of the INFENG Storage Manager is to provide a mechanism for invoking the INFENG Inference Engine 28 for resolving entity references. The INFENG-ID will be passed to the INFENG Inference Engine 28. The INFENG Storage Manager will return the string that results from its interaction with the INFENG Inference Engine 28. Before returning its result, INFENG may request other entity resolutions of the Entity Manager 152. As a consequence, the time to resolve a INFENG-ID is non-deterministic. It is the client's responsibility to parse the returned value, identify any entities, and request their resolution.

Figure 19:
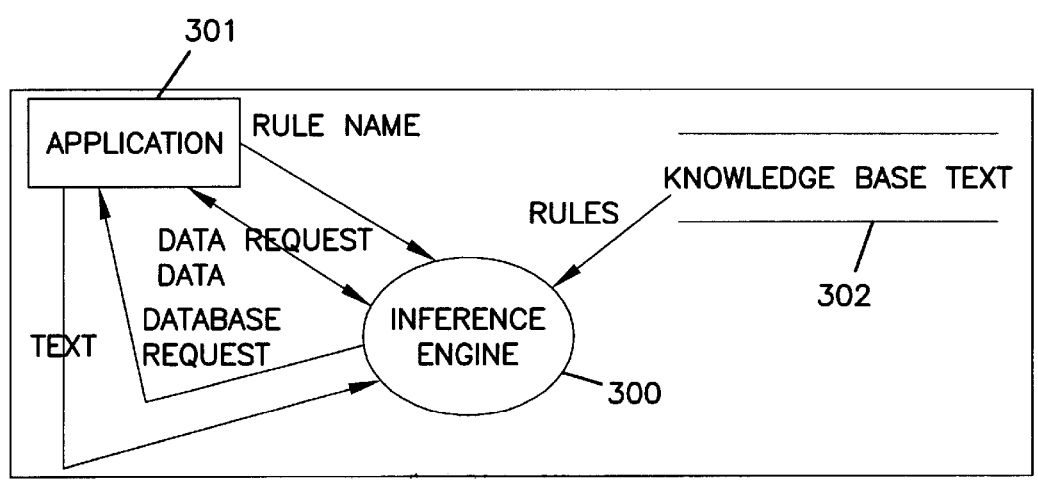
FIGS. 19–26 illustrate various aspects of an inference engine used to resolve entity references in accordance with one embodiment of the present invention.

Referring now to FIGS. 19–26, there is provided a more detailed illustration of one embodiment of an exemplary Inference Engine. The Inference Engine 300 is an architectural component of the dynamic document construction apparatus of the present invention that is intended to be independent of any specific application. It is useful for purposes of explanation to discuss an events list that describes the context in which the Inference Engine 300 will be used. With reference to FIG. 19, the events that define the use of the Inference Engine 300 component are as follows. First, an Application 301 requests that the Inference Engine Parser parse a specific file. Second, the Application 301 requests that the Inference Engine 300 execute a specific rule name. Third, the Inference Engine 300 requests the Application 301 to position itself to specific database records. Fourth, during the processing of a rule, the Inference Engine 300 requests data from the Application 301. Fifth, the Inference Engine 300 returns results to the Application 301, and sixth, the Inference Engine 300 loads rules from the Knowledge Base 302.

Figure 20:
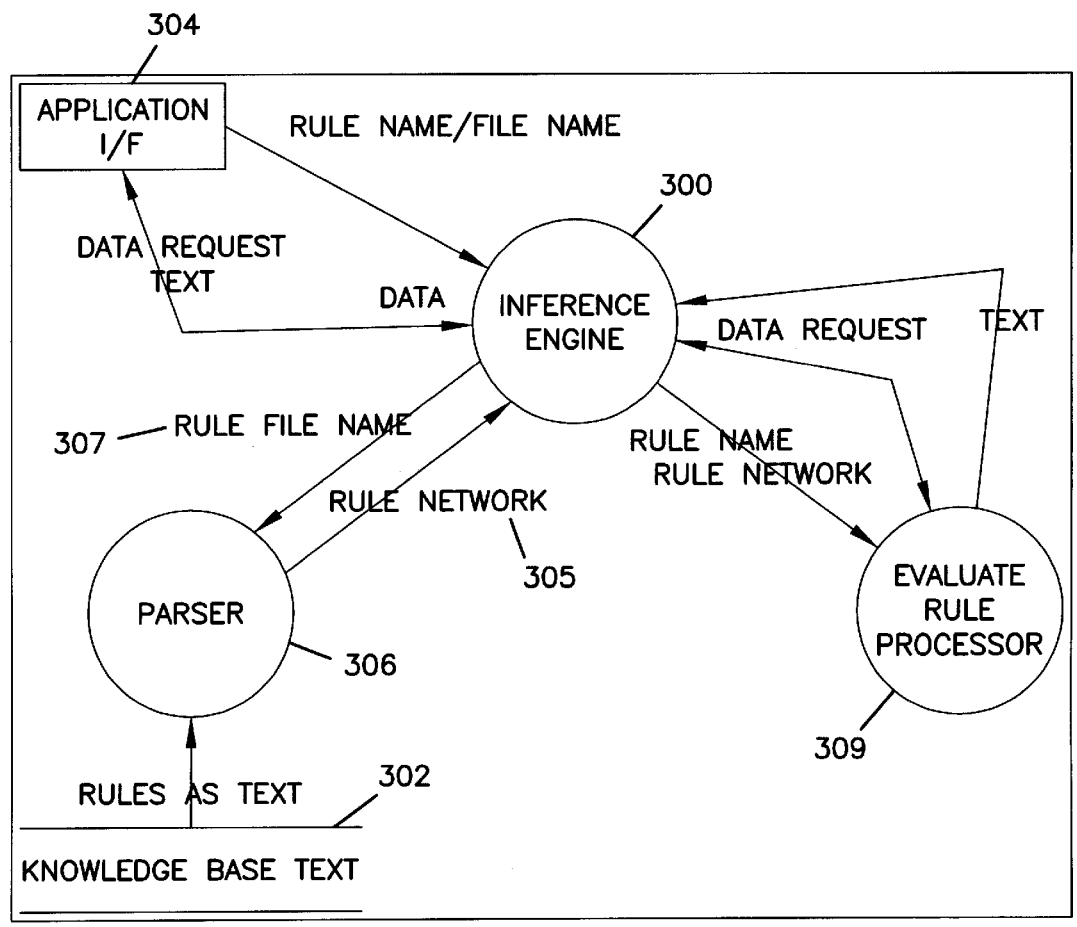

The dataflow diagram of FIG. 19 shows the Inference Engine Processor 300 as a single process that takes an initial request from an Application 301 to begin processing, and makes periodic requests to the Application 301 and Knowledge Base 302 to complete its task. In FIG. 20, there is depicted the basic processes associated with the operations of the Inference Engine 300. The Inference Engine 300 consists of three main processes. The Application Interface 304 takes a name that corresponds both to a text file containing the rules to execute and passes that name along to the Parser 306. The Parser 306 reads the text file and converts the text into an executable Rule Network 305 that is returned to the controlling Application Interface 304. The Rule Name 307 to execute and the Rule Network 305 are then passed to the Evaluate Rule Processor 309, which begins evaluating rules in the Rule Network 305 beginning with the rule corresponding to Rule Name 307.

The Rule Network 305 is composed of a collection of single rules, or Rule objects. The Rule Network 305 also contains values (strings, numbers, datas, times) to which a Rule resolves. Any element in the Rule Network 305 requires the ability to evaluate itself when requested. Given that the Rule Network 305 contains a heterogeneous collection of objects, polymorphism provides a basis for defining a unique method to evaluate any kind of object that exists in the Rule network 305 (e.g., the eval() method). Therefore, the Evaluate Rule Processor 309 may be viewed as a method of objects in the Rule Network 305. This requires that any object that may be placed in the Rule Network 305 is derived from a common parent class, namely, the AbstractRule class 310 shown in FIG. 21.

Figure 21:
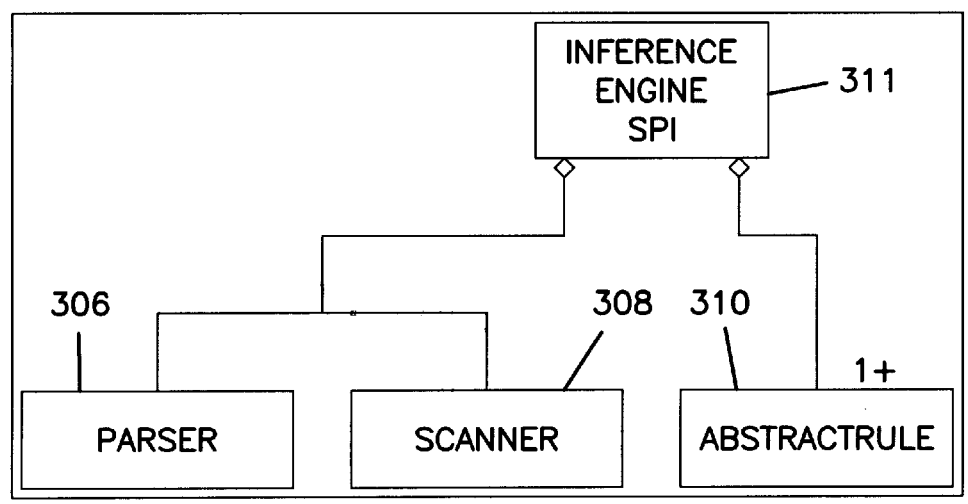

As is illustrated in FIG. 21, the Inference Engine SPI (Service Provider Interface) class 311 is the interface to all external clients of the Inference Engine 300. In one embodiment, the Inference Engine 300 is capable of parsing text files containing rules at runtime, and therefore, contains instances of the Rules Parser class 306 and Rules Scanner class 308. The Inference Engine SPI class 311 also contains an aggregation of AbstractRule objects 310. The Inference Engine SPI class 311 provides the interface to the Inference Engine 300, and includes a class constructor, destructor, and a member function that allows a client application to execute a specific Rule.

The Inference Engine SPI Constructor receives a path and file name as arguments. The file referenced by the file name contains the Inference Engine 300 language text. Once the file is opened, an instance of the Parser 306 is created and the input stream is passed to the Parser object. The Parser 306 parses the rules and returns the completed Rule Network 305 or an error status if it failed. EvaluateRule Method is a public member function that is used by the client application to invoke a specific rule from the Rule Network 305. EvaluateRule Method takes the rule name as an argument and returns a status indicating its success. The Rule object with the corresponding rule name is found in the Rule Network 305 and its evaluation method is executed. The success of the Rule object's evaluation is reported back to the application. The Inference Engine SPI Destructor deletes all objects that were created by the Parser and rule evaluation.

Figure 22:
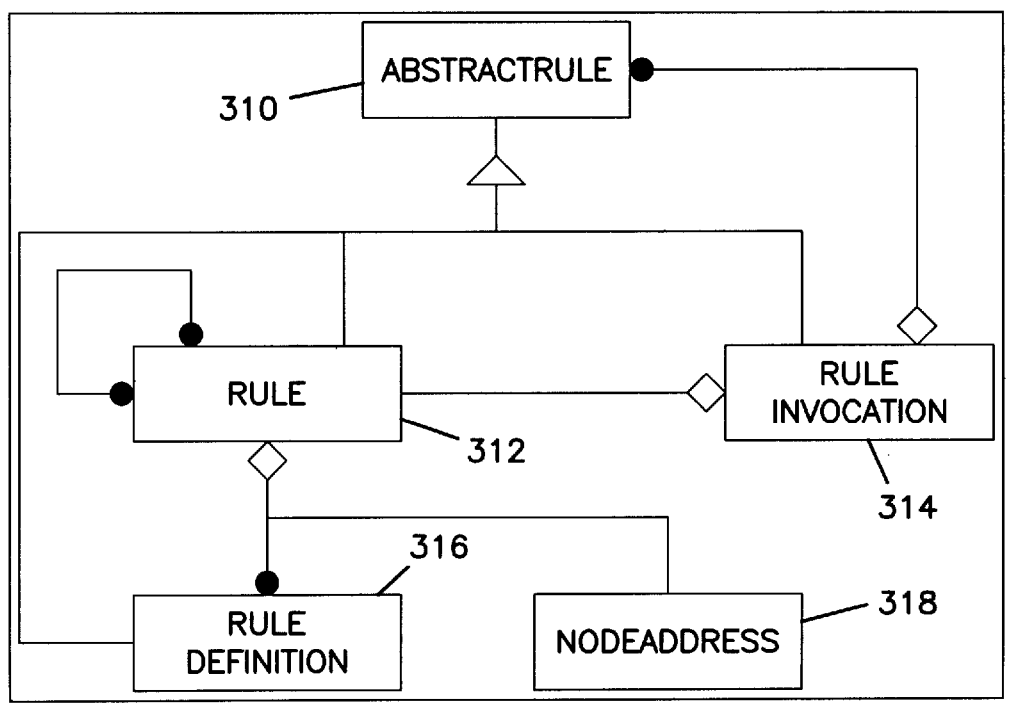
Figure 23:
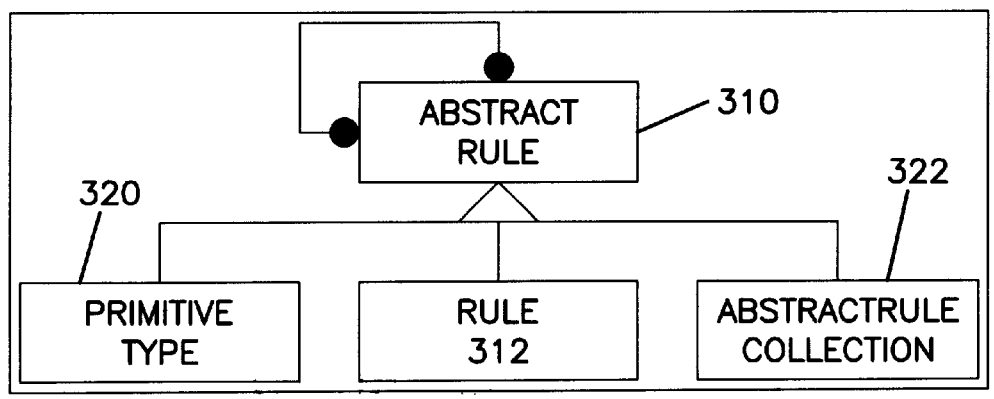

Turning now to FIGS. 22 and 23, there is illustrated various classes that are used by the Inference Engine SPI class 311. The basic data structure generated by the Parser 306 and evaluated at runtime is the Rule object 312. The requirements for a Rule include identification, annotation, self evaluation, referencing, parameter acceptance, multiple definitions, and runtime assignment. Any instance of the Rule class requires a name. The class itself requires a unique identifier (identification). Any instance of a Rule requires a textual description of its function (annotation). A Rule object needs to respond to requests to evaluate itself. In the course of evaluating itself, the rule may send messages to other rules to evaluate themselves (self evaluation). New rules may be declared within a rule. Execution of the definition of a rule may cause other rules to be evaluated (referencing). The definition of a rule should allow parameters to be passed to the rule when it Ls being evaluated. The number of parameters is referred to as the Rule's arity (parameter acceptance). For each arity, a Rule instance may have multiple definitions as well as a default definition (multiple definitions). A value should be assignable to a rule at runtime (runtime assignment).

Most classes used in the Inference Engine 300 are derived from a common base class, the AbstractRule class 310. It is an abstract class that is inherited by all classes that may be placed in the Rule Network 305. The AbstractRule class 310 provides for the production of heterogeneous collections of classes that are derived from the AbstractRule class 310. The term abstract class implies that no instances of this class may be created. This class is the root or parent class of all classes used in the Inference Engine 300 system. A description of the AbstractRule class 310 is provided below in Table 48.

TABLE 48

| ATTRIBUTES: | |
| --- | --- |
| className | A static unique character class identifier that child classes may override. |
| classType | A static unique numeric class identifier that child classes may override. |
| SERVICES: | |
| isa | A virtual function that returns the classType attribute. It is used for telling objects of different type apart. |
| compare | A virtual function that takes another object whose base class is AbstractRule and compares it to the current instance. If the current instance's classType is greater than that of the parameterized object one is returned. If the current instance's classType is less than that of the other object, negative one is returned. If the current object and the object it is comparing itself with are of the same classType a class-specific comparison is used. Zero is returned only if the current object and the one it is compared with are of the same classType and compare equivalent by the class-specific comparison. |
| eval | Returns a pointer to the Abstract Rule itself. Derived classes may override this definition to add more complex behavior. a For instance, a Rule object would perform the operations specified by its definition. |
| print | Prints the contents of the object. This is a virtual function that must be overridden for each derivation of this class. |

Based upon the requirements mentioned above, the following definition of the Rule class 312 is provided below in Table 49:

TABLE 49

Inherits from the AbstractRule class.

| ATTRIBUTES: | |
| --- | --- |
| Name | The name of the rule represented in a specific instance. |
| Declarations | A collection of rules that were declared within the rule. The Declaration is the collection that actually forms the Rule Network (see discussion of the Parser). |
| NodeAddress | The location of a Rule instance within the Rule Network (Rule Network is discussed later). |
| Definitions | A collection of all possible definitions of this Rule instance. The Definitions are used to evaluate a Rule. |
| Annotation | Text that describes/documents this Rule instance. |
| Root | A static pointer to a Rule instance which designates the root node of the Rule Network. |
| FirstFunctional | Indicates the index into the Declarations array of the first |

TABLE 49-continued

Inherits from the AbstractRule class.

| | |
|---|---|
| | parameter or functional Rule declared in this Rule. (see discussion of the Parser). |
| SERVICES: | See the AbstractRule class of Table 48. |

It can be seen that the Rule, Rule Invocation, and Rule Definition classes inherit from the AbstractRule class 310. Since new Rule objects may be defined within a rule, each Rule object may contain a collection of Rule objects that have been declared within it. These declarations define the Rule Network 305 as discussed below. The NodeAddress class 318 and Rule Invocation class 314 are also discussed below within the context of the Rule Network 305.

The goal of the Parser 306 is to produce the Rule Network 305. The Rule Network 305 is a data structure that allows rules to be evaluated. The Rule Network 305 produced by the Parser 306 contains collections of Rule objects. Upon evaluating Rule objects, Primitive Type objects (String, Number, Date, and Time) and Structured objects (Lists and Rules) may be added to the Rule Network 305. During evaluation, it may be desirable to assign a value to a Rule object. This is accomplished by replacing the Rule object in the Rule Network 305 with the object representing the value, such as a number or a string.

A diagrammatic model of the Rule Network 305 is illustrated in FIG. 23. The Rule Network 305 may contain instances of derivations of the AbstractRule class 310 (Primitive Types, and Structured Types). AbstractRule Collection 322 is a heterogeneous collection containing instances of classes derived from AbstractRules 310. Since the Rule Network 305 itself constitutes collections of collections, a collection class, AbstractRule Collection 322, is derived from AbstractRule 310. The Rule Network 305 as created by the Parser 306 will contain only Rules. Instances of Primitive Type objects are not introduced until Rule objects are evaluated.

Initially, when the Parser 306 creates the Rule Network 305, it only contains Rule objects. Each Rule object requires a unique address to indicate its location in the Rule Network 305 so that it may be referenced by other Rule objects. The Rule object's address in memory is generally not adequate for this purpose since, at evaluation time, it may be desired to replace the Rule in the Rule Network 305 with a value without destroying the Rule object being replaced. The NodeAddress class 318 is a class that generates and stores a unique address for each Rule in the Rule Network 305. Each Rule object preferably contains a pointer to an instance of the NodeAddress 318. During parsing of declarations and formal parameter lists, each Rule object is placed in the Rule Network 305. A Rule Object's location in the Rule Network 305 is calculated and assigned as a NodeAddress object 318. During execution, when a Rule is referenced, its NodeAddress is used to find the current occupant at that location in the Rule Network 305, and it is that occupant that is evaluated. It is noted that the original Rule object still exists in computer memory, even after assignment has placed a new object in the Rule Network 305 at that location.

A rule definition is created each time a rule is defined for a specific number of parameters (i.e., arity). One Rule object contains all the definitions for all the arities of that Rule. For example, the Inference Engine 300 should provide for defining a rule with the name CONCAT in the following ways: CONCAT(Param1, Param2); CONCAT(Param1, Param2, Param3). The CONCAT Rule only exists once in the Rule Network 305. The CONCAT Rule object contains a Definitions attribute which, in terms of its implementation, is an instance of an AbstractRule Collection 322. In this case, the collection is a collection of different Definition objects.

A Definition class 316 is a class that describes the behavior of each definition of the same name for a specific parameter list. It inherits from the AbstractRule class 310 as indicated below in Table 50.

TABLE 50

| ATTRIBUTES: | |
|---|---|
| Annotation | A free form textual description of this rule definition. |
| Parameter List | An AbstractRule Collection that contains a reference to a Rule object, for each parameter in the parameter list. |
| DefaultList | Each Definition object has an instance of the AbstractRule Collection class which serves as the default consequence for the rule definition. See the discussion of Parser for a better understanding of how the DefaultList is constructed. |
| CaseList | A rule definition may have multiple preconditions with their related consequences. The CaseList is simply a list of Case objects,. The Case class is defined below. See the discussion of Parser for a better understanding of how the CaseList is constructed. |

The evaluation function for a Definition object calls the evaluation function for each member of the CaseList, selects the best Case, and evaluates the ConsequenceList for that Case object. If all cases fail, the DefaultList is evaluated. The result of the Definition's evaluation function is the result of the last object evaluated.

Each Case contains a list of preconditions for this case, and a list of consequences for this case. The contents of these lists are members of the AbstractRule 310 family (Primitive and Structured Types). The evaluation function of the Case class returns the evaluation of the PreconditionList. The Case class evaluates each member of the PreconditionList from left to right until a member evaluates to the FRule or it reaches the end of the list. It returns the FRule or the last thing that it evaluated.

The RuleInvocation class 314 is used to store a reference to a Rule object and any parameters associated with it. Rule Invocations may also store references to other descendants of AbstractRule 310. The attributes of the class are a reference to a specific Rule object and a list (i.e., AbstractRule Collection 322) of parameters that may be used in evaluating that Rule object. The Parameter List may contain Primitive Types or Structured Types. The evaluation function for a RuleInvocation object calls the evaluation function of the Rule object it references using the list of parameters as arguments.

Figure 24:
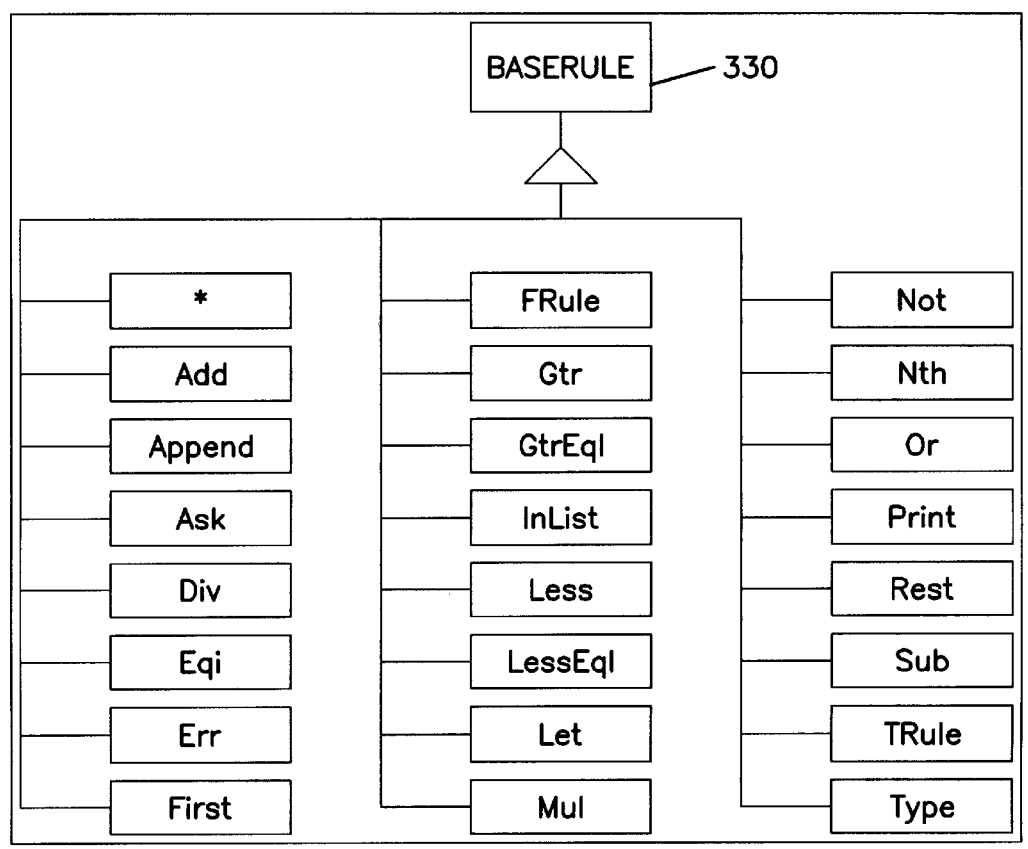

Rules are generally categorized under two types. Predefined Rules are rules that are defined by the system developer and hard coded using C++ or other object-oriented language. User-Defined Rules are the rules the rule developer writes that are parsed into executable structures at parsetime. Each Predefined Rule represents a generalization of the parent Rule class. The definition of a rule also requires the referencing of other Rule objects (both Predefined and User-Defined). The Inheritance diagram for the Rule classes is illustrated in FIG. 24. In general, each predefined rule differs from the Rule parent class because of a modification made to the evaluation function for the class. In Table 51 below, there is provided a brief description of how the evaluation function of each predefined rule differs from the parent Rule class.

TABLE 51

| Eval Function | Description |
|---|---|
| * | It is used during verification of the result returned from the application to the Ask rule before Ask signals acceptance. |
| Add | The eval function receives a list of Abstract Rules, evaluates them (to numbers we hope) and returns their sum. The FRule is returned if an argument evaluates to a non-number and an error is reported. |
| Append | The eval function receives two Abstract Rules which should evaluate to lists. The second list is appended to the first list and returned. The FRule is returned if an Abstract Rule does not evaluate to a list and an error is reported. |
| Ask | The eval function will build the argument list for, and then call, the GetData function in the Inference Engine /Application API. |
| Div | The eval function receives two Abstract Rule arguments, the first being the numerator, the second the denominator. The result of this division is returned. If the denominator is zero the FRule is returned and an error is reported. |
| Eql | The eval function receives two Abstract Rule objects as arguments, evaluates them and compares the results. The TRule is returned if they evaluate the same. |
| Err | The eval function indicates an appropriate error indication that is reported. |
| First | Takes a Abstract Rules which should evaluate to a list and returns the first AbstractRule in that list without evaluating it. FRule is returned if the Abstract Rules does not evaluate to a list and an error is reported. The FRule is returned if the list is empty. |
| FRule | The eval function returns a reference to itself. It means False. The empty list always evaluates to the FRule. Other predefined rules evaluate to the FRule in the event of an error. |
| Gtr | The eval function receives two Abstract Rules objects as arguments, evaluates them and compares the results. The TRule is returned if the first evaluates greater than the second otherwise the FRule is returned. |
| GtrEql | The eval function receives two Abstract Rules objects as arguments, evaluates them and compares the results. The TRule is returned if the first evaluates greater than or equal to the second otherwise the FRule is returned. |
| InList | Takes two Abstract Rules. The first can be any AbstractRule and the second should evaluate to a list. It returns the sublist that has the first argument as its first item and all subsequent items in the list. (Example: "INLIST (3, [1, 2, 3, 4, 5])" evaluates to the list "[3, 4, 5]".) The FRule is returned if the first argument is not in the list. If the second argument is does not evaluate to a list the FRule is returned and an error is reported. |
| Less | The eval function receives two Abstract Rule objects as arguments, evaluates them and compares the results. The TRule is returned if the first evaluates less than the second otherwise the FRule is returned. |
| LessEql | The eval function receives two Abstract Rule objects as arguments, evaluates them and compares the results. The TRule is returned if the first evaluates less than or equal to the second otherwise the FRule is returned. |
| Let | Receives two arguments, the first representing a declared Rule, the second an Abstract Rule. The eval function finds the node corresponding to the declared Rule in the Rule Network and substitutes a pointer to a copy of what the second argument |

TABLE 51-continued

| Eval Function | Description |
|---|---|
| | evaluates to. |
| Mul | The eval function receives a list of Abstract Rules, evaluates them (to numbers we hope) and returns their product. The FRule is returned if an argument evaluates to a non-number and an error is reported. |
| Not | Takes one Abstract Rule as an argument. If the Abstract Rule does evaluate to the FRule the TRule is returned, otherwise the FRule is returned. |
| Nth | Takes two Abstract Rules as arguments, The first must evaluate to a number, the second to a list. The eval function returns the nth element of the list. The FRule is returned if the list is shorter than n items. If an argument error is found the FRule is returned and an error is reported. |
| Or | Takes a list of Abstract Rules. Evaluates each from left to right and returns the first non-false result. If they all evaluate to false, the FRule is returned. |
| Print | Takes a list of Abstract Rules, evaluates each and has the result print itself using the output stream provided by the Inference Engine/Application API. Always returns the TRule. |
| Rest | Takes an Abstract Rule which should evaluate to a list. The result is the original list minus the first element. If the list is empty, the FRule is returned. If the argument does not evaluate to a list, the FRule is returned and an error is reported. |
| Sub | The eval function receives two arguments. The eval of the second is subtracted from the eval of the first. The FRule is returned if either argument does not evaluate to a number and an error is reported. |
| TRule | The eval function returns a reference to itself. It means True. |
| Type | Takes one Abstract Rule and returns a character string representing the name of the type it evaluates to. |

The Parser 306 and Scanner 308 for the Inference Engine 300 generate classes which perform the parsing and scanning of the rules in a text file based on a grammar specification and lexical specification. Rule names may be referenced in many places during the definition of a rule. When the Parser 306 encounters a rule name after a DECLARE statement, that rule will be added to the Rule Network 305 in memory. When encountering a rule name anywhere other that a DECLARE section, the Parser 306 resolves that name using either a previously declared rule or a predefined rule.

The Parser 306 produces the Rule Network 305 which, as mentioned previously, is a data structure that allows rules to be evaluated. The Rule Network 305 produced by the Parser 306 contains collections of Rule objects. The following code of Table 52 illustrates how the Parser 306 constructs the Rule Network 305:

TABLE 52

```
DECLARE:   // Declaration of global rule names
    A;            // Declaration of rule name A
RULES:     // Indicates that rule definitions will follow.
RULESET A  // Indicates that we are defining a Ruleset A.
{          // Beginning of the Ruleset A block.
    DECLARE:    // Declare rules local to Ruleset A.
```

TABLE 52-continued

```
    B;
    C;
    RULES:         // Indicates that rule definitions will
follow.
    A              // Definition of Rule A.
    {
    }
    RULESET B      // Definition of Ruleset B.
    {
        DECLARE:   // Declare rules local to Ruleset B.
        D;
        E;
        F;
        RULES:     // Indicates that rule definitions will
follow.
        B          // Definition of Rule B.
        {
            LET(F, 5.00);  // Assign Rule F the value
            5.00. Execution will assign a definition to
            Rule F.
        }
        D          // Definition of Rule D.
        {
        }
        E          // Definition of Rule E.
        {
        }
        }          // End of definition of ruleset B.
        C          // Definition of Rule C.
        {
        }
}   // End of definition of ruleset A.
```

The DECLARE statement precedes the declaration of any rule. Before a rule may be defined or referenced, it must be declared. When the rule name A is parsed, a new instance of a Rule is created. The reference to this initial Rule object must be stored in a statically defined root Rule object. An attribute of each Rule object is that Rule's declarations which is an instance of the AbstractRule Collection class 322. The root Rule's declarations also contain references to all Predefined Rules.

Figure 25:
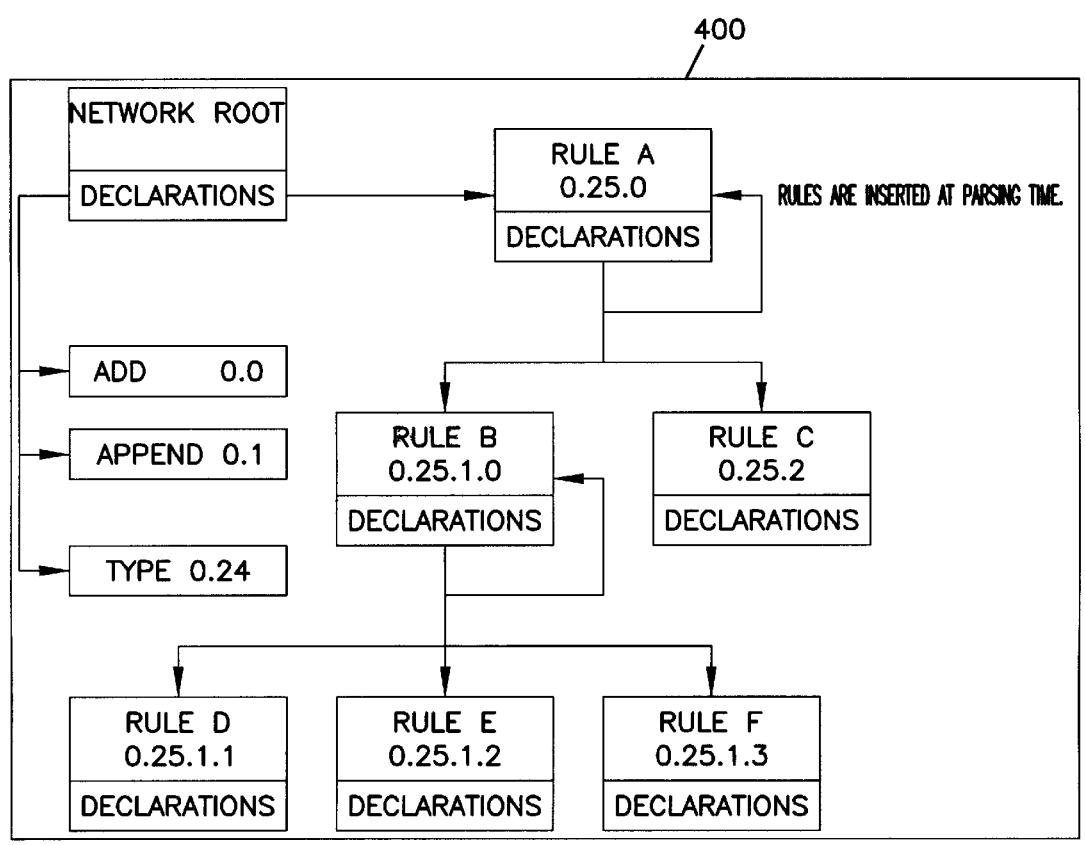
Figure 26:
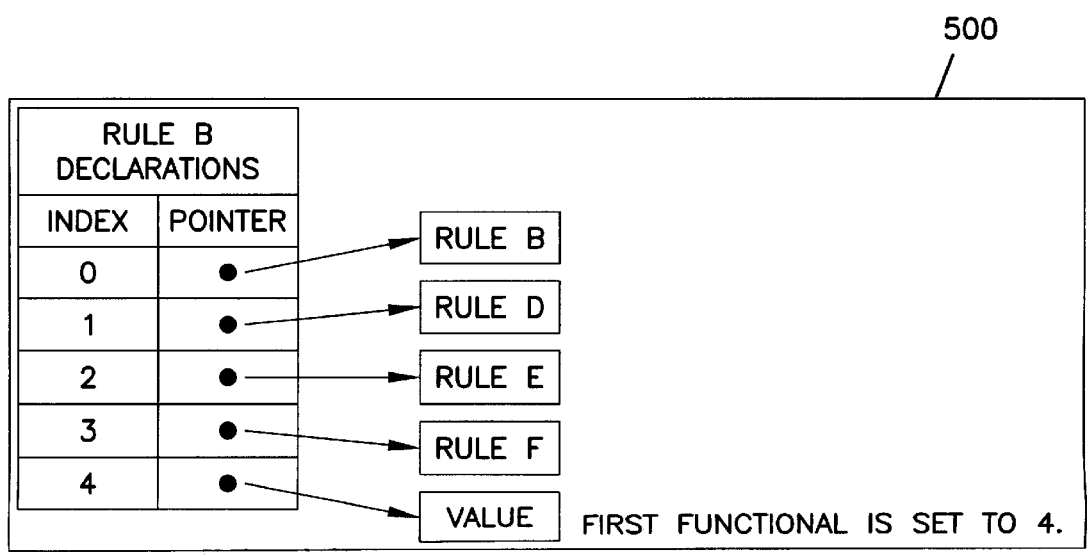

The diagram of FIG. 25 shows the Rule Network 305 generated by parsing the example rule set defined in Table X above. The declarations for the Root rule contain A and Predefined Rules. The declarations for A contains A (since A is defined as a RULESET), B, and C. The declarations for B contains B (since A is defined as a RULESET), D, E, and F. C, D, E, and F have no declarations. Another method of declaring a Rule within the Rule Network 305 is through declaring parameters in the definition of the Rule. For example, if we define an alternate definition of Rule B from above, taking the parameter Value, we would get the following Rule definitions:

TABLE 53

```
    B          // Definition of Rule B.
    {
        LET(F, 5.00);  // Assign Rule F the value 5.00.
        Execution will assign a definition to Rule F.
    }
    B(Value)   // Definition of Rule B which receives
               the assignment value.
    {
        LET(F, Value);  // Assign Value to Rule F.
        Execution will assign a definition to Rule F.
    }
```

Referring to FIG. 25, it may be instructive to describe how the Parser 306 creates the Rule definitions for B and sets the attribute FirstFunctional. It is noted that, originally, the Rule B is declared in the rule set A. As the Parser 306 proceeds through the text, it encounters the first definition of Rule B. The symbol B is parsed and the current Rule Network 305 is searched to see if B currently exists. The Parser 306 continues parsing the line to see if this definition of B is defined with parameters. In this example, the first definition contains no parameters in its definition. As such, the Parser 306 stores a pointer to the Definition object it creates for this definition in the zeroeth element of the Rule B object's Definition array attribute. The Definition attribute is a static array of pointers to Definition objects. A pointer to the second definition of Rule B will be stored at index one of the Definition array. Note that it is possible to have only one definition smith a given number of parameters. When the second definition is parsed, the Parser 306 reads the parameter "Value" and creates a rule declaration for Value in the Rule B Declaration list.

Another attribute of the Rule class that is set during the definition of the Declarations is the NodeAddress attribute. The NodeAddress object 318 within a Rule object contains the logical address of the Rule in the Rule Network 305. For instance, in our example above, Rule A is the 25th Rule in the root Rule's declarations. Since A is a ruleset, the actual definition of A (as a Rule) must be within ruleset A. Hence, the first declaration in A is A itself. The NodeAddress (network address) of A is 0.25.0. Ruleset B is the second declaration in A. Since it is a ruleset itself, the first item in B's declarations is B itself. The NodeAddress of B is therefore 0.25.1.0. Rules D, E, and F are declared within Rule B. Their NodeAddress values are 0.25.1.1, 0.25.1.2 and 0.25.1.3, respectively. It is noted that the above addresses are representations of the NodeAddresses. The Rule attribute FirstFunctional is set to 4 in this example. FirstFunctional informs B of the first declaration of a Rule object whose scope belongs totally within the dynamic scope of Rule B. A functionally declared rule is similar to an automatic variable in typical programming languages: recursive invocations of an Inference Engine rule, like recursive invocations of a C function, instantiate new instances of the functional/automatic objects for each call.

In this example, both definitions of Rule B have only a single consequence (with no precondition) and the result of parsing those lines is stored in the list indicated by that Definition object's DefaultList attribute. The DefaultList attribute will contain a RuleInvocation object which has the Predefined Rule LET and the parameters being a reference to Rule F and a reference to a number object containing the value 5.00 in one case, and a reference to the Rule Value in the second. The second definition of Rule B will also store a pointer to the Value rule in its Definition object's ParamList list attribute.

An example illustrating a means by which the CaseList of the Definition object is constructed is provided in Table 54 below. Rule B is redefined for purposes of this example.

TABLE 54

```
    B(Value)   // Definition of Rule B.
    {
        ANNOTATION:
            "This is the annotation for Rule
    B(Value)."
        SELECT:
        CASE: (LessEql(Value,4.00))
        {
            LET(F, -1);  // Assign to Rule F.
        }
        CASE: (GtrEql(Value,6.00))
        {
```

TABLE 54-continued

```
    LET(F, 1);    // Assign to Rule F.
    }
}
DEFAULT:
    LET(F, 0);    // Assign to Rule F.
}
```

In this example, the value obtained in the parameter Value is tested using two different cases. If the preconditions in both cases fail, the default definition is used. The Parser 306 stored the definition after the keyword DEFAULT just as a single definition was stored in an earlier example. The other two cases are stored in the CaseList attribute of the Definition object. The CaseList attribute is defined as being a list of pointers to Case objects. Each Case object contains a Preconditions list and a Consequence list. The precondition (LessEql(Value,4.00)) is parsed and the results stored in the Preconditions list of the first Case object. The consequence "ILET(F, −1);" is parsed and stored in the Consequence list of the Case object. The second case causes the Parser 306 to create a second Case object and store the Precondition and Consequence as already described.

As mentioned previously hereinabove, when a rule is invoked, it is looked up in the Rule Network 305 using the Rule's NodeAddress object, and the current occupant of that network node then evaluates itself. This node may be a Primitive Type or Structured Type. Evaluation of a User-defined Rule involves finding the current definition of the Rule in the Rule Network 305. If the current definition is no longer a Rule as a result of assignment, the result of telling the current occupant to evaluate itself is returned. Otherwise, the actual parameters as defined in the calling context to formal parameters as used in the called context is mapped. The rule then evaluates its definitions for the arity of its current invocation. The best definition, which is the definition with the highest number of satisfied preconditions, is selected. The consequent of the chosen definition is executed. The final values of reference parameters, if any, from the called context back to the calling context are mapped. The last result evaluated by the chosen definition's consequences is returned. If the chosen definition had no consequences, the result of the last precondition evaluated is returned.

Having described one embodiment of an Inference Engine 300 suitable for use in the dynamic document construction methodology of the present invention, it is desirable in some applications to provide the inferencing capabilities of the Inference Engine 300 in a form that may be distributed to end-users without requiring inclusion of the engine. The IEEE standardized language Scheme is used to translate the inferencing power of the Inference Engine 300 into a distributable form. Scheme, however, does not have direct support for certain Inference Engine 300 features, such as built-in types for Date and Time, and the ability to invoke a rule which takes no arguments without specifying invocation syntax (e.g., MyFunction() as compared to MyFunction). It is assumed for purposes of this embodiment that the public domain Scheme interpreter named "libscheme" version 0.5, which is written in C language, is utilized. This implementation of Scheme provides the ability to extend the interpreter in 'C' to implement Inference Engine functionality. In general, the preferred method of implementing Inference Engine functionality involves writing Scheme code instead of extending the Scheme interpreter, since any such code could be reused if a new Scheme interpreter is used in place of "libscheme."

The conversion of the Inference Engine 300 to Scheme is implemented by extending the format method of each Inference Engine 300 class. The following discussion describes the changes necessary to each class' format method, and an example for clarification of the output. Each object-type of the Inference Engine 300 system has a format method that conforms to the following signature:

```
virtual Format format(const char* = 0, const
    BRL_Object * = 0) const;.
```

Note that the return value is an instance of the Format class. Objects of this class may be inserted into an input/output stream or cast to a const char *.

The first parameter in the signature is a character string mask that the object may use to format itself. For the use discussed herein, this character string must be "^scheme" (from applications) or "^schmpath" (from other Inference Engine objects). Only the Rule and RuleSet classes must recognize the "^scheme" mask. Every Inference Engine object must recognize the "^schmpath" mask. The second parameter in the signature is used to provide context information which will alter each class' output as necessary. In other uses of the format method, this parameter is a pointer to the container Rule or RuleSet instance which is being asked to format itself. The Scheme output implementation will use this parameter to pass enumerated types which alter the behavior of given classes as described below. This called method can distinguish between the enumerated types and valid pointers by restricting the enumerated values to invalid pointer values.

For purposes of clarifying the syntax used hereinbelow, the following is noted. Regular expressions and grammar notations will be used to define some format results as appropriate. The syntax for regular expressions uses open and close brackets (e.g., "[" and "]") to delimit a group of items, any one of which may satisfy that portion of the regular expression. An item followed by a "+" sign must have one or more occurrences. An item followed by an asterisk "*" has zero or more occurrences. An item followed by a question mark "?" has 0 or 1 occurrences. An italicized item refers to another regular expression. For example, a digit is represented by the following regular expression [0123456789], which indicates that a digit is any one of the characters between the square brackets. Hereinafter, this regular expression may be referred to as digit.

All numbers are represented in the Inference Engine 300 by instances of the BRL_Number class. When a BRL_Number gets the message to format itself as Scheme code, it will produce one or more digits, optionally preceded by a minus sign and optionally containing a decimal portion. The decimal portion consists of a single decimal point and one or more trailing digits. Non-significant zeros following the decimal point may be discarded. Formally, a number will conform to the following regular expression:

[−]? digit+ [.digit+]?

All character strings are implemented with the BRL_String class. When a BRL_String gets the message to format itself as Scheme code, it will produce a sequence of characters enclosed within double quotation marks. Embedded double quotation marks are preceded by a backslash character. No tabs or physical carriage returns will be present in the strings. No space character will be followed by a space character. All times are implemented with the BRL_Time class. Because Scheme does not have a native time type, a BRL_Time is stored so that neither the value information or type information is lost. To accomplish this, a BRL_Time will output itself as a string with a type identifier prepended. Any predefined rules which operate on instances of BRL_Time should be written to require this format. Specifically, when a BRL_Time receives the message to format itself as Scheme code, it will produce a sequence of characters conforming to the following regular expression (with no embedded spaces):

"BSITime:digit digit : digit digit : digit digit"

which corresponds in English to:

"BSITime:HH:MM:SS"

where, HH represents a two digit value between 00 and 23, MM represents a two digit value between 00 and 59, SS represents a two digit value between 00 and 59, and all other characters including the double quotes are literals. Alternatively, it may be desirable to represent times as a distinct Scheme type. This can be accomplished either by combining a type and value into a Scheme "pair", or by using an object-oriented Scheme framework to define classes with methods and data members.

All dates are implemented with the BRL_Date class. Since Scheme does not have a native Date type, a BRL_Date is stored such that neither the value or type information is lost. To accomplish this, a BRL_Date will output itself as a string with a type identifier prepended. Specifically, when a BRL_Date receives the message to format itself as Scheme code, it will produce a sequence of characters conforming to the following regular expression (with no embedded spaces):

"BSIDate:digit digit / digit digit / digit digit digit digit"

which corresponds in English to:

"BSIDate:MM:DD:YYYY"

where, MM represents a two digit value between 01 and 12, DD represents a two digit value between 01 and 31, YYYY represents a four digit value between 0000 and 9999, and all other characters including the double quotes are literals.

Lists in the Inference Engine language are implemented with the BRL_List class. Additionally, the Inference Engine 300 uses the BRL_List internally to keep lists of other internal data structures such as declarations and cases. Depending on the context, the Scheme output for a BRL_List instance can take on different syntax. When a list is being output in Scheme format, the list's format method must be called as follows:

```
format(  "^schmpath",
         [BSISchemeArgumentList | BSISchemeArgument]
);
``` where, the second parameter is used to indicate whether the list represents an actual argument list, or a list within an argument list. Regardless of which type of list is being formatted, a list always asks each of its elements to format themselves using the enum BSISchemeArgumentList. This will ensure that all lists within lists are exported with the appropriate syntax to create Scheme lists.

The following four items are specified in the BRL_List format method for each use of a BRL List instance. The first item is a list prefix which identifies any text to be output before the elements of the list are iterated over. The second item is a list suffix which identifies any text to be output after all of the elements of the list have been iterated over. The third item is a regular separator which identifies any text which is to be output between each element of the list, except between the last two elements. The fourth item is a last separator which identifies any text which is to be output between the last two elements of the list. The actual values Listed in Table 55 below are enclosed in double quotes following the C++ syntax. In order to avoid confusion when dealing with whitespace or blanks in this example, the symbol "\b" will be used to represent a single blank space. The symbol "\n" will be used to represent a newline character.

For actual argument lists, a list must simply ask each contained object to output itself, separating each entry by a space. When invoking the BRL_List format method, the second parameter must indicate that the list is an actual argument list using the enum BSISchemeArgumentList. The BRL_List format method must use the following values:

TABLE 55

| list prefix | "" |
| list suffix | "" |
| regular separator | "\b" |
| last separator | "\b" |

When a BRL_List instance represents an individual argument in an argument list, it must output itself as a Scheme list. This is accomplished by prepending the text (list followed by each member of itself, separated by spaces. The final list item will be followed by a trailing parenthesis. The second parameter to the format method must indicate to the BRL_List instance that it is an actual argument, not an argument list using the enum BSISchemeArgument. Logically, the output would be as follows:

(list <arg1> . . . <arg n>).

Because the internal implementation of BRL List uses an instance of BRL_List to represent each member in a list, the two enum values must be used so that: only the true head of a list which is an argument outputs the (list prefix and) suffix. A BRL_List instance actually represents only a single link in a linked list. In order to accomplish this, the following formatting values of Table 56 are used:

TABLE 56

For BSISchemeArgument:
| list prefix | "(list\n" |
| list suffix | ")\n" |
| regular separator | "\b" |
| last separator | "\b" |

```
// Code to handle BSISchemeArgument and
// BSISchemeArgumentList correctly
if enum == BSISchemeArgument
{
```

TABLE 56-continued

```
        listPrefix = "(list\n";
        regularSeparator = " ";  // Blank space
        lastSeparator = " ";     // Blank space
        listSuffix = ")\n";
    }
    first->format("^schmpath", BSISchemeArgument );
    next->format ("^schmpath", BSISchemeArgumentList
);
    if enum == BSISchemeArgument
    {
        listPrefix = "(list\n";
        regularSeparator = lastSeparator = " ";
        listSuffix = ")\n";
    }
```

As long as an external calling process is made with the enum BSISchemeArgument, this chain will be effective. These two enums only have meaning to the BRL__List class, so any other objects which might receive them as parameters to their format methods can safely ignore them. The above pseudo-code of Table 56 requires additional logic to separate each entry in a list by a space or newline. The logic which passes enura BSISchemeArgument to the head member of the list and enum BSISchemeArgumentList to the remainder of a list works for all of the following special cases of lists.

Lists are not used internally to represent formal argument lists. Instead, a RuleSet instance stores the formal arguments and any local declarations in the RuleSet::declarations instance variable. A more thorough discussion of formal argument lists and declarations is provide hereinbelow.

BRL__List instances are used to store lists of preconditions in select cases. A Case object passes the enum BSISchemePreconditionList as the second parameter when calling the format method of a precondition list. To process this, the BRL__List class must use the following prefix, suffix, and separators:

TABLE 57

| listPrefix | = "(is-true\n"; |
| regularSeparator | = "\n (is-true\n"; |
| lastSeparator | = "\n (is-true\n"; |
| listSuffix | = ")\n"; |

BRL__List instances are used to store lists of preconditions in select cases. A Case object passes the enum BSISchemeConsequentList as the second parameter when calling the format method of a precondition list. To process this, the BRL__List class must use the following prefix, suffix and separators:

TABLE 58

| listPrefix | = "(begin\n"; |
| regularSeparator | = "\n"; |
| lastSeparator | = "\n"; |
| listSuffix | = ")"; |

BRL__List instances are used to store lists of cases in Definition objects. A Definition object passes the enum BSISchemeCaseList as the second parameter when calling the format method of a precondition list. To process this, the BRL__List class must use the following prefix, suffix, and separators:

TABLE 59

| listPrefix | = "(list\n"; | |
| regularSeparator | = " "; | // Blank space |
| lastSeparator | = " "; | // Blank space |
| listSuffix | = ")\n"; | |

BRL__List instances are used to represent lists of data as in the following Inference Engine code:

TABLE 64

Rule xyz
{
    ["Saturday", "Sunday", "Monday", "Tuesday", "Wednesday", "Thursday", "Friday"];
}

In these instances, the containing definition passes the enum BSISchemeCaseList. The BRL__List class handles this identically to the Case List described above.

Comments are stripped when exporting rules as Scheme code, since this Inference Engine-to-Scheme conversion is intended as a distribution mechanism. Any Scheme comment can be output preceded by a semicolon. Such comment lines may be helpful in debugging the generated Scheme code. Annotations are also stripped when exporting rules as Scheme code.

ReInvocation objects are used in the internal representation of a rule to denote the invocation of another (pre-defined or user-defined) rule. In one embodiment, invocations of rules which take no arguments may be represented by instances of the Rule or RuleSet class, as is further developed hereinbelow. A RuleInvocation contains a (possibly null) pointer to the rule being invoked. For rules which are being exported as Scheme, this pointer should always be non-null. Depending on the arity of the rule being invoked, the RuleInvocation also contains a (possibly null) pointer to a BRL__List which is the list of actual arguments used to invoke the rule. The arity of the rule is not available to the RuleInvocation class. Therefore, any logic which depends on the number of arguments must count the number of members in the RuleInvocation::args member (which may not be an instance of BRL__list, in which case the count is one if the pointer is non-null).

To export a RuleInvocation as Scheme, the following steps are performed. First, RuleInvocation outputs an opening parenthesis to denote Scheme invocation:

fmtBuf << "(";

RuleInvocation asks the evaluator to format itself as a fully-scoped Scheme routine name:

fmtBuf << evaluator->
format ( "^schmpath",
BSISchemeInsideRuleInvocation );

The second parameter BSISchemeInsideRuleInvocation is used to inform the Rule instance that the containing RuleInvocation instance is handling any invocation syntax (leading and trailing parentheses). RuleInvocation asks arglist (if non-null) to export itself as an actual argument list. The args instance variable may point to a BRL__List, or in the case of single argument rules, may point directly to the single argument. Both cases can be treated identically:

```
if ( args ! = 0)
    fmtBuf << args -> format ( "^schmpath",
BSISchemeArgumentList );
```

This is safe even if the args member points to an instance of a type other than BSI_List. RuleInvocation outputs a closing parenthesis to denote end of Scheme invocation:

```
fmtBuf << ")" << endl;
```

In addition to the above general case, RuleInvocation objects must produce special Scheme code for the ASK predefined rule. The ASK rule has three different arities, so each RuleInvocation which is exported must produce Scheme code to call the appropriate Scheme implementation of the ASK rule. For single argument invocation, the Inference Engine code:

```
ASK( "Prompt the User" )
``` will be exported in Scheme as:

```
(bsi-ask-1 "Prompt the User").
```

The general form of this translation is to use normal Scheme invocation syntax, passing the single parameter by value to the Scheme implementation of one-argument ask as in the following code:

TABLE 60

```
fmtBuf << "(";
fmBuf << evaluator->
    format ("^schmpath", BSISchemeInsideRuleInvocation );
fmtBuf << " ";
fmtBuf <<args->
    format ( "^schmpath", BSISchemeArgument );
fmtBuf << ")" <<endl;
```

The two argument invocation which provides validation for the return value of Ask must export in a different manner to allow Scheme to delay the evaluation of the second parameter until after the body of the Ask has completed. For two argument invocations, the Inference Engine code:

```
ASK( "Prompt the User", IsAString(*) )
``` will be exported in Scheme as:

```
(bsi-ask-2 "Prompt the User" '(IsAString bsi-star)).
```

The general form of this translation is to use normal Scheme invocation syntax for the bsi-ask-2 rule (denoting the 2 argument form), and to pass the first argument by value by calling its format method with the arguments:

```
firstArg->format ( "^schmpath", BSISchemeArgument );
```

The second argument however, must be preceded by a ' character to allow the Scheme implementation of bsi-ask-2 to delay execution until the body of bsi-ask-2 has executed. The remainder of the syntax for the second parameter is standard Scheme invocation syntax. Therefore, the second argument can be output using:

```
fmtBuf << "'"; // Output Scheme "quote" rule
secondArg->format ( "^schmpath", BSISchemeArgument);
```

The three argument version provides both validation of the return value and assignment of return value to a Rule which acts as a variable. For three argument invocations, the Inference Engine code:

TABLE 61

```
ASK( "Prompt the User", IsAString(*), MyRule)
    will be exported in Scheme as:
    (begin
        (bsi-ask-1 "Prompt the User")
        (if
        (IsAString bsi-star)
            (set! MyRule (lambda x bsi-star))
    bsi-F
    )
)
```

This syntax is necessary because Scheme will not allow passing of parameters by reference. The code above invokes the bsi-ask rule which places its return value into the predefined variable bsi-star. The next block invokes any validation routines which need to be called, and if the result is true, assigns the return value of the ask invocation to the MyRule, which was the third parameter passed to ASK in the Inference Engine version.

The STAR Rule is used to contain the return value of a call to the ASK rule. Syntactically, this parameter is then used to validate the ASK rule's result. In the general case, when a rule is referenced in the Inference Engine code, it is exported in Scheme using invocation syntax, even if there are no parameters. Since the STAR rule is only used in the context of ASK rules, it is desirable to use a global predefined Scheme symbol to hold the current value of the StarRule. This will not need to be referenced via invocation, so the RuleInvocation class can simply output the text "bsi-star" wherever the STAR rule is referenced. This could be accomplished in the Rule class, or in the StarRule::format method.

The LET rule is similar to the three argument form of the ASK rule described above. A similar macro expansion technique is be used. The Inference Engine code:

TABLE 62

```
Let( a, b );
    will be expanded to the Scheme code:
    (let ( (temp-target (b)) )
        (set! a
            (lambda x temp-target)
        )
    )
```

The first parameter to LET must have already been declared in Scheme to ensure proper operation. The second parameter has parentheses around it to denote that standard invocation syntax will be used when it is exported. This ensures that it is evaluated by Scheme before the assignment takes place. The temporary variable is necessary to handle the Inference Engine statement:

---
Let( foo, foo(1, 2, 3) );
---

In this way, the rule foo is invoked with the parameter list (1, 2, 3), and a new Scheme procedure which takes any number of arguments is created which simply returns the result of foo(1, 2, 3).

A single "if-then rule" is implemented in the Inference Engine language as a Case object. A Case has an optional annotation, an optional name, an optional list of preconditions, and an optional list of consequents. For Scheme output, all Cases are treated in a single fashion. All annotations and Case names are ignored. Each case (including the default) will be output beginning with some Scheme helper code, such as:

TABLE 63

```
// Begin preconditions clause (possibly empty)
fmtBuf << "(cons"        << endl;
fmtBuf << "   (exp-cardinality"    << endl
fmtBuf << "      '(is-true"  << endl;
fmtBuf << "      (and"    << endl;
```

The Case class must then instruct the preconditions list to output itself using the enum BSISchemePrecondition List as is indicated below:

TABLE 64

```
// Output any preconditions
if ( _preconditions != 0 &&
     ! _preconditions->isEmpty() )
    fmtBuf << _preconditions->
        format ( "^schmpath",
                BSISchemePreconditionList );
```

The Case class must then close the (possibly empty) preconditions clause, as is indicated below:

TABLE 65

```
// Close preconditions clause
fmtBuf << "   )"           << endl;
fmtBuf << "      )"        << endl;
fmtBuf << "   )"           << endl;
```

The case class begins the (possibly empty) consequents list, as is indicated below:

TABLE 66

```
// Begin consequents clause (possibly empty)
fmtBuf << "   (lambda ()"    << endl;
fmtBuf << "      (begin"     << endl;
```

The Case class must then tell the consequents list to output itself using the enum BSISchemeConsequentList, as is indicated below:

TABLE 67

```
if ( _consequents != 0 &&
     ! _consequents->isEmpty() )
    fmtBuf << _consequents->
        format ( "^schmpath",
                BSISchemeConsequentList );
```

The Case class then closes the (possibly empty) consequent list and the case body, as is indicated below:

TABLE 68

```
// Close consequents clause and case
fmtBuf << "    )"     << endl;
fmtBuf << "      )"         << endl;
fmtBuf << "   )"          << endl;
```

This class implements the definition of a single Rule. A Definition object contains one instance variable which represents either a list of Cases or a List of Consequents. Depending on the type of objects contained in the list, the Definition::format method will provide one of two behaviors. The instance variable evalAs is used to determine if the caseList instance variable represents a list of Cases or Consequents. The following code is true if the caseList instance variable represents a list of Consequents:

---
if (evalAs == SIMPLEDEF).
---

When the caseList instance variable contains a list of consequents, each consequent needs to output in a manner so that they will be executed sequentially. The Definition class must tell the caseList to format itself as a list of consequents:

TABLE 69

```
fmtBuf <<
    caseList->format ("^schmpath", BSISchemeConsequentList);
```

If the caseList variable contains a list of Cases, the Definition class must output Scheme code which will use Scheme helper functions to emulate the Inference Engine's select/case statement behavior. It must then tell the caseList to output itself as a list of cases as is indicated in the following code:

TABLE 70

```
Begin Scheme case list block:
    // Start list of cases (this includes default
    case)
    fmtBuf << "(most-true" << endl;
Tell case list to output itself, indicating to the
BRL_List class that it is a list of cases by using the
enum BSISchemeCaseList.
    // Output each case in case list
    fmtBuf <<
        caseList->format ("^schmpath", BSISchemeCaseList
        ) << endl;
End the Scheme case list block:
    // Close definition body
    fmtBuf << ")"       << endl;
```

User defined rules are implemented with the RuleSet class. This class usage implements the definition of a single rule for a given arity. A Rule object contains an optional argument list, an optional annotation, an optional set of declarations, and an optional definition. Annotations are ignored for Scheme output. In addition to local declarations, the RuleSet class contains a list of rules which it uses.

When a RuleSet class is told to format itself as Scheme code ("^Scheme"), it will produce a string conforming to the following specification. Italicized text represents rule-specific output. Non-italicized text represents literal output which is present for any user-defined rule exported as Scheme code, as indicated below:

TABLE 71

(bsi-load filename.scs)
(define
rulename
(lambda
(
argumentlist
)
(let
(
declarations
)
definition
)
)
)

For each entry in the RuleSet instance's uses instance variable, a line of the form:

(bsi-load filename.scs)

will be output, where <uses> represents the fully-scoped name of the referenced routine, followed by the file extension ".scs". The filename generated will be the complete path name of the rule with underscores in place of periods.

Determining which files need to be included requires comparing the contents of the uses and declarations sets for the current RuleSet instance. There is no definitive ordering of the uses set which provides for the determination of which entries are external references. Therefore, Scheme is generated to include those members of the uses set which are not present in the declarations set.

The rulename will be a fully scoped character string followed by a newline. For example, the: Lending.InsuranceDisclosure.FloodInsuranceDisclosure rule will format its name as:

"Lending-InsuranceDisclosure-FloodInsuranceDisclosure".

Additionally, if the rule accepts arguments, it will have a number appended to denote its arity. For example, FooBar( a, b, c ) becomes FooBar-3 in Scheme. The arguments, if any, will each be output followed by a newline using the enum BSISchemeFormalParameter:

arg->format ("^schmpath", BSISchemeFormalParameter);

If the rule has declarations, they will each be asked to output themselves using the enum BSISchemeLocalDeclaration:

decl->format ("^schmpath", BSISchemeLocalDeclaration);

Additionally, all formal parameters are repeated in the local declaration section to allow invocation syntax to be valid, as indicated in the following example:

TABLE 72

The Inference Engine:
  FooBar(a)
  {
  PRINT(a);
  }
becomes:
  (define FooBar-1
   (lambda
    (a)
    (let
     (
      (FooBar-1-a (lambda x a))
     )
     (bsi-print (FooBar-1-a))
    )
   )
  )
in Scheme.

The formal parameters are (re-)output in the local declarations section with the enum BSISchemeFormalParameterWrapper, as follows:

TABLE 73 formalDecl->
   format ("^schmpath",
BSISchemeFormalParameterWrapper);

The definition, if present, will be told to format itself as a definition using the enum BSISchemeDefinition. Definitions should always be present, but a rule is valid without one. Therefore, situations where there is no definition will be output to Scheme as a procedure with an empty body with comments denoting the absence of a definition, such as:

def->format ("^schmpath", BSISchemeDefinition);

When a RuleSet::format method is invoked with the arguments ("^schmpath", BSISchemeLocalDeclaration), the RuleSet instance will output:

TABLE 74

(
fully-scoped-name
0
)

The name is output fully-scoped in order to alleviate potential naming conflicts. Scheme requires all variables to have a definition upon creation. The 0 in the above Scheme code provides that required definition. It should be overwritten before the variable is actually referenced in the body of the containing rule.

When a RuleSet::format method is invoked from a RuleInvocation object for Scheme output, it will have received the following arguments:

format ("^schmpath",
BSISchemeInsideRuleInvocation);

This indicates that the containing RuleInvocation is responsible for exporting any invocation syntax necessary in the current context. The Rule instance must only output its own fully-scoped name in valid Scheme syntax. The output for the enum BSISchemeFormalParameter is identical to that for enum BSISchemeInsideRuleInvocation described above. When a RuleSet::format method is invoked using enum BSISchemeIncludeFile, the output follows this form:

```
(bsi-load "fully-scoped-Scheme-name-as-filename")
``` where, the filename generated is valid on the target system. It may be necessary to employ a hashing algorithm in order to target the latest file server systems. By default, when RuleSet::format is called with the first parameter of "^schmpath", where the second parameter is not one of those listed above, the RuleSet class outputs the Scheme syntax to invoke the rule as if it took no arguments:

TABLE 75

```
(
fully-scoped-Scheme-name
)
```

Predefined rules must output their names preceded by "bsi-". For example, the Add rule will be output as bsi-add. In general, the Rule::format method should only be invoked in the context of a RuleInvocatior container. However, due to Inference Engine compiler optimization, it is possible to enter the Rule::format method directly from a container list, for example, such that the appropriate invocation syntax will not be output by the containing RuleInvocation instance. For all predefined rules other than the True and False rules, bounding parentheses are output if a RuleInvocation instance did not do so previously. Other predefined rules are handled by the RuleInvocation class for simplicity.

The Inference Engine comparison operators can safely compare arguments of different types. If arguments of two different types are compared, the comparison is based on the internal type IDs of each argument. In order to fully replicate the Inference Engine processing, the Scheme comparison operators must be written to emulate this behavior. Currently, an error "type mismatch" is caused if these types are compared. Currently, the Date and Time comparison operators perform a string comparison and thus do not return appropriate values.

The default implementation of Scheme does not specify whether the empty list is equivalent to the false rule. It has been determined that changing the implementation so that the internal representation of the empty list and the false rule are identical causes the Scheme interpreter to fail the test script provided with the slib Scheme routine library. Some rules written in the Inference Engine depend on the value of the empty list to be false. A possible solution would be to stop using the Scheme logical primitives such as "if", "and", "or", and "not" and replace them with redefined implementations. These routines may need to be implemented via Scheme macros or could be implemented as additional primitives by extending the Scheme interpreter. Alternatively, any rules which depend on this behavior could be modified to use the BSI-REST rule which does return false if the empty list is passed as an argument.

Another important feature of the dynamic document construction apparatus and method of the present invention concerns a capability to audit all transactions that occur during document construction and utilization by both a document developer and an end-user. In many cases, it is not sufficient to merely create a document dynamically in response to developer or user-provided information. It is often critical to determine how and by what means a particular document is constructed. This can be achieved by auditing the process of resolving entities. Entity Resolution Auditing is the process of collecting information during the creation of a particular SGML instance from the Knowledge Base. Of particular interest are data that reveal which or whose language was used for any arbitrary part of the document. Warranty claim support, compliance tracking of implicated regulations, and custom forms, including user-created or user-modified forms, are generally of interest and recorded by an Entity Resolution Audit Log 100 of the Auditing Service 156, shown in FIG. 9C.

The primary activity of interest in the auditing process is entity resolution. Entity resolution, as discussed in detail hereinabove, is the process whereby entity names occurring in some text being parsed by an SGML Parser are replaced with text that does not contain entity names. The auditing facility of the Audit Service 156 publishes functions to begin auditing, creates an Audit Log 100 entry, clears the Audit Log 100, saves the Audit Log 100, and frees auditing resources. The Audit Service 156 associates an Audit Log 100 with metadata about the process that was audited, and makes the Audit Log 100 persist. The system supports a query facility allowing one or more Audit Log 100s to be searched, typically by use of an Audit Browser tool 280 such as that depicted in FIG. 18. The system produces reports consisting of individual Audit Log 100s or of information about one or more Audit Log 100s. The system provides internal checks that provide assurance that the Audit Log 100 is a proper representation of the process that was audited, and also provides means to communicate audit information, whether on the document being audited or in some other means.

The process of generating an SGML document requires the resolution of many entity references. Each time a document is generated, an Audit Log 100 is produced. Each time an entity reference is resolved, an entry in an Audit Log 100 is created. This process refers to the set of API calls that provide the following functions:

TABLE 76

| Begin auditing: | Instantiate objects to prepare for auditing. |
|---|---|
| Begin a document: | Record the document location and name, the date and time stamp, the current catalog stack including the date and time stamp of each catalog, and the Storage Manager environment including the version signature of each Storage Manager. |
| Create an audit entry: | Record the target document, the entity name, the resolving process, and the resolving catalog. |
| Save Audit Log: | Write the Audit Log to file. |
| End auditing: | Free resources used for auditing. |

A store/retrieve process takes an Audit Log 100 and stores it in some persistent medium. The process may attach metadata to the Audit Log 100, including information identifying the current transaction or the target product (e.g., the product ID for a static form). The process can compress an Audit Log 100. The process must be able to ensure that a retrieved Audit Log 100 is identical to the Audit Log 100 that was saved. A search Audit Log process performs queries over stored Audit Log 100s. It is able to select and sequence records based on information stored in those records. An audit reports process produces previewable reports. Two types of reports are generally of interest. The first type reports on Audit Log metadata, for example, a report by a lending officer showing the documents created by type. The second type reports on Audit Log contents, such as, for example, a report that lists all entries for all documents for a particular transaction.

An audit integrity process tests each Audit Log 100 in the system to ensure that the Audit Log 100 can be retrieved and that the retrieved Audit Log 100 will match that stored. The integrity process functions such that it can show that two documents were resolved by the same environment, that is, if a document is generated, then re-generated, that the same catalogs, language, and resolution processes were used, even though data in the documents may be different. An audit communication process provides a mechanism for recording on documents created by the developer or end-user having sufficient information about the Audit Log 100 for each document that the Audit Log 100 can be unambiguously identified. It is desirable that a particular Audit Log 100 or Audit Log Set from the Audit Archive be extractable, such that when extracted, the Audit Log 100s are presented as separate files, one for each document. It is noted that the user of Audit Services 156 is generally an application. Audit Services functions are published via an application programming interface (API). The Audit Log Archive preferably supports export of audit metadata to a form that can be queried by the document formatter 170 or report writer.

Figure 16:
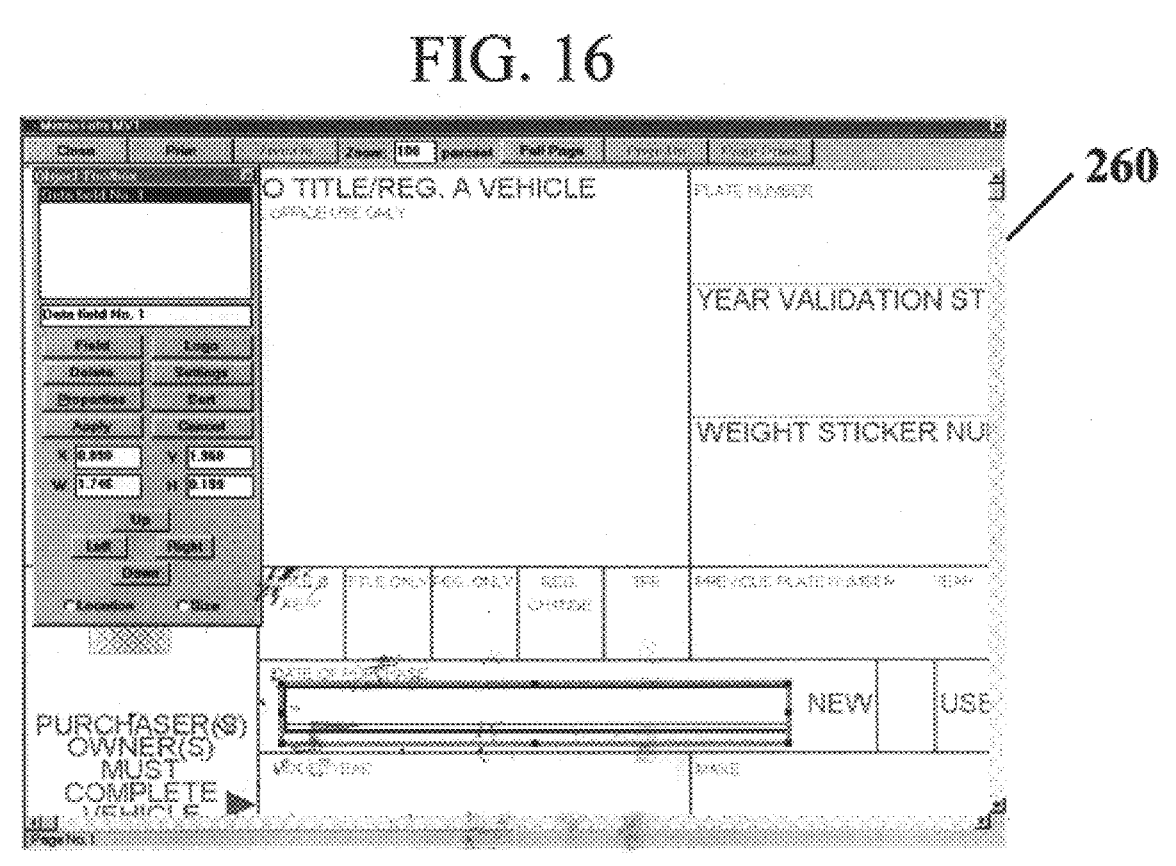

Turning now to FIGS. 15–17, there is shown various user interface screens for creating and manipulating form objects, and for constructing electronic forms using such form objects in accordance with one embodiment of the present invention. A Business Forms Object (BFO) Process Server provides an interface for creating and manipulating BFO files in preparation for their use as form objects. The BFO Process Server is intended to be used as an OLE custom control. As will be described in detail hereinbelow, another reference application, referred to as a BFO Processor, provides a service for manipulating BFO files as form objects.

The BFO Processor Server is designed so that it can be incorporated into an application as an OLE custom control (see Appendix II). The BFO Processor is a reference application that provides one example of a user interface to the services of the BFO Processor Server. Any OLE custom control client can create its own interface to these functions. An exemplary content model of the BFO is provided in Table 77 below. It is noted that a plus sign indicates that there may be one or more occurrences of the element concerned; a question mark indicates that there may be at most one and possibly no occurrence; and a star indicates that the element concerned may either be absent or appear one or more times.

TABLE 77

| OBJECT | CONTENTS (Bold=Object, Plain=Variable) |
|---|---|
| BFO | (BFOInfo, Document*) |
| BFOInfo | (BFOName, DefaultFieldColor, DefaultFieldAlignment, DefaultFieldLineSpacing, DefaultFieldLines, DefaultFieldFirstLineIndent, DefaultFieldLastLineWidth, DefaultFieldProtectFlag, DefaultFieldDefaultText, FieldSortOrder, DefaultLogoColor, BFOStyleWindowVisible, BFOGridPrecision, BFOFormColor, DefaultLogoResizeOption, LogoSortOrder, LogoPlacementPriority, WorkDirectory) |
| Document | (DocumentInfo, Page*) |
| DocumentInfo | (DocumentNumber, DocumentName, DocumentDescription, DocumentCopyright, DocumentOwner, DocumentRevision, DocumentDuplex) Page (PageInfo, PageImage, Field*, Logo*) |
| PageImage | (PCL?) |
| PageInfo | (PageNumber, PageName, PageRevision, PageSize, PageHeight, PageWidth, PageOrientation, PageSelected) |

TABLE 77-continued

| OBJECT | CONTENTS (Bold=Object, Plain=Variable) |
|---|---|
| FileStamp | (FileDate, FileTime, FileSize) |
| PCL | (PCLName, PCLFilename, FileStamp, PCLStream) |
| Field | (FieldName, FieldInfo, FieldDefaultText) |
| FieldInfo | (FieldLeft, FieldBaseline, FieldWidth, FieldHeight, FieldLines, FieldFirstLineIndent, FieldLastLineWidth, FieldLineSpacing, FieldFontID, FieldAlignment, FieldColor, FieldProtectFlag, FieldEditStatusBarText, FieldPreviewStatusBarText, FieldHelpContextID, FieldHelpText) Logo (LogoName, LogoInfo, LogoFilename, FileStamp, LogoStream, LogoEditStatusBarText, LogoPreviewStatusBarText) |
| LogoInfo | (LogoLeft, LogoTop, LogoWidth, LogoHeight, LogoAspect, LogoColor) |

The variables in the object model of Table 77 are indicated below in Table 78:

TABLE 78

| VARIABLE NAME | TYPE | NOTES |
|---|---|---|
| BFOName | string | defaults to "Untitled" |
| RFOFormColor | long | OLEColor |
| BFOGridPrecision | single precision real | |
| RFOStyleWindowVisible | short | |
| DefaultFieldAlignment | short | 0=Left justify 1=Center 2=Right justify 3=Fully justify 4 = Decimal align |
| DefaultFieldColor | long | OLEColor |
| DefaultFieldDefaultText | string | |
| DefaultFieldFirstLineIndent | single precision real | |
| DefaultFieldLastLineWidth | single precision real | |
| DefaultFieldLines | short | |
| DefaultFieldLineSpacing | single precision real | |
| DefaultFieldProtectFlag | short | |
| DefaultLogoColor | long | OLEColor |
| DefaultLogoResizeOption | short | 0=No re-size 1=Anisotropic 2=Isotropic-horizontal 3=Isotropic-vertical |
| DocumentCopyright | string | |
| DocumentDescription | string | |
| DocumentDuplex | short | 0=simplex 1=Duplex, long edge 2=Duplex, short edge |
| DocumentNumber | short | |
| DocumentName | string | |
| DocumentOwner | string | |
| DocumentRevision | string | |
| FieldAlignment | short | 0=left, 1=center, 2=right, 3=full, 4=decimal align |
| FieldBaseline | single precision real | inches from top of page to highest baseline in the field |
| FieldColor | long | OLECOLOR |
| FieldDefaultText | string | |
| FieldEditStatusBarText | string | text to display in the status bar when the field is active in EditFields |
| FieldFirstLineIndent | single precision real | inches from FieldLeft |
| FieldFontID | short | The index to the font in the font table |
| FieldHeight | single precision real | inches |
| FieldHelpContextID | short | Use values < 32,768 for compatibility with Win 3.1 |

TABLE 78-continued

| VARIABLE NAME | TYPE | NOTES |
|---|---|---|
| FieldHelpText | string | WinHelp |
| FieldLastLineWidth | single precision real | inches from FieldLeft |
| FieldLeft | single precision real | inches from left edge of page |
| FieldLines | short | number of baselines in the field |
| FieldLineSpacing | single precision real | inches baseline to Baseline |
| FieldName | string | |
| FieldProtectFlag | short | 0 = Unprotected 1 = Protected |
| FieldPreviewStatusBarText | string | text to display in the status bar when the field is active in EditFields |
| FieldSortOrder | short | 0 - Creation order 1 - Alphabetical order 2 - Location order |
| FieldWidth | single precision real | inches |
| FileDate | unsigned short | date of last change Bits Contents 0–4 Day of the month (1–31) 5–8 Month (1 = January, 2 = February, etc.) 9–15 Year offset from 1980 (add 1980 to get actual year) |
| FileSize | long | |
| FileTime | unsigned short | time of last change Bits Contents 0–4 Second divided by 2 5–10 Minute (0–59) 11–15 Hour (0–23 on a 24-hour clock) |
| LogoAspect | short | 0=none, 1=Isotropic, Horizontal precedence, 2=Isotropic, Vertical precedence, 3=Anisotropic |
| LogoColor | long | OLECOLOR |
| LogoEditStatusBarText | string | text to display in the status bar when the logo is active in EditFields |
| LogoFilename | string | |
| LogoHeight | single precision real | inches |
| LogoLeft | single precision real | inches from left edge of page |
| LogoName | string | |
| LogoPlacementPriority | short | 0 - Logos first 1 - Intermixed 2 - Logos last |
| LogoPreviewStatusBarText | string | text to display in the status bar when the logo is active in Preview |
| LogoSortOrder | short | 0 - Creation order 1 - Alphabetical order 2 - Location order |
| LogoStream | blob | |
| LogoTop | single precision real | inches from top edge of page |
| LogoWidth | single precision real | inches |
| PageHeight | single precision real | inches |
| PageName | string | |
| PageNumber | short | |
| PageOrientation | short | 0=Portrait 1=Landscape 2=Reverse Portrait 3 =Reverse Landscape |
| PageRevision | string | |
| PageSelected | short | 1 = Page is selected 0 = Page is not selected |
| PageSize | short | 2=Letter, 3=Legal, 6=Ledger, 26=A4, 27=A3 |
| PageWidth | single precision real | inches |
| PCLFilename | string | |
| PCLName | string | |
| PCLStream | blob | |
| WorkDirectory | string | |

With reference to FIGS. 15 and 16, when the EditFields method is invoked, the preview window 260 is displayed along with a toolbar for creating and placing fields and logos. The client has access to a button in the toolbox. The client can control whether the button is visible, whether the button is enabled, and the caption on the button. The user can specify different captions, depending on whether the Field or Logo tool is selected. When the user selects the client button, a ClientButtonClick event is fired.

The client has access to a panel on the status bar. The panel extends from the end of the Page Name display (12 characters shown) to the right edge of the status bar. The client may specify a EditFields-time and Preview-time StatusBarText value for each Field and Logo. The client may also specify a default EditFields-time and Preview-time StatusBarText value for new Fields and Logos. It is noted that the EditFields-time or Preview-time StatusBarText is only displayed when a Field or Logo is selected. It is further noted that the user cannot specify StatusBarText directly while editing fields. Only the client can set those properties, through the BFO OCX interface. The user can control certain properties of the Editing Fields display through use of a Settings Dialog 270, such as that illustrated in FIG. 17. The Settings Dialog 270 is accessed by pressing the Settings button. Values entered on the Settings Dialog 270 are accessible through the OLE custom control API.

A user can create a BFO by importing either a PCL file or a Windows metafile for each page. The user may then import field definitions from a field definition and location file which identifies X and Y field coordinates, or add fields individually via the EditFields method. Importing a document is accomplished by a client of the BFO Processor Server custom control. For purposes of illustration, the following actions provided in Table 79 below are implicated when using an OLE custom control client to create a BFO:

TABLE 79

| | |
|---|---|
| 1. | Add a BFO Processor custom control to a form in user's Virtual Basis project. For this example, it is assumed that user sets the name property to myBFO. |
| 2. | Execute mYBFO.New to create a new BFO. |
| 3. | Execute mYBFO.AddDocument to add a document to the BFO and give it a name. This action also makes the added document the current document. |
| 4. | Execute mYBFO.AddPage to add a page to the document. |
| 5. | Execute mYBFO.SetCurrentPage to make the new page the current page. |
| 6. | Execute myBFO.AddPCL to add the PCL file for the page. |
| 7. | Repeat steps 5 through 7 until all pages are added. |
| 8. | Execute myBFO.Save to write the BFO to disk. |

The following example provides an understanding of the process by which a user may edit fields on a BFO. Initially, it is assumed that a user has launched BFO Processor, which is a reference application that has a BFO Processor custom control on one of its forms as mentioned previously, named myBFO. The client sets the FieldClientButtonCaption, FieldClientButtonState, LogoClientButtonCaption and LogoClientEuttonState properties. The user requests File|Open and selects an SGML control instance for an electronic form. The client parses the control instance. The name of the EFO file associated with the control instance is captured. The fields in the control instance are parsed and an array is constructed pairing field names and entity names. The client presents a dialog showing the name of the BFO file and some statistics from the SGML file, such as the number of pages, fields per page, and the like.

If the user wishes to look at the fields in the BFO file, the user requests Fields|Edit in Preview. The client requests the OpenBFO method, passing the name of the BFO file. The EFO Processor opens the BFO file, making the first document the current document. The BFO Processor makes the first page the current page and the first field (if any) the current field. The client uses the GetFirstPage, GetNextPage, GetFirstField and GetNextField methods in a set of nested loops to iterate through the fields in the document. The client sets the FieldStatusBarString property for each Field. The Client does not track field locations. Alternatively, the client uses the GetFirstFieldID and GetNextFieldID methods in a loop to construct an array of all the FieldIDs on the page. It is noted that FieldEntity is a temporary property. It is not saved as part of the BFO.

When the client invokes the EditFields method, the BFO Processor opens the Preview window, draws the page metafile in the appropriate color, and places whatever fields are already defined in the BFO. The field list in the object toolbox is populated, sorted, and positioned to the first entry, but no entry is initially selected. The BFO Processor selects the Fields button by default, sets the ClientButton caption to the FieldClientiButtonCaption, and sets the ClientButton visible and enabled states according to the FieldClientButtonState property.

If the user wishes to determine what entity is matched with a particular field, the user clicks on an existing field, either on the preview window or in the field list of the object toolbox. The BFO Processor updates the toolbox and style properties dialog with the properties for the field. The BFO Processor displays the FieldStatusBarText in the client panel of the status bar. Alternatively, the user clicks on an existing field, the BFO Processor updates the toolbox with the location values for the field, and the user clicks on the Properties button. The BFOProcessor updates the Properties modeless dialog with the properties of the selected field, including the entity name from the temporary FieldEntity property. The Properties dialog has a button with the caption 'Entity:' next to the entity name.

The user clicks on the Properties button to request the BFO processor to display the previously prepared style properties modeless dialog. If the user wished to add a field, the user selects the Field tool. The BFO Processor sets the ClientButton caption to the FieldClientButtonCaption and sets the ClientButton visible and enabled states according to the FieldClientButtonState property. The user then draws a rectangle on the page. The BFO Processor creates a field object, gives it a FieldName, adds it to the Fields collection for the page, and makes the new field the current field. The BFO Processor sets the client panel of the status bar to the DefaultFieldEditStatusBar Text, and fires the FieldAdd event thereby passing the field name and a cancel option. The client validates the field name.

Alternatively, after the user selects the Field tool and draws a rectangle on the page, the BFO Processor fires the FieldAdd event, passing the FieldID, the default name it has assigned the new field, and the Left, Baseline, Height and Width values. The client records the field attributes and fires the AddField method. The BFO Processor adds the Field to the field collection for the current page. The user selects FieldName and begins typing. As each key is pressed, KeyPress events are fired. Each event has a parameter identifying the Field Properties dialog, another providing the index of the field on the Properties modal dialog and another parameter identifying the key that was pressed. The client updates its value for FieldName. The client may suppress certain keys as invalid components of a field name. To do so, it changes the key identifying parameter to zero. The user then selects the Entity button. The BFO Processor fires the FieldEntityProperties event, passing the FieldID it has assigned to the new field. The client displays a selection dialog from which user can select an entity, and the user selects an entity. The client associates the entity name with the Field ID.

If the user wishes to change the name of the field, the user selects the Field button. The user selects the FieldName control, types the new name, and selects the Apply button. In response, the BFO Processor fires a FieldNameChange event, passing the field name and a cancel option. The client validates the field name. If an illegal character is found, the client displays a message indicating same. The client sets the cancel option to true. If the user wishes to correct a field name, the user selects the Apply button. The BFO Processor fires a FieldNameChange event, passing the field name and a cancel option. The client then validates the field name. The BFO Processor updates its value for FieldName. The list in the Object Toolbox is updated.

If the user wishes to change the entity assignment for a selected field, the user selects the Client button. The BFO Processor makes the selected field the current field, and fires the ClientButtonClick event thereby passing the entry type (field). The client displays a selection dialog from which the user can select an entity. After the user selects an entity, the client sets the FieldDesignTimeStatusBarString property of the current field to the new entity name. The BFO Processor updates the StatusBarString with the new value.

If the user wishes to delete a selected field, the user clicks on the field to select it. The BFO Processor updates the toolbox with the location values for the field, and updates the Properties modeless dialog with the properties of the selected field and sets the FieldEditStatusBarString. The field rectangle retains the focus. The BFO Processor sets the ClientButton caption to the FieldClientButtonCaption and sets the ClientButton visible and enabled states according to the FieldClientButtonState property. The user then presses the Delete key. The BFO processor prompts for confirmation. The user selects Yes, and the BFO Processor removes the field from its Fields collection and updates the list in the toolbox. Alternatively, after the user clicks on a field to select it, the BFO Processor updates the toolbox with the location values for the field, and updates the Properties modeless dialog with the properties of the selected field, including the entity name from the temporary FieldEntity property. The field rectangle retains the focus, and the user presses the Delete key. In response, the BFO Processor fires the FieldDelete event. The client removes the field from its list and fires the FieldRemove method. The BFO Processor removes the field from its list and removes the rectangle from the preview window. The previous field in the list, if any is selected. If there is no previous field, the next field is selected. If there are no remaining fields, the Properties modeless dialog is closed.

If the user wishes to move a field, the user clicks on a field to select it. The BFO Processor updates the toolbox with the location values for the field, updates the Properties modeless dialog with the properties of the selected field, and sets the FieldEditStatusBarString. The field rectangle retains the focus. The BFO Processor sets the ClientButton caption to the FieldClientButtonCaption and sets the ClientButton visible and enabled states according to the FieldClientButtonState property. The user presses mouse button 1, drags the field to a new location, and then the mouse button 1. The BFO Processor records the updated location.

If the user wishes to place a logo on the form, the user clicks on the Logo tool. In response, the BFO Processor updates the ClientButton caption with the LogoClientButtonCaption property, and makes the ClientButton visible and enabled according to the LogoClientButtonState property. The user draws a rectangle to accommodate the logo and releases the mouse button. The BFO Processor fires the LogoAdd event, pops a dialog allowing the user to select the logo, and displays the selected logo, allowing the user to drag and/or resize it.

When the user wishes to save the work, the user clicks the Close button on the Preview window. In response, the BFO Processor fires the PreviewClosing event with a Yes/No/Cancel parameter, and the client pops dialog "Do you want to save changes to <BFOname>? Yes, No, Cancel, Help. In response to a user selection of Yes, the client writes a temporary copy of the SGML control instance. The control instance source contains SGML comment tags that delimit the area within which the user is not to edit. The client iterates through the Pages and Fields collections, retrieving name, location, and StatusBarText properties. The field information is written in the reserved area with SGML markup for a control instance. The new control instance file is closed, the original is deleted, and the temporary file is renamed with the original name. The client sets the Yes/No/Cancel parameter to Yes, and the BFO Processor writes the modified BFO out to a temporary file. The file is closed, the original is deleted, and the temporary file is renamed with the original name. When the user wishes to exit, the user selects File|Exit. The client notifies the BFO Processor that it is shutting down. In response, the BFO Processor executes its destructors and shuts down in a controlled manner.

Alternatively, in response to the user selecting Yes, the client writes a temporary copy of the SGML control instance. The control instance source contains SGML processing instruction tags that delimit the area within which the user is not to edit. The field information, including entity references, is written in this area. The file is closed, the original is deleted, and the temporary file is renamed with the original name. The client fires the Save method. The BFO Processor writes the modified BFO out to a temporary file. The file is closed, the original is deleted, and the temporary file is renamed with the original name. In response to a user selection of File|Exit, the client sets the BFO Processor object to nothing or null. The BFO Processor executes its destructors and shuts down in a controlled manner.

There are four events that can be fired while the EditFields and Preview methods are being handled. The four events are: ClientButtonClick—EditFields only; ObjectAdd—EditFields only; ObjectNameChange—EditFields only; and PreviewClosing—EditFields and Preview. While the client is handling these events, certain methods and properties are not available. Further, the behavior of some methods and properties changes subtly. When a BFO file is opened, copies of all the document, page, field and logo objects in the file are created in computer memory. This list of properties is referred to as the persistent list. When a page is selected for editing, all objects on that page are copied to a separate list known as the active list. When a user clicks the OK button to close either the Preview or EditFields window, for example, the user is offered the opportunity to save or discard any changes. If the user chooses to save the changes, the active list is copied to the persistent list. The persistent list is copied to a system file when the user executes the SaveBFO method.

When an event is fired, field and logo properties will be set or returned from the active list. In general, page and document properties become read only and most methods are disabled. For example, a user cannot use the RemovePage or RemoveField methods while processing an event. If a user attempts to use a disabled method, it will return a zero or an empty string, if it has a return. In any event, a user can use GetError to determine whether the method succeeded. The following Table lists the methods and properties of the BFO OCX control and indicates which are enabled during EditFields.

TABLE 80

| NAME | STATUS | ACTS ON |
|---|---|---|
| AboutBox | Enabled | Persistent list |
| AddDocument | Disabled | |
| AddField | Disabled | |
| AddLogo | Disabled | |
| AddPage | Disabled | |
| BeginPrinting | Disabled | |
| BFOFormColor | Disabled | |
| BFOGridPrecision | Disabled | |
| BFOStyleWindowVisible | Disabled | |
| ConvertPCLtoMeta | Disabled | |
| CurrentDocument | Read only | Persistent list |
| CurrentField | Read only | Active list |
| CurrentLogo | Read only | Active list |
| CurrentPage | Read only | Active list |
| Default .... (all default properties) | Disabled | |
| DocumentCopyright | Read only | Persistent list |
| DocumentDescription | Read only | Persistent list |
| EditFields | Disabled | |
| EndPrinting | Disabled | |
| FieldAlignment | Enabled | Active list |
| FieldBaseline | Enabled | Active list |
| FieldClientButtonCaption | Enabled | EditFields client button |
| FieldClientButtButtonState | Enabled | EditFields client button |
| FieldColor | Enabled | Active list |
| FieldDefaultText | Enabled | Active list |
| FieldEditStatusBarText | Enabled | Active list |
| FieldFirstLineIndent | Enabled | Active list |
| FieldFontID | Enabled | Active list |
| FieldHeight | Enabled | Active list |
| FieldHelpContextID | Enabled | Active list |
| FieldHelpText | Enabled | Active list |
| FieldLastLinewidth | Enabled | Active list |
| FieldLeft | Enabled | Active list |
| FieldLines | Enabled | Active list |
| FieldLineSpacing | Enabled | Active list |
| FieldName | Enabled | Active list |
| FieldPreviewStatusBarText | Enabled | Active list |
| FieldProtect | Enabled | Active list |
| FieldSortOrder | Disabled | |

TABLE 80-continued

| NAME | STATUS | ACTS ON |
|---|---|---|
| FieldWidth | Enabled | Active list |
| GetError | Enabled | |
| GetFirstDocument | Disabled | |
| GetFirstField | Disabled | |
| GetFirstLogo | Disabled | |
| GetFirstPage | Disabled | |
| GetNextDocument | Disabled | |
| GetNextField | Disabled | |
| GetNextLogo | Disabled | |
| GetNextPage | Disabled | |
| LoadPageImageFromPCL | Disabled | |
| LogoAspect | Enabled | Active list |
| LogoClientButtonCaption | Enabled | EditFields client button |
| LogoClientButtonState | Enabled | EditFields client button |
| LogoColor | Enabled | Active list |
| LogoEditStatusBarText | Enabled | Active list |
| LogoFileDate | Read only | Active list |
| LogoFileSize | Read only | Active list |
| LogoFilename | Enabled | Active list |
| LogoFiletime | Read only | Active list |
| LogoHeight | Enabled | Active list |
| LogoLeft | Enabled | Active list |
| LogoName | Enabled | Active list |
| LogoPlacementPriority | Disabled | |
| LogoSortOrder | Disabled | |
| LogoStream | Enabled | Active list |
| LogoTop | Enabled | Active list |
| LogoVisible | Enabled | Active list |
| LogoWidth | Enabled | Active list |
| NewBFO | Disabled | |
| OpenBFO | Disabled | |
| PageChecked | Enabled | Active list |
| PageHeight | Read only | Active list |
| PageName | Enabled | Active list |
| PageNumber | Enabled | Active list |
| PageOrientation | Read only | |
| PagePCLFiledate | Read only | Active list |
| PagePCLFilename | Read only | Active list |
| PagePCLFiletime | Read only | Active list |
| PagePCLName | Enabled | Active list |
| PagePCLStream | Read only | Active list |
| PageRevision | Read only | Active list |
| Pagesize | Read only | Active list |
| PageWidth | Read only | Active list |
| Preview | Disabled | |
| PrintAPage | Disabled | |
| PrintDialog | Disabled | |
| RefreshLogo | Enabled | Active list |
| RemoveDocument | Disabled | |
| RemoveField | Disabled | |
| RemoveLogo | Disabled | |
| RemovePage | Disabled | |
| SaveBFO | Disabled | |
| ServerVersion | Enabled | |
| Validate | Disabled | |
| WorkDirectory | Enabled | Persistent list |
| WritePCL | Disabled | |

A description of the process by which data is merged to an electronic form will now be provided in accordance with one embodiment of the present invention. The design of the merge interface of the BFO OCX custom control permits the user to modify selected data items when previewing a document (see Appendix III). The BFO OCX custom control can be described as having three general states: passive, active, and event states. The passive state allows access to all BFQ properties and methods. The passive state is the default state of the BFO OCX custom control. The active state is reached by executing one of the methods of the BFO OCX or by accessing a property. Events can only be fired while the BFO OCX is in the active state. While in the active state, the BFO OCX manages all processing. Actions can only be initiated via the user interfaces exposed by the BFO OCX. The event state can only occur from the active state. The event state begins when an event handling procedure is invoked and ends when the event handling procedure returns. During the event state, certain properties become read only, other properties and most methods are disabled. Parameters passed to an event handler allow event processing routines to modify some properties that otherwise are read only.

The term event, within the context of the BFO OCX, refers to a message sent by the BFO OCX to the client when certain conditions are met. These events are used to notify the client when something important happens in the control. An event message can be received whenever the BFO OCX is in the active state. Events handlers are procedures in the client that are invoked when the event message is received. An application client of the BFC OCX can manipulate a restricted set of the properties of a BFO while handling an event. Certain event handler parameters can also be modified before the event handler returns. The following events listed in Table 81 below can be fired by the BFO OCX. The methods in Table 81 refer to the methods that can cause the event to be fired. The interlocks refer to the set of properties and methods that is affected by this event. The term standard in the interlock column refers to Standard Active and Event State Restrictions.

TABLE 81

| EVENT NAME | METHODS | INTERLOCKS |
|---|---|---|
| ClientButtonClick | EditFields | Standard |
| ConversionError | ConvertPCLToMeta | All properties are read only, all methods disabled |
| F1KeyPress | EditData | All properties are read only, all methods disabled |
| FieldLostFocus | EditData | All properties are read only, all methods disabled |
| ObjectAdd | EditFields | Standard |
| ObjectNameChange | EditData | Standard |
| PreviewClosing | EditData EditFields Preview | All properties are read only, all methods are disabled |
| Printing | EditData EditFields Preview | All properties are read only, all methods disabled |

Each BFO Field object has a property called FieldDefaultText. This property contains the text string that is displayed as the "value" or "contents" of the field during EditFields, Preview or EditData. The length of the string that can be assigned to FieldDefaultText is affected by settings to the FieldFirstLineIndent, FieldFontID, FieldLastLineWidth, FieldLines, FieldLineSpacing, and FieldWidth properties. That is, a change to any of these properties can cause the FieldDefaultText string to not "fit" in the space made available by the other properties.

In addition, changes to many properties can lead to exceptions if such changes would cause an error. For example, a change to FieldWidth may cause the space allocated for the field to expand out of the printable area of the page. The BFO OCX manages these exceptions by refusing the property assignments. Although it is possible to check GetError on a method call based on the return value, there is no return from a property assignment. It is possible, however, to retrieve the property to see if it was accepted. For example, consider the following code sample:

TABLE 82

```
myBFO.FieldLines = 60
If myBFO.FieldLines <> 60 Then
  ' Error: assignment was rejected
  MsgBox myBFO.GetError, vbInformation
End If
```

There are thus two possible error conditions that can arise from assignments to field properties. One causes a FieldDefaultTextOverflow string to be assigned and the other causes an exception.

While the client is handling events, certain methods and properties are not available. Further, the behavior of some methods and properties changes. When a BFO file is opened, copies of all the document, page, field and logo objects in the file are created in computer memory. This list of properties is referred to as the passive list. When a page is selected for editing, all objects on that page are copied to a separate list known as the active list. When a user clicks the OK button to close either the Preview or EditFields window, the user is offered the opportunity to save or discard changes. If the user chooses to save the changes, the active list is copied to the passive list. The passive list is copied to a system file when the user executes the SaveBFO method.

When an event is fired, field and logo properties will be set or returned from the active list. In general, page and document properties become read only and most methods are disabled. For example, a user cannot use the RemovePage or RemoveField methods while processing an event. If the user attempts to use a disabled method, it will return a zero or an empty string, if it has a return. In any event, the user can use GetError to determine whether the method succeeded. In Table 83 below, there is provided the methods and properties of the BFO OCX control and indicates which are enabled during standard event handling. Certain events make all properties read only and disable all methods. This list does not apply to those events.

TABLE 83

| NAME | STATUS | ACTS ON |
|------|--------|---------|
| AboutBox | Enabled | Passive list |
| AddDocument | Disabled | |
| AddField | Disabled | |
| AddLogo | Disabled | |
| AddPage | Disabled | |
| BeginPrinting | Disabled | |
| BFOFormColor | Enabled | |
| BFOGridPrecision | Enabled | |
| BFOStyleWindowVisible | Enabled | |
| ConvertPCLtoMeta | Disabled | |
| CurrentDocument | Read only | |
| CurrentField | Read only | Active list |
| CurrentLogo | Read only | Active list |
| CurrentPage | Read only | Active list |
| Default . . . (all default properties) | Disabled | |
| DocumentCopyright | Read only | Passive list |
| DocumentDescription | Read only | Passive list |
| EditFields | Disabled | |
| EndPrinting | Disabled | |
| FieldAlignment | Enabled | Active list |
| FieldBaseline | Enabled | Active list |
| FieldClientButtonCaption | Enabled | EditFields client button |
| FieldClientButtonState | Enabled | EditFields client button |

TABLE 83-continued

| NAME | STATUS | ACTS ON |
|------|--------|---------|
| FieldColor | Enabled | Active list |
| FieldDefaultText | Read only | Active list |
| FieldEditStatusBarText | Enabled | Active list |
| FieldFirstLineIndent | Enabled | Active list |
| FieldFontID | Enabled | Active list |
| FieldHeight | Read only | Active list |
| FieldHelpContextID | Enabled | Active list |
| FieldHelpText | Enabled | Active list |
| FieldLastLineWidth | Enabled | Active list |
| FieldLeft | Enabled | Active list |
| FieldLines | Enabled | Active list |
| FieldLineSpacing | Enabled | Active list |
| FieldName | Enabled | Active list |
| FieldPreviewStatusBarText | Enabled | Active list |
| FieldProtect | Enabled | Active list |
| FieldSortOrder | Disabled | |
| FieldWidth | Enabled | Active list |
| GetError | Enabled | |
| GetFirstDocument | Disabled | |
| GetFirstField | Disabled | |
| GetFirstLogo | Disabled | |
| GetFirstPage | Disabled | |
| GetNextDocument | Disabled | |
| GetNextField | Disabled | |
| GetNextLogo | Disabled | |
| GetNextPage | Disabled | |
| LoadPageImageFromPCL | Disabled | |
| LogoAspect | Enabled | Active list |
| LogoClientButtonCaption | Enabled | EditFields client button |
| LogoClientButtonState | Enabled | EditFields client button |
| LogoColor | Enabled | Active list |
| LogoEditStatusBarText | Enabled | Active list |
| LogoFileDate | Read only | Active list |
| LogoFileSize | Read only | Active list |
| LogoFilename | Read only | Active list |
| LogoFiletime | Read only | Active list |
| LogoHeight | Enabled | Active list |
| LogoLeft | Enabled | Active list |
| LogoName | Enabled | Active list |
| LogoPlacementPriority | Disabled | |
| LogoSortOrder | Disabled | |
| LogoTop | Enabled | Active list |
| LogoVisible | Enabled | Active list |
| LogoWidth | Enabled | Active list |
| NewBFO | Disabled | |
| OpenBFO | Disabled | |
| PageChecked | Enabled | Active list |
| PageHeight | Read only | Active list |
| PageName | Enabled | Active list |
| PageNumber | Enabled | Active list |
| PageOrientation | Read only | |
| PagePCLFiledate | Read only | Active list |
| PagePCLFilename | Read only | Active list |
| PagePCLFiletime | Read only | Active list |
| PagePCLName | Enabled | Active list |
| PageRevision | Read only | Active list |
| PageSize | Read only | Active list |
| PageWidth | Read only | Active list |
| Preview | Disabled | |
| PrintApage | Disabled | |
| PrintDialog | Disabled | |
| RefreshLogo | Disabled | |
| RemoveDocument | Disabled | |
| RemoveField | Disabled | |
| RemoveLogo | Disabled | |
| RemovePage | Disabled | |
| SaveBFO | Disabled | |
| ServerVersion | Enabled | |
| TestFieldDefaultText | Enabled | |
| Validate | Disabled | |
| WorkDirectory | Enabled | Passive list |
| WritePCL | Disabled | |

The following are examples of handling the FieldDefaultTextOverflow events. It is noted that this event only occurs when field properties are accessed while the BFO OCX is in the passive state. In this example, the client wants to print the complete text of FieldDefaultText on a separate document if it does not fit in the assigned area. The space constraints are as follows:

| | |
|---|---|
| FieldLines | 1 - Single line field |
| FieldWidth | 2.0 - Allows for 24 characters at 12 CPI |
| FieldDefaultText is assigned the value "Now is the time for all good men to come to the aid". | |

The state of DefaultText properties after the assignment is as follows:

| | |
|---|---|
| FieldDefaultText | "Now is the time for all good men to come to the aid" |
| FieldExcessText | "good men to come to the aid". |

The client uses the TestFieldDefaultText to determine whether "See overflow area." will fit in the current field. The client changes FieldDefaultText to "See overflow area.". The client writes the original FieldDefaultText to some internal storage for placement on an overflow document. The client changes the field properties as follows:

| | |
|---|---|
| FieldDefaultText | "See overflow area." |
| FieldExcessText | "". |

In accordance with another example, it is assumed that the client wants to print any excess text of FieldDefaultText on a separate document, with an overflow message indicating where the excess text can be found. The following constraints are applicable:

| | |
|---|---|
| FieldLines | 2 |
| FieldWidth | 4.0 - Allows for 48 characters per line at 12 CPI. |

It is further assumed that the FieldDefaultText is assigned the value "Southeast quarter of the Northwest quarter of Section 24, Excelsior Township, Washington County, Minn., less the southernmost 100 feet." The Process Server fits "Southeast quarter of the Northwest quarter of" on the first line and "Section 24, Excelsior Township, Wash." on the second line. The state of field properties after the assignment is as follows:

| | |
|---|---|
| FieldDefaultText | "Southeast quarter of the Northwest quarter of Section 24, Excelsior Township, Washington County, Minnesota, less the southernmost 100 feet." |
| FieldExcessText | "County, Minnesota, less the southernmost 100 feet." |

The client fires the TestFieldDefaultText method with the following parameters:

| | |
|---|---|
| FieldDefaultText | "Southeast quarter of the Northwest quarter of Section 24, Excelsior Township, Washington County, Minnesota, less the southernmost 100 feet." |
| OverflowMessage | "-->See overflow" |
| FittedFieldDefaultText | (output from method) "Southeast quarter of the Northwest quarter of Section 24, Excelsior -->See overflow area" |
| ExcessText | (output from method) "Township, Washington County, Minnesota, less the southernmost 100 feet." |

The TestFieldDefaultText method returns non-zero, meaning FittedFieldDefaultText is different from FieldDefaultText and ExcessText has a value. The client changes the field properties as follows:

| | |
|---|---|
| FieldDefaultText | "Southeast quarter of the Northwest quarter of Section 24, Excelsior -->See overflow area" |
| FieldExcessText | "". |

Before exiting the event, the client must save the value of ExcessText returned from TestFieldDefaultText and provide for placing it on the overflow document. The client can retrieve the FieldName property, if desired, in order to create a message such as: "[Property Description continued] Township, Washington County, Minn., less the southernmost 100 feet."

In accordance with a further example, it is assumed that the client wants to adjust the field dimension properties if FieldDefaultText does not fit in the assigned area. The following constraints apply:

| | |
|---|---|
| FieldLines | 1 - Single line field |
| FieldWidth | 2.0 - Allows for 24 characters at 12 CPI. |

The FieldDefaultText is assigned the value "Now is the time for all good men to come to the aid". The state of field properties after the assignment is as follows:

| | |
|---|---|
| FieldDefaultText | "Now is the time for all good men to come to the aid" |
| FieldExcessText | "good men to come to the aid". |

By way of further example, it is assumed that the client changes the FieldLines property from 1 to 2. The client fires the TestFieldDefaultText method with the following parameters:

| | |
|---|---|
| FieldDefaultText | "Now is the time for all good men to come to the aid" |
| OverflowMessage | "" |
| FittedFieldDefaultText | (output from method) "Now is the time for all good men to come to the" |
| ExcessText | (output from method) "aid". |

The TestFieldDefaultText method returns non-zero, so the client changes the FieldWidth property to 2.5 (30 characters)

and tries TestFieldDefaultText again, thus rendering the following property states:

| FieldDefaultText | "Now is the time for all good men to come to the aid" |
|---|---|
| OverflowMessage | "" |
| FittedFieldDefaultText | (output from method) "Now is the time for all good men to come to the aid" |
| ExcesText | "". |

The client changes the field properties as follows:

| FieldDefaultText | "Now is the time for all good men to come to the aid" |
|---|---|
| ExcessText | "". |

The BFO OCX custom control places "Now is the time for all good" in the first line (note word wrap) and "men to come to the aid" in the second line. Since the text fits, no text is truncated.

In the case of field overflow during data entry by a user, field behavior is determined by setting values of the Field-Flags property. Excess text, whether keying after the field is full or attempting to insert text that would push existing text past the end of the field, is accepted and placed in FieldExcessText (FieldFlags=&1h&). It is noted that a default behavior is to reject such an insertion. If the field is filled by keying beyond the end of the field, the focus should move to the next field in tab sequence, and the keying should be assigned to that field (FieldFlags=&2h&). It is noted that the FieldLostEvent will be fired before the excess text is assigned to the next field.

By way of further example, Table 84 below provides an example of rejecting an attempt by the user to Tab from a field when the field contains invalid data:

TABLE 84

```
Private Sub object_FieldLostFocus(ByRef Cancel As Integer,
ByRef FieldDefaultText As String)
   Select Case UCase$ (myBFC.CurrentField)
      Case "CUSTOMERSTATE"
         FieldDefaultText = Ucase$ (FieldDefaultText)
         If Len (FieldDefaultText) < 2 Then
            MsgBox "Please enter a valid state abbreviation."
            Cancel = True
         End If
         If Not Instr(FieldDefaultText, "AL.AK.AR. "Then
            MsgBox "Please enter a valid state abbreviation."
            Cancel = True
         End If
   End Select
End Sub
```

The example provided in Table 85 below illustrates a procedure to extract the data entered by the user in unprotected fields:

TABLE 85

```
Private Sub object_Commitpageedits (ByRef AbortCommit As Integer)
Dim sFieldName As String
Dim sFieldData As String
   sPageName = GetFirstUnprotectedField
   Do While Len (sPageName)
      sFieldData = myBFO.FieldDefaultText
      ' client function returns true or false
      If Not myStorageFunction(sFieldName, sFieldData) Then
```

TABLE 85-continued

```
         AbortCommit = True
         Exit Do
      End If
      sFieldName = GetNextUnprotectedField
   Loop
End Sub
```

Figure 27:
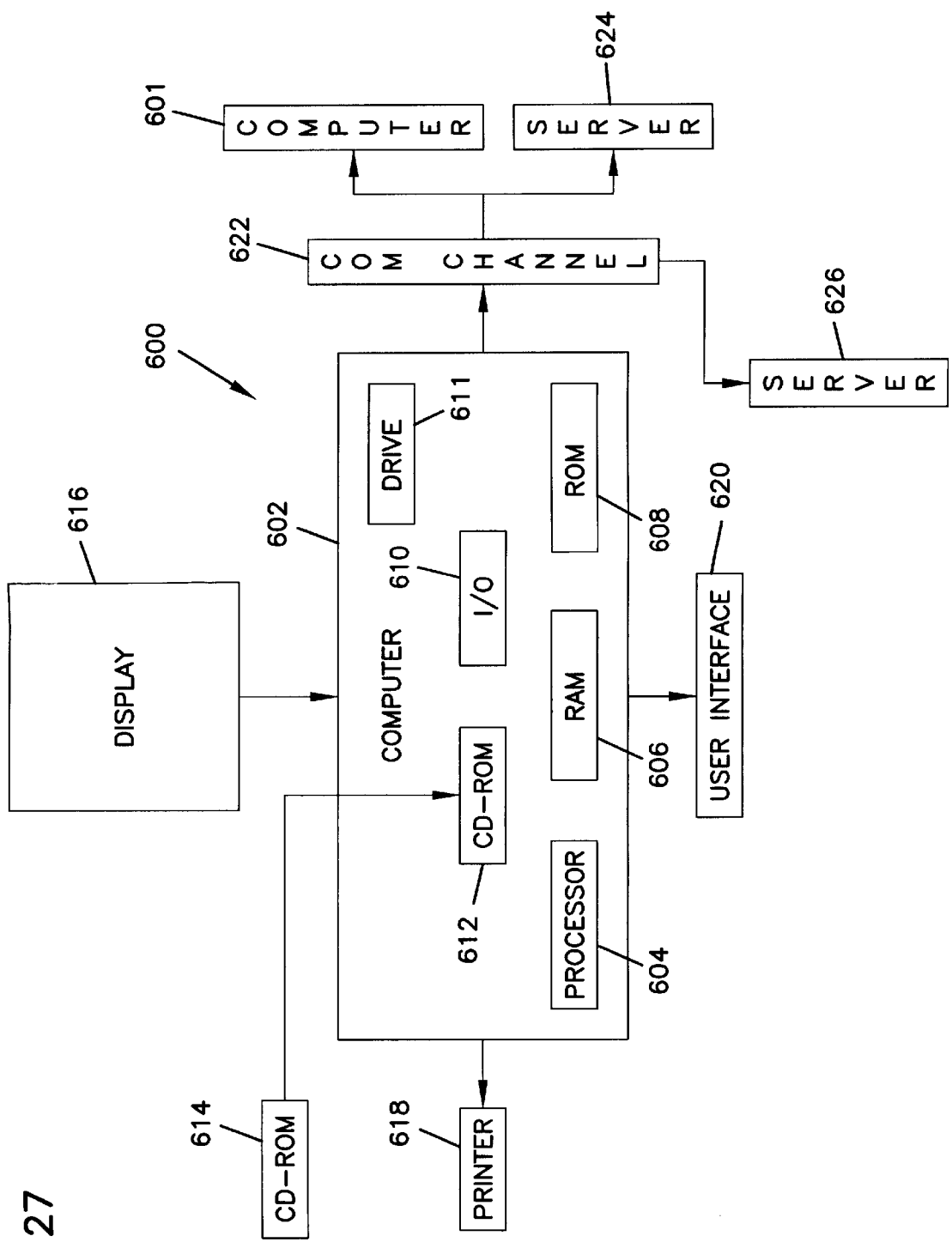
FIG. 27 is a system block diagram of a computer-based document construction system suitable for constructing a document in accordance with the present invention.

Referring now to FIG. 27, there is illustrated in system block diagram form a computer system 602 coupled to a network of other computers and servers which together provide for a distributed dynamic document construction capability. A computer 602 suitable for constructing a document in accordance with the present invention includes a central processor (CPU) 604 coupled to random-access-memory (RAM) 606 and read-only-memory (ROM) 608. The processor 604 communicates with other internal and external components through an input/output (I/O) bus 610. The computer 602 may also include one or more data storage devices, including a hard disk drive 611, a floppy disk drive (not shown), and a CD-ROM drive 612. In one embodiment, software containing the document construction software of the present invention may be stored and distributed on a CD-ROM 614, which may be inserted into, and read by, the CD-ROM drive 612. The computer 602 is also coupled to a display 616, a user interface 620, such as a mouse and keyboard, and a printer 618. The document developer or end-user typically inputs and modifies various document parameters and executes various document construction routines by interfacing with the computer 602 through the user interface 620 and display 616.

The I/O bus 610 of the computer 602 is preferably coupled to a communication channel 622 which, in turn, provides a means to communicate with one or more remote computers 601, servers 624 and 626, and other external information systems, such as those that constitute the Internet. In one embodiment, for example, a document developer may initiate a document construction routine from a remote computer 601 which communicates with an external server, such as server 626, for purposes of browsing links between constructed documents, entities contained therein, and information storage systems accessed to resolve entities and acquire document content. Accordingly, the document construction routines in accordance with the present invention may be operable on a stand-alone computer system, as well as on a distributed network system.

It will, of course, be understood that various modifications and additions can be made to the embodiments discussed hereinabove without the departing from the scope or spirit of the present invention. For example, it will be understood that the document construction methodology described herein may be applicable to a wide variety of electronic and printed document applications. For example, the document construction apparatus and method is not limited to use in the financial and banking industry, but may be employed in many other applications, such as for accounting systems, engineering documentation systems, Internet applications, and the like. Accordingly, the scope of the present invention should not be limited to the particular embodiments discussed above, but should be defined only by the claims set forth below.

What is claimed is:

1. A method of electronically constructing a document, comprising the steps of:

reading a text component reference;

comparing the text component reference to a plurality of text component identifiers provided in a catalog, each of the text component identifiers in the catalog being associated with a resolution strategy;

implementing, in response to successfully comparing the text component reference with a matching text component identifier in the catalog, a resolution strategy associated with the matching text component identifier in the catalog using an inference engine to resolve the text component reference to a corresponding resolved text component;

outputting the resolved text component for subsequent incorporation at a location in the document;

generating a plurality of distinct document versions of the resolved text components using an artificial intelligence expert system to create each of the plurality of document versions based on a decision generated by the expert system's set of predetermined formatting rules; and selecting one of the plurality of the document versions to be used as the document.

2. The method of claim 1, wherein:

the text component reference includes an embedded text component reference;

the implementing step includes the step of implementing, in response to successfully comparing the embedded text component reference with a matching text component identifier in the catalog, a resolution strategy associated with the matching text component identifier using an inference engine to resolve the embedded text component reference to a corresponding resolved embedded text component; and outputting the resolved text component and the embedded text component for subsequent incorporation at the location in the document.

3. The method of claim 1, including the step of formatting the resolved text component in accordance with one of a plurality of formatting types.

4. The method of claim 1, including the step of entering the text component identifier and associated resolution strategy into the catalog.

5. The method of claim 1, wherein the outputting step includes the step of outputting the resolved text component for incorporation into the catalog using the inference engine.

6. The method of claim 1, wherein:

the catalog includes a plurality of text component identifiers, at least one of the plurality of text component identifiers being associated with a sequence of resolution strategies; and the implementing step includes the step of implementing a first resolution strategy of the sequence of corresponding resolution strategies to resolve the text component reference to the resolved text component.

7. The method of claim 6, including the step of ordering the plurality of text component identifiers so as to control the sequence of resolution strategies in the catalog.

8. The method of claim 1, including the further steps of:

formatting the document in one of a plurality of format styles; and outputting the formatted document in one of a printed and electronic form.

9. The method of claim 1, including the further steps of:

auditing the implementing step; and storing auditing information in a file.

10. A method of electronically constructing a document, comprising the steps of:

reading an entity reference;

matching the entity reference with an entity identifier provided in a catalog containing a plurality of entity identifiers, each of the plurality of entity identifiers in the catalog being associated with an entity resolution process;

invoking one of a plurality of entity resolving processors to effectuate a resolution process associated with a matching entity identifier in the catalog;

resolving the entity reference to a resolved entity using the invoked entity resolving processor;

linking the resolved entity to a location in the document;

outputting the document in one of a printed and electronic form;

generating a plurality of distinct document versions of the resolved text components using an artificial intelligence expert system to create each of the plurality of document versions based on a decision generated by the expert system's set of predetermined formatting rules; and selecting one of the plurality of the document versions to be used as the document.

11. The method of claim 10, wherein:

the plurality of entity resolving processors includes an inference engine;

the resolving step includes the step of accessing a database containing text components using the inference engine; and the linking step includes the step of linking the text component accessed from the database to the document location.

12. The method of claim 10, wherein:

the plurality of entity resolving processors includes an iterator; and the resolving step includes the seeps of:

replicating content of the document using the iterator; and resolving the entity reference to the resolved entity using the replicated document content.

13. The method of claim 12, wherein the replicated content includes content specified by one of a client of the iterator and a user.

14. The method of claim 10, wherein:

the plurality of entity resolving processors includes an entity resolving processor that implements an artificial intelligence procedure; and the resolving step includes the step of resolving the entity reference to the resolved entity using the artificial intelligence procedure.

15. The method of claim 10, wherein:

the plurality of entity resolving processors includes an inquiry resolving processor that requests an input from a user; and the resolving step includes the step of resolving the entity reference to the resolved entity using the input from the user.

16. The method of claim 10, wherein the resolving step includes the step of resolving the entity reference to the resolved entity using a transformation rule.

17. The method of claim 10, including the further steps of:

validating the document against a document type definition; and parsing the entity reference after the step of reading the entity reference.

18. The method of claim 10, wherein:

the matching step includes the step of matching the entity reference with an entity identifier of a previously resolved entity provided in an entity cache prior to the step of matching the entity reference with the entity identifier provided in the catalog; and the resolving step includes the step of resolving the entity reference to the resolved entity using the previously resolved entity provided in the entity cache so as to bypass the step of invoking one of the plurality of entity resolving processors.

19. The method of claim 10, wherein the linking step includes the step of linking the resolved entity to the location of the document and to an information source accessed by the invoked entity resolving processor.

20. The method of claim 19, including the step of auditing links between the resolved entity, the document, and the information source.

21. A system for electronically constructing a document, comprising:

a central processor coupled to a display and a user input device;

a local memory, coupled to the central processor, configured to store a plurality of catalogs each containing entity resolution strategies and corresponding entity identifiers;

a plurality of entity resolution processors implementable by the central processor;

comparing means for comparing an entity reference read from the user input device with a matching entity identifier contained in the plurality of catalogs stored in the local memory; and a communications interface coupled to a communications channel and a remote information storage device;

wherein the central processor implements one of the plurality of entity resolution processors indicated by an entity resolution strategy of the matching entity identifier so as to resolve the entity reference read from the user input device to a resolved entity by using information stored in the remote information storage device, the resolved entity subsequently being incorporated into each of a plurality of document versions based on a decision generated by the expert system's set of predetermined formatting rules, selecting one of the plurality of the document versions to be used as the document.

22. The system of claim 21, wherein the local memory is configured to store an audit log containing entity resolution information.

23. The system of claim 22, comprising means for browsing the audit log using the user input device and the display.

24. The system of claim 21, comprising means for replicating a portion of the document and incorporating the replicated portion into the document.

25. The system of claim 21, comprising formatting means for formatting the document for output to one of a printable form and an electronically displayable form.

26. A computer program product, comprising:

a computer usable medium having computer readable program code embodied therein for causing a computer to construct a document by a method including the steps of:

reading an entity reference;

comparing the entity reference to a plurality of entity identifiers provided in a catalog, each of the entity identifiers in the catalog being associated with a resolution strategy;

invoking, in response to successfully comparing the entity reference with a matching entity identifier in the catalog, one of a plurality of entity resolving processors associated with the matching entity identifier;

resolving the entity reference to a component using the invoked entity resolving processor to effectuate the resolution strategy associated with the matching entity identifier;

outputting the component for subsequent incorporation in the document;

generating a plurality of distinct document versions of the resolved text components using an artificial intelligence expert system to create each of the plurality of document versions based on a decision generated by the expert system's set of predetermined formatting rules; and selecting one of the plurality of the document versions to be used as the document.

* * * * *